United States Patent
Strbik, III et al.

(10) Patent No.: US 7,833,076 B1
(45) Date of Patent: Nov. 16, 2010

(54) METHOD OF FABRICATING A PLASMA-SHELL PDP WITH COMBINED ORGANIC AND INORGANIC LUMINESCENT SUBSTANCES

(75) Inventors: Oliver M. Strbik, III, Holland, OH (US); Carol Ann Wedding, Toledo, OH (US)

(73) Assignee: Imaging Systems Technology, Inc., Toledo, OH (US)

( * ) Notice: Subject to any disclaimer, the term of this patent is extended or adjusted under 35 U.S.C. 154(b) by 78 days.

(21) Appl. No.: 12/172,646

(22) Filed: Jul. 14, 2008

Related U.S. Application Data

(60) Division of application No. 11/107,964, filed on Apr. 18, 2005, now Pat. No. 7,405,516, and a continuation-in-part of application No. 11/107,964.

(60) Provisional application No. 60/564,942, filed on Apr. 26, 2004.

(51) Int. Cl.
*H01J 9/00* (2006.01)
*H01J 9/22* (2006.01)
*H01J 9/24* (2006.01)

(52) U.S. Cl. ........................... 445/24; 445/25
(58) Field of Classification Search ......... 313/582–587, 313/483–487; 445/24–27
See application file for complete search history.

(56) References Cited

U.S. PATENT DOCUMENTS

| | | | |
|---|---|---|---|
| 2,187,432 A | 1/1940 | Powers | |
| 2,644,113 A | 6/1953 | Etzkorn | |
| 3,050,654 A | 8/1962 | Toulon | |
| 3,177,161 A | 4/1965 | Smith-Johannsen | |
| 3,264,073 A | 8/1966 | Schmitt et al. | |
| 3,365,315 A | 1/1968 | Beck et al. | |
| 3,423,489 A | 1/1969 | Arens | |
| 3,528,809 A | 9/1970 | Farrand | |
| 3,602,754 A | 8/1971 | Pfaender et al. | |
| 3,646,384 A | 2/1972 | Lay | |
| 3,652,891 A | 3/1972 | Janning | |
| 3,654,680 A | 4/1972 | Bode et al. | |
| 3,666,981 A | 5/1972 | Lay | |
| 3,674,461 A | 7/1972 | Farrand et al. | |
| 3,699,050 A | 10/1972 | Henderson | |
| 3,755,027 A | 8/1973 | Gilsing | |
| 3,769,543 A | 10/1973 | Pennebaker | |

(Continued)

FOREIGN PATENT DOCUMENTS

JP   11162358 A   *   6/1999

(Continued)

*Primary Examiner*—Mariceli Santiago
(74) *Attorney, Agent, or Firm*—Donald K. Wedding

(57) ABSTRACT

A PDP constructed out of one or more plasma-shells with an organic luminescent substance(s) located in close proximity to each plasma-shell. Each plasma-shell is a hollow geometric body filled with an ionizable gas. Photons from the gas discharge inside the plasma-shell excite the luminescent substance. In one embodiment the luminescent substance is located on the external surface of the plasma-shell. In another embodiment, the luminescent substance is located inside the plasma-shell. The plasma-shell may be made of an inorganic luminescent material with organic luminescent material located on the inside or outside of the plasma-shell. Plasma-shell includes plasma-sphere, plasma-disc, and plasma-dome. The plasma-shell may be used in combination with a plasma-tube.

27 Claims, 25 Drawing Sheets

U.S. PATENT DOCUMENTS

| | | |
|---|---|---|
| 3,792,136 A | 2/1974 | Schmitt |
| 3,793,041 A | 2/1974 | Sowman |
| 3,794,503 A | 2/1974 | Netting |
| 3,796,777 A | 3/1974 | Netting |
| 3,811,061 A | 5/1974 | Nakayama et al. |
| 3,838,307 A | 9/1974 | Masi |
| 3,838,998 A | 10/1974 | Matthews et al. |
| 3,848,248 A | 11/1974 | MacIntyre |
| 3,855,951 A | 12/1974 | Giles |
| 3,860,846 A | 1/1975 | Mayer |
| 3,873,870 A | 3/1975 | Fukushima et al. |
| 3,885,195 A | 5/1975 | Amano |
| 3,886,395 A | 5/1975 | Eukushima et al. |
| 3,888,957 A | 6/1975 | Netting |
| 3,916,584 A | 11/1975 | Howard et al. |
| 3,927,181 A | 12/1975 | Niimi et al. |
| 3,927,342 A | 12/1975 | Bode et al. |
| 3,933,679 A | 1/1976 | Weitzel et al. |
| 3,935,494 A | 1/1976 | Dick et al. |
| 3,939,822 A | 2/1976 | Markowitz |
| 3,954,678 A | 5/1976 | Marquisee |
| 3,964,050 A | 6/1976 | Mayer |
| 3,969,718 A | 7/1976 | Strom |
| 3,975,194 A | 8/1976 | Farnand et al. |
| 3,990,068 A | 11/1976 | Mayer et al. |
| 3,998,618 A | 12/1976 | Kreick et al. |
| 4,001,628 A * | 1/1977 | Ryan ........................ 313/487 |
| 4,017,290 A | 4/1977 | Budrick et al. |
| 4,021,253 A | 5/1977 | Budrick et al. |
| 4,027,188 A | 5/1977 | Bergman |
| 4,027,191 A | 5/1977 | Schaufele et al. |
| 4,035,690 A | 7/1977 | Roeber |
| 4,038,577 A | 7/1977 | Bode et al. |
| 4,048,533 A | 9/1977 | Hinson et al. |
| 4,059,423 A | 11/1977 | De Vos et al. |
| 4,075,025 A | 2/1978 | Rostoker |
| 4,106,009 A | 8/1978 | Dick |
| 3,607,169 A | 9/1978 | Coxe |
| 4,111,713 A | 9/1978 | Beck |
| 4,119,422 A | 10/1978 | Rostoker |
| 4,126,807 A | 11/1978 | Wedding et al. |
| 4,126,809 A | 11/1978 | Wedding et al. |
| 4,133,854 A | 1/1979 | Hendricks |
| 4,163,637 A | 8/1979 | Hendricks |
| 4,164,678 A | 8/1979 | Biazzo et al. |
| 4,166,147 A | 8/1979 | Lange et al. |
| 4,257,798 A | 3/1981 | Hendricks et al. |
| 4,279,632 A | 7/1981 | Frosch et al. |
| 4,290,847 A | 9/1981 | Johnson et al. |
| 4,303,061 A | 12/1981 | Torobin |
| 4,303,431 A | 12/1981 | Torobin |
| 4,303,432 A | 12/1981 | Torobin |
| 4,303,433 A | 12/1981 | Torobin |
| 4,303,603 A | 12/1981 | Torobin |
| 4,303,729 A | 12/1981 | Torobin |
| 4,303,730 A | 12/1981 | Torobin |
| 4,303,731 A | 12/1981 | Torobin |
| 4,303,732 A | 12/1981 | Torobin |
| 4,303,736 A | 12/1981 | Torobin |
| 4,307,051 A | 12/1981 | Sargeant et al. |
| 4,314,827 A | 2/1982 | Leitheiser et al. |
| 4,322,378 A | 3/1982 | Hendricks |
| 4,340,642 A | 7/1982 | Netting et al. |
| 4,344,787 A | 8/1982 | Beggs et al. |
| 4,349,456 A | 9/1982 | Sowman |
| 4,356,429 A | 10/1982 | Tang |
| 4,363,646 A | 12/1982 | Torobin |
| 4,391,646 A | 7/1983 | Howell |
| 4,392,988 A | 7/1983 | Dobson et al. |
| 4,415,512 A | 11/1983 | Torobin |
| 4,459,145 A | 7/1984 | Elsholz |
| 4,494,038 A | 1/1985 | Wedding et al. |
| 4,525,314 A | 6/1985 | Torobin |
| 4,542,066 A | 9/1985 | Delzant |
| 4,547,233 A | 10/1985 | Delzant |
| 4,548,196 A | 10/1985 | Torobin |
| 4,548,767 A | 10/1985 | Hendricks |
| 4,563,617 A | 1/1986 | Davidson |
| 4,568,389 A | 2/1986 | Torobin |
| 4,582,534 A | 4/1986 | Torobin |
| 4,596,681 A | 6/1986 | Grossman et al. |
| 4,618,525 A | 10/1986 | Chamberlain et al. |
| 4,637,990 A | 1/1987 | Torobin |
| 4,638,218 A | 1/1987 | Shinoda et al. |
| 4,671,909 A | 6/1987 | Torobin |
| 4,713,300 A | 12/1987 | Sowman et al. |
| 4,737,687 A | 4/1988 | Shinoda et al. |
| 4,743,511 A | 5/1988 | Sowman et al. |
| 4,743,545 A | 5/1988 | Torobin |
| 4,744,831 A | 5/1988 | Beck |
| 4,757,036 A | 7/1988 | Kaar et al. |
| 4,775,598 A | 10/1988 | Jaeckel |
| 4,777,154 A | 10/1988 | Torobin |
| 4,778,502 A | 10/1988 | Garnier et al. |
| 4,782,097 A | 11/1988 | Jain et al. |
| 4,793,980 A | 12/1988 | Torobin |
| 4,797,378 A | 1/1989 | Sowman |
| 4,800,180 A | 1/1989 | McAllister et al. |
| 4,853,590 A | 8/1989 | Andreadakis |
| 4,859,711 A | 8/1989 | Jain et al. |
| 4,865,875 A | 9/1989 | Kellerman |
| 4,879,321 A | 11/1989 | Laroche |
| 4,883,779 A | 11/1989 | McAllister et al. |
| 4,917,857 A | 4/1990 | Jaeckel et al. |
| 4,948,573 A | 8/1990 | Nadkarni et al. |
| 4,960,351 A | 10/1990 | Kendall et al. |
| 4,963,792 A | 10/1990 | Parker |
| 5,017,316 A | 5/1991 | Sowman |
| 5,053,436 A | 10/1991 | Delgado |
| 5,055,240 A | 10/1991 | Lee et al. |
| 5,069,702 A | 12/1991 | Block et al. |
| 5,077,241 A | 12/1991 | Moh et al. |
| 5,114,695 A | 5/1992 | Jain et al. |
| 5,176,732 A | 1/1993 | Block et al. |
| 5,185,299 A | 2/1993 | Wood et al. |
| 5,198,479 A | 3/1993 | Shiobara et al. |
| 5,212,143 A | 5/1993 | Torobin |
| 5,225,123 A | 7/1993 | Torobin |
| 5,246,683 A | 9/1993 | Parent et al. |
| 5,260,002 A | 11/1993 | Wang |
| 5,326,298 A | 7/1994 | Hotomi |
| 5,397,759 A | 3/1995 | Torobin |
| 5,487,390 A | 1/1996 | Cohen et al. |
| 5,500,287 A | 3/1996 | Henderson |
| 5,501,871 A | 3/1996 | Henderson |
| 5,534,348 A | 7/1996 | Miller et al. |
| 5,625,256 A | 4/1997 | Tiedt et al. |
| 5,644,327 A | 7/1997 | Onyskevych et al. |
| 5,793,158 A | 8/1998 | Wedding |
| 5,932,968 A | 8/1999 | Ghosh et al. |
| 5,939,826 A | 8/1999 | Ohsawa et al. |
| 5,984,747 A | 11/1999 | Bhagavatula et al. |
| 6,149,072 A | 11/2000 | Tseng |
| 6,176,584 B1 | 1/2001 | Best et al. |
| 6,208,791 B1 | 3/2001 | Bischel et al. |
| 6,255,777 B1 | 7/2001 | Kim et al. |
| 6,368,708 B1 | 4/2002 | Brown et al. |
| 6,377,387 B1 | 4/2002 | Duthaler et al. |
| 6,402,985 B1 | 6/2002 | Hsu et al. |
| 6,545,422 B1 | 4/2003 | George et al. |
| 6,570,335 B1 | 5/2003 | George et al. |
| 6,612,889 B1 | 9/2003 | Green et al. |
| 6,620,012 B1 | 9/2003 | Johnson et al. |
| 6,633,117 B2 | 10/2003 | Shinoda et al. |

| | | |
|---|---|---|
| 6,646,388 B2 | 11/2003 | George et al. |
| 6,650,055 B2 | 11/2003 | Ishimoto et al. |
| 6,677,704 B2 | 1/2004 | Ishimoto et al. |
| 6,762,566 B1 | 7/2004 | George et al. |
| 6,764,367 B2 | 7/2004 | Green et al. |
| 6,791,264 B2 | 9/2004 | Green et al. |
| 6,794,812 B2 | 9/2004 | Yamada et al. |
| 6,796,867 B2 | 9/2004 | George et al. |
| 6,801,001 B2 | 10/2004 | Drobot et al. |
| 6,822,626 B2 | 11/2004 | George et al. |
| 6,836,063 B2 | 12/2004 | Ishimoto et al. |
| 6,836,064 B2 | 12/2004 | Yamada et al. |
| 6,841,929 B2 | 1/2005 | Ishimoto et al. |
| 6,857,923 B2 | 2/2005 | Yamada et al. |
| 6,864,631 B1 | 3/2005 | Wedding |
| 6,893,677 B2 | 5/2005 | Yamada et al. |
| 6,902,456 B2 | 6/2005 | George et al. |
| 6,914,382 B2 | 7/2005 | Ishimoto et al. |
| 6,930,442 B2 | 8/2005 | Awamoto et al. |
| 6,932,664 B2 | 8/2005 | Yamada et al. |
| 6,935,913 B2 | 8/2005 | Wyeth et al. |
| 6,969,292 B2 | 11/2005 | Tokai et al. |
| 6,975,068 B2 | 12/2005 | Green et al. |
| 7,005,793 B2 | 2/2006 | George et al. |
| 7,025,648 B2 | 4/2006 | Green et al. |
| 7,049,748 B2 | 5/2006 | Tokai et al. |
| 7,083,681 B2 | 8/2006 | Yamada et al. |
| 7,122,961 B1 | 10/2006 | Wedding |
| 7,125,305 B2 | 10/2006 | Green et al. |
| 7,135,767 B2 | 11/2006 | Wong et al. |
| 7,137,857 B2 | 11/2006 | George et al. |
| 7,140,941 B2 | 11/2006 | Green et al. |
| 7,157,854 B1 | 1/2007 | Wedding |
| 7,176,628 B1 | 2/2007 | Wedding |
| 7,247,989 B1 | 7/2007 | Wedding |
| 7,288,014 B1 | 10/2007 | George et al. |
| 7,307,602 B1 | 12/2007 | Wedding et al. |
| 7,375,342 B1 | 5/2008 | Wedding |
| 7,405,516 B1 | 7/2008 | Wedding |
| 7,456,571 B1 | 11/2008 | Wedding |
| 2001/0028216 A1 | 10/2001 | Tokai et al. |
| 2002/0004111 A1 | 1/2002 | Matsubara et al. |
| 2002/0030437 A1 | 3/2002 | Shimizu et al. |
| 2002/0041156 A1 | 4/2002 | Juestel et al. |
| 2002/0101151 A1 | 8/2002 | Choi et al. |
| 2002/0106501 A1 | 8/2002 | Debe |
| 2003/0122485 A1 | 7/2003 | Tokai et al. |
| 2003/0164684 A1 | 9/2003 | Green et al. |
| 2003/0182967 A1 | 10/2003 | Tokai et al. |
| 2003/0184212 A1 | 10/2003 | Ishimoto et al. |
| 2003/0214243 A1 | 11/2003 | Drobot et al. |
| 2004/0033319 A1 | 2/2004 | Yamada et al. |
| 2004/0063373 A1 | 4/2004 | Johnson et al. |
| 2004/0149943 A1 | 8/2004 | Field |
| 2004/0175854 A1 | 9/2004 | George et al. |
| 2004/0234902 A1 | 11/2004 | Toyoda et al. |
| 2005/0022905 A1 | 2/2005 | Wong et al. |
| 2005/0095944 A1 | 5/2005 | George et al. |
| 2006/0097620 A1 | 5/2006 | George et al. |
| 2006/0158112 A1 | 7/2006 | Hur et al. |
| 2006/0202309 A1 | 9/2006 | Wong et al. |
| 2007/0015431 A1 | 1/2007 | Green et al. |

FOREIGN PATENT DOCUMENTS

JP          11238464 A  *  8/1999

* cited by examiner

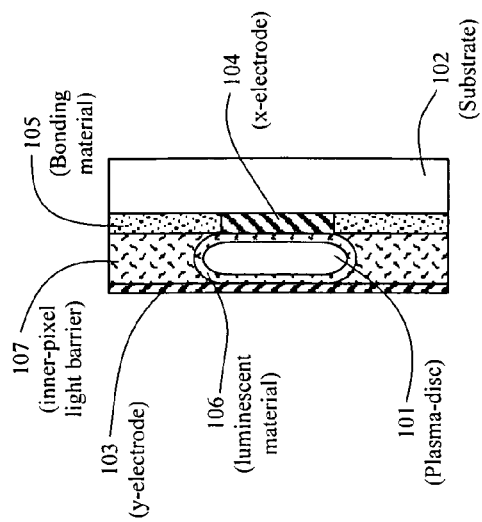
Fig. 1
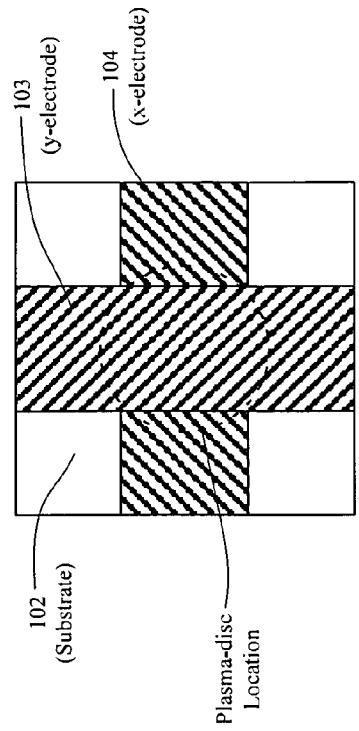
Fig. 1B
Fig. 1C
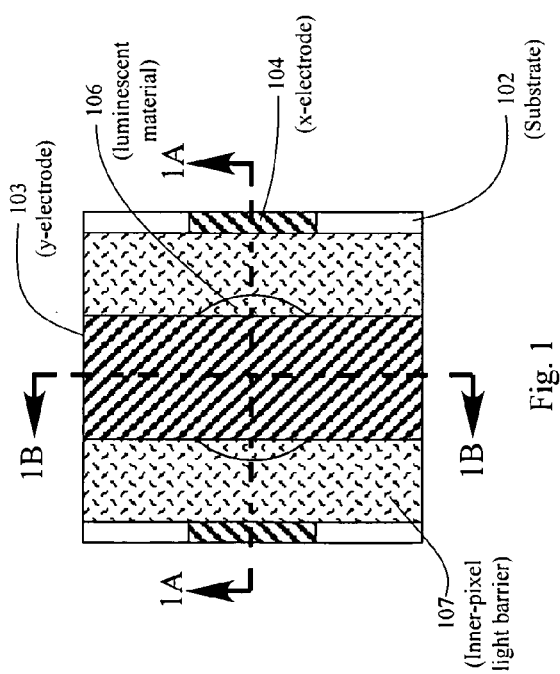
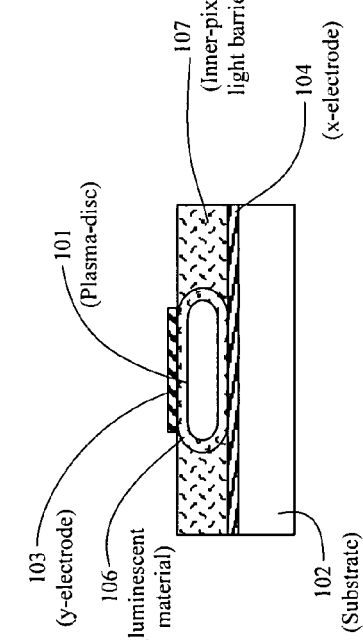
Fig. 1A

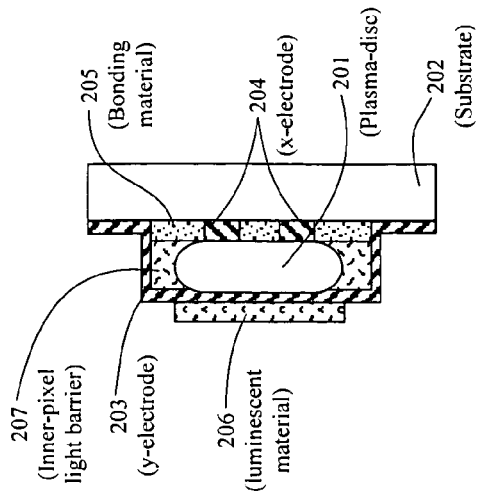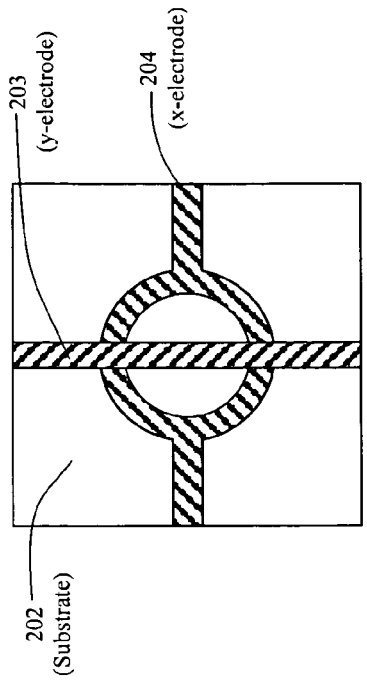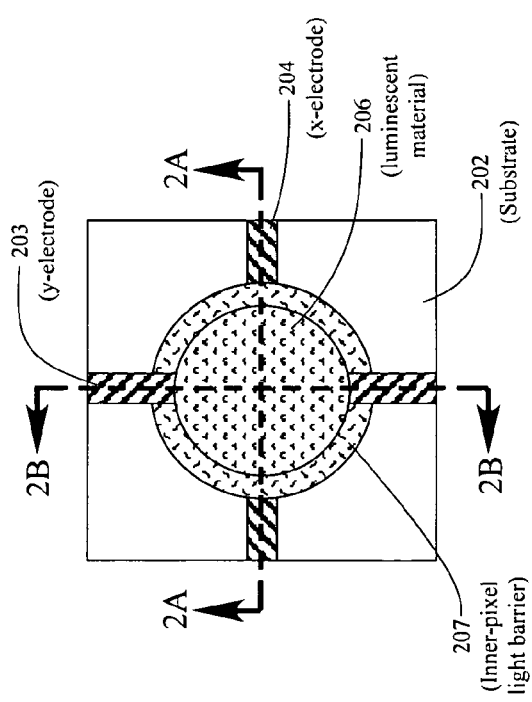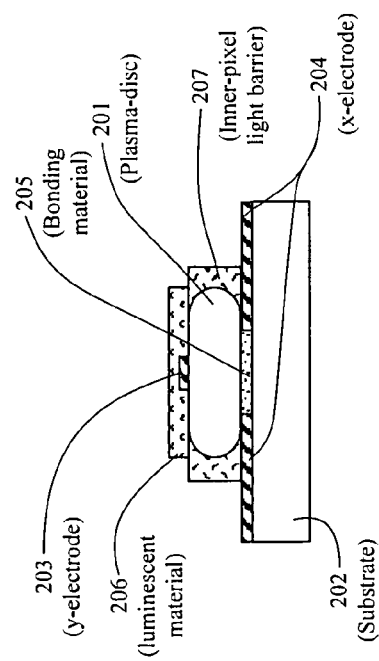
Fig. 2
Fig. 2A
Fig. 2B
Fig. 2C

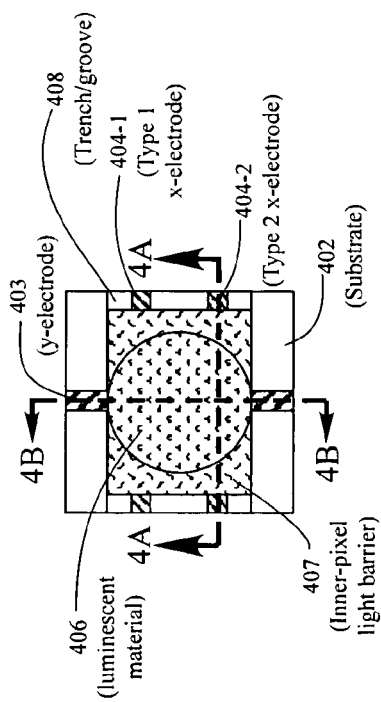
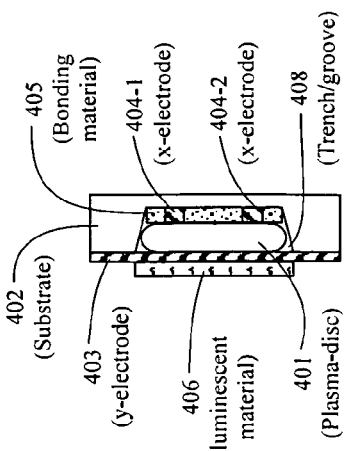
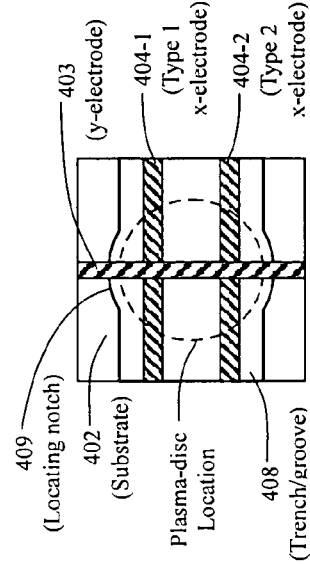
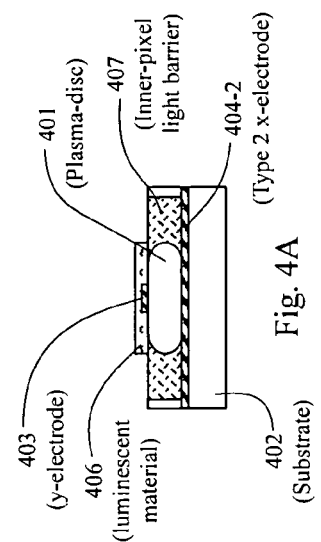
Fig. 4
Fig. 4A
Fig. 4B
Fig. 4C

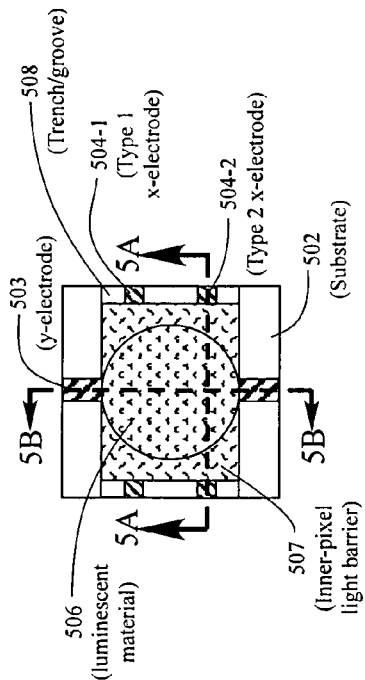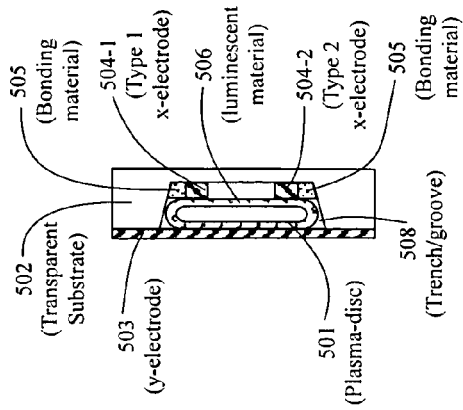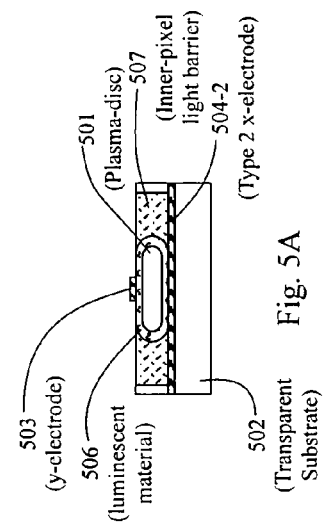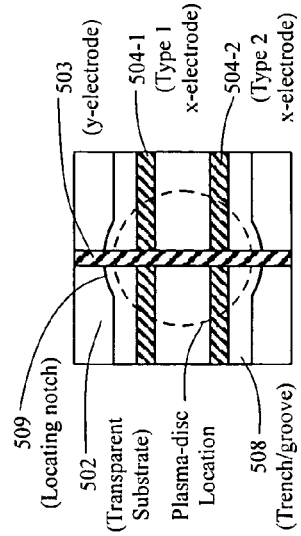

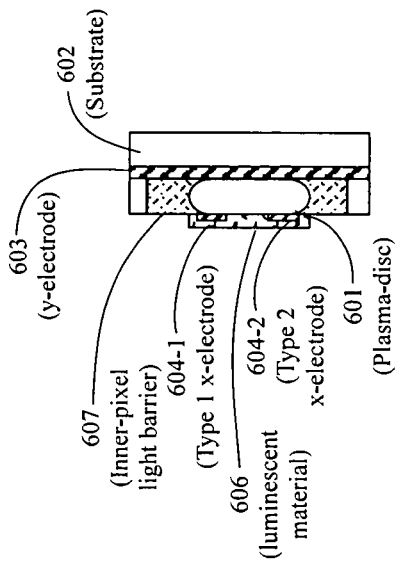
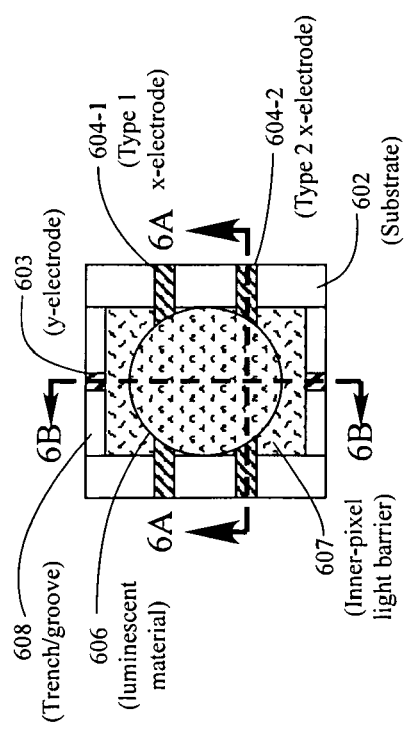
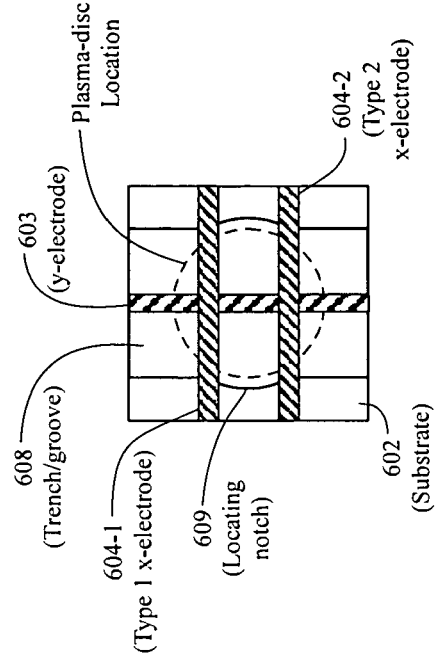
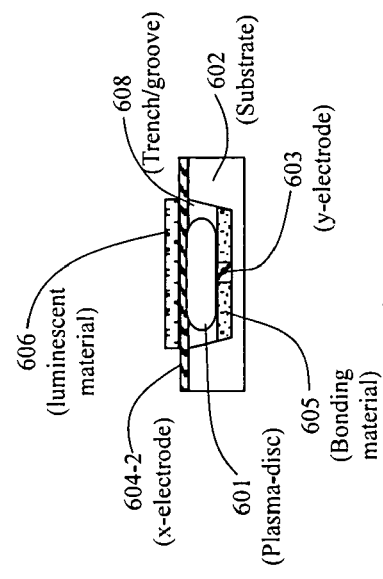
Fig. 6
Fig. 6A
Fig. 6B
Fig. 6C

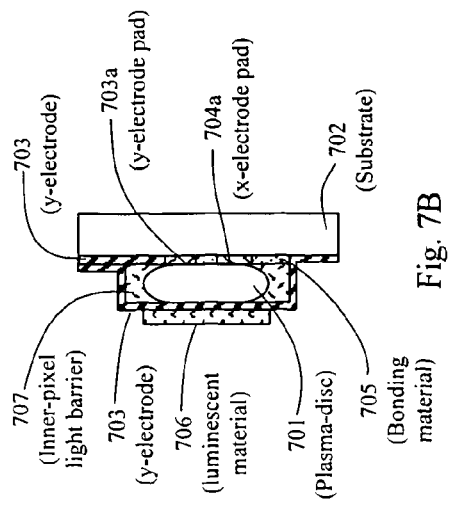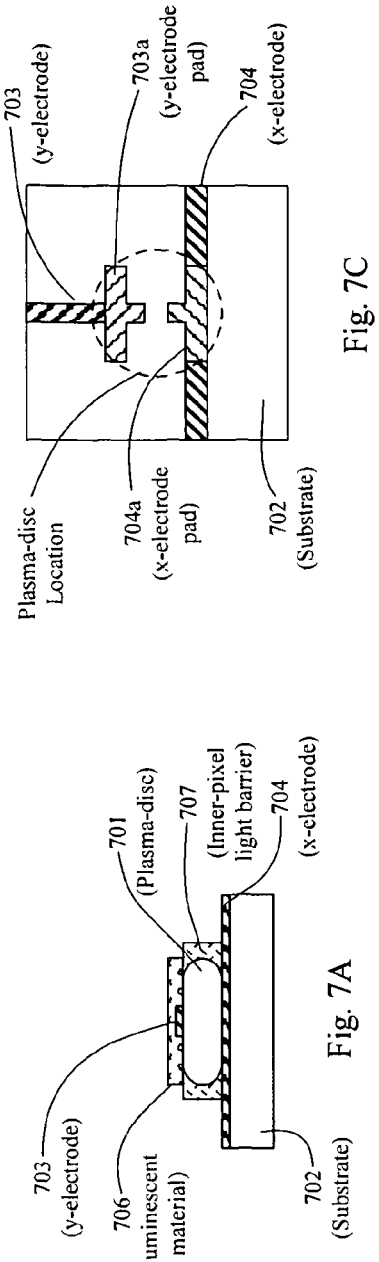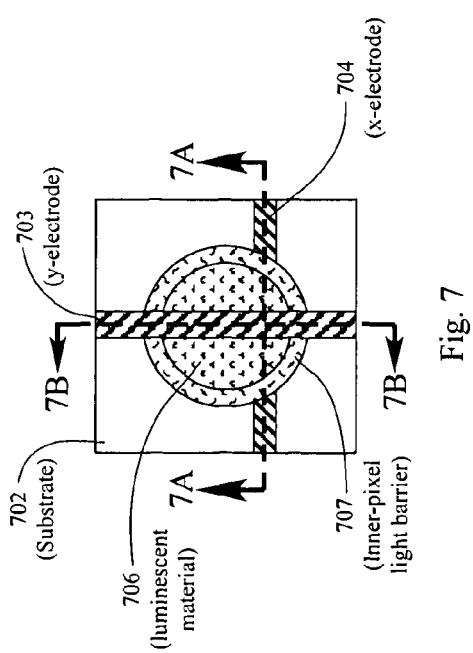

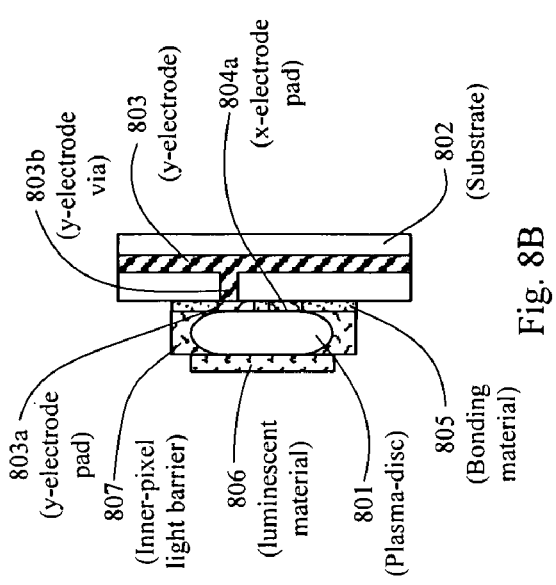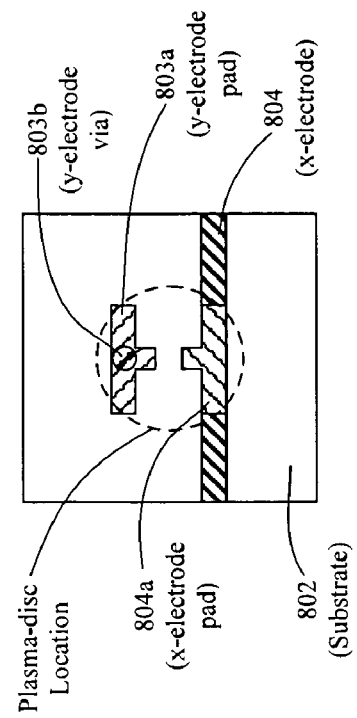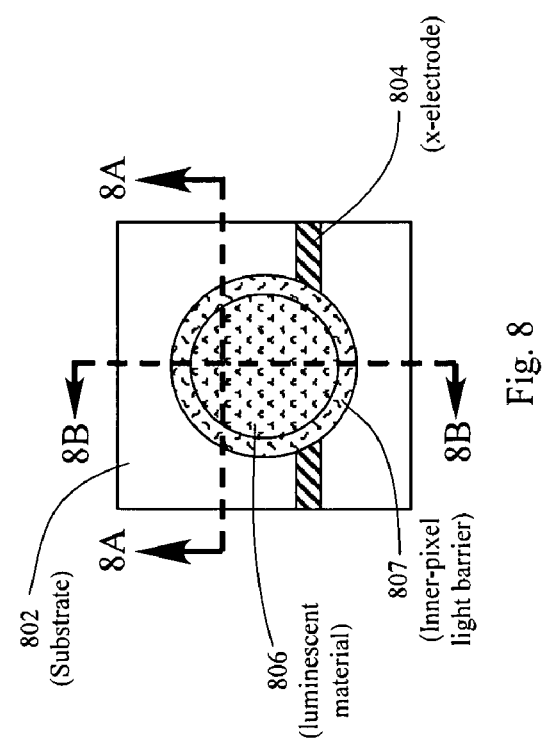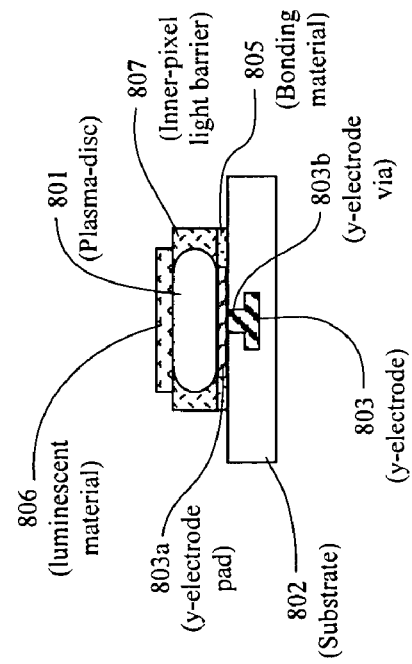

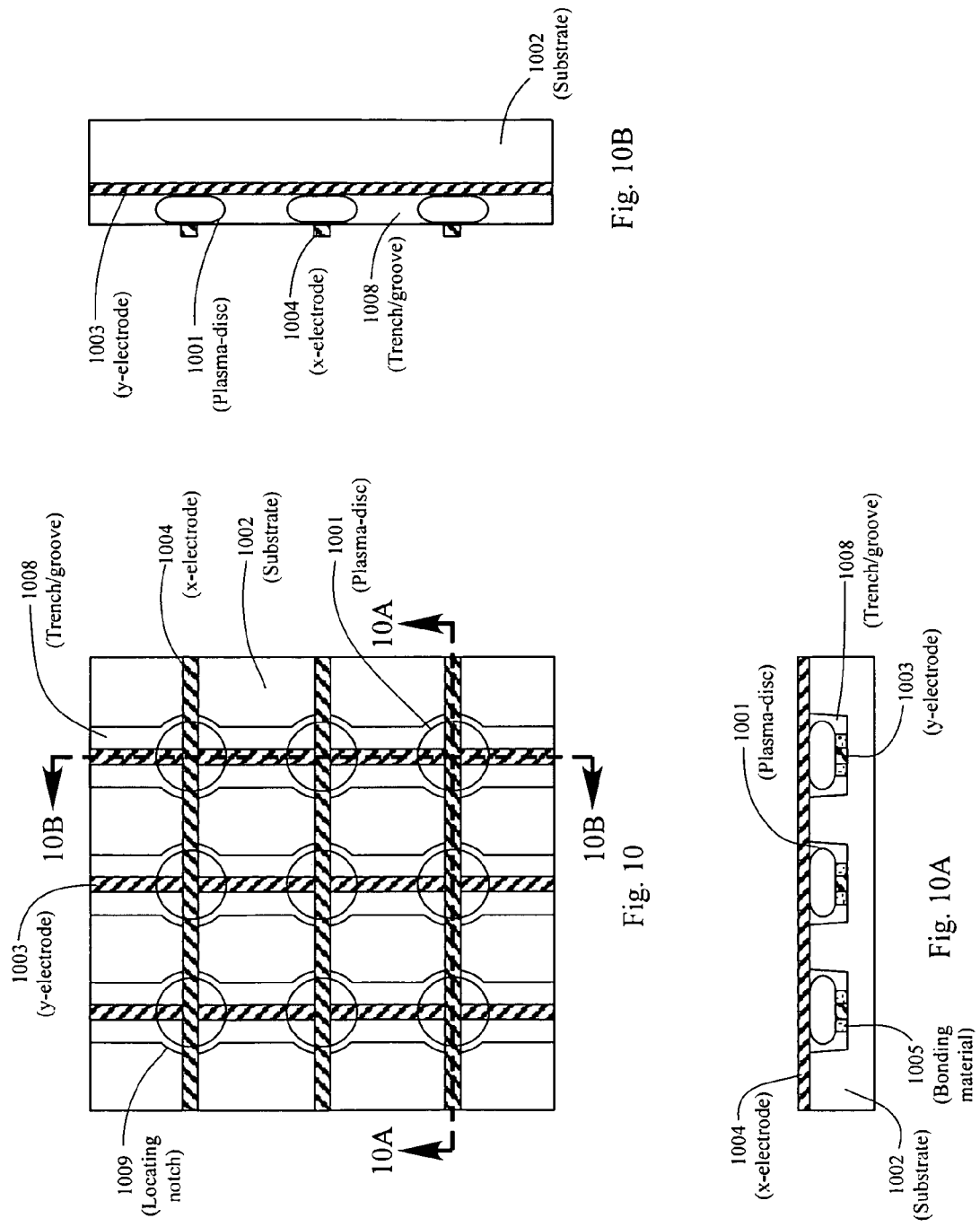

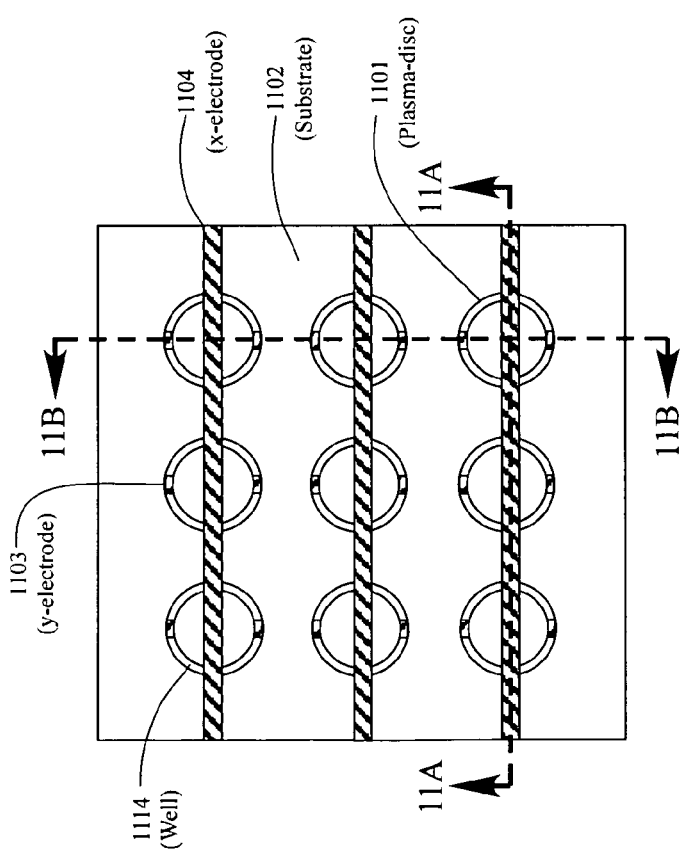
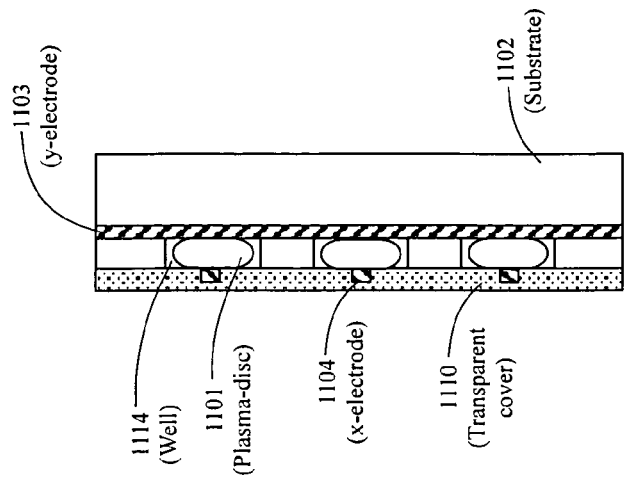
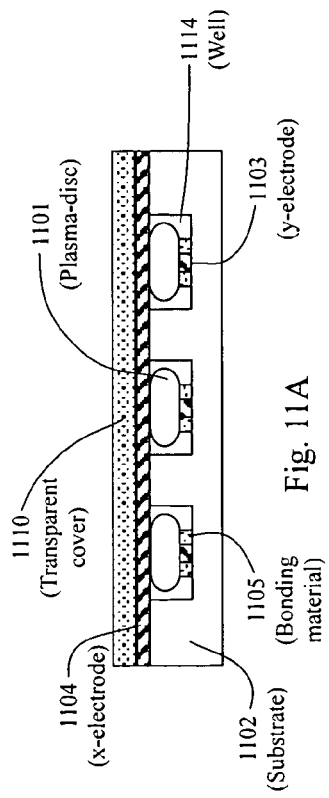
Fig. 11
Fig. 11A
Fig. 11B

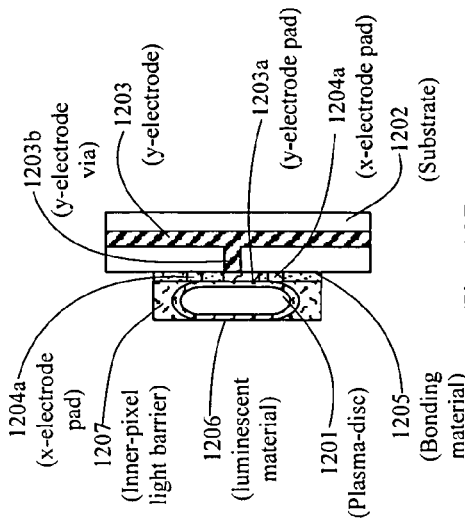
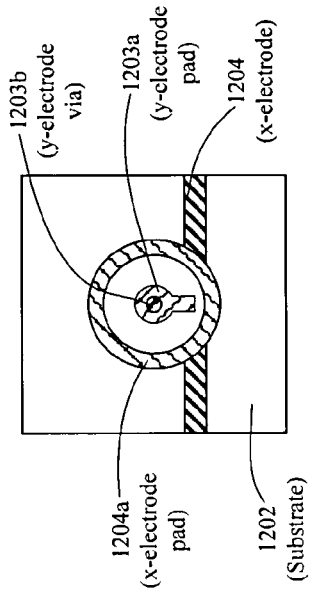
Fig. 12B
Fig. 12C
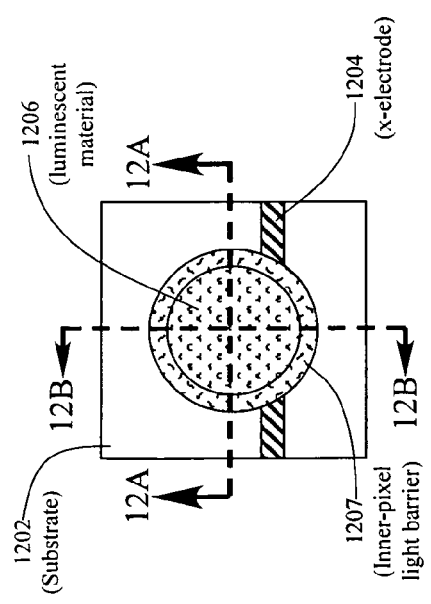
Fig. 12
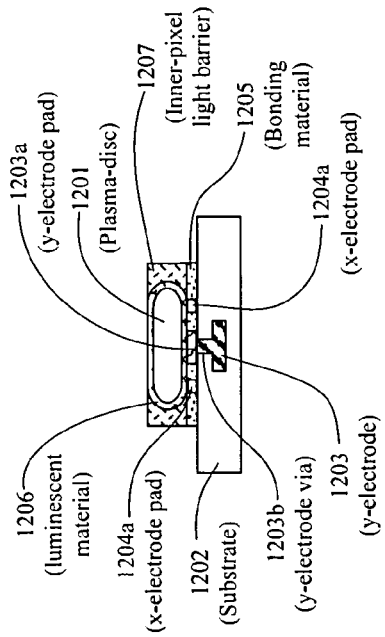
Fig. 12A

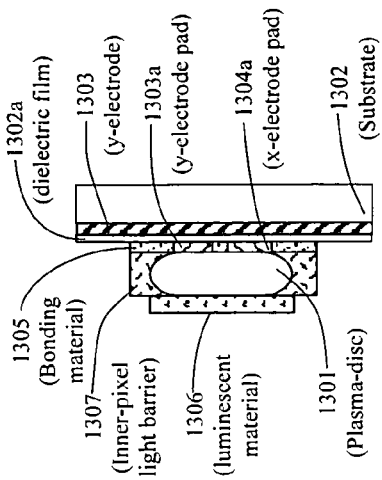
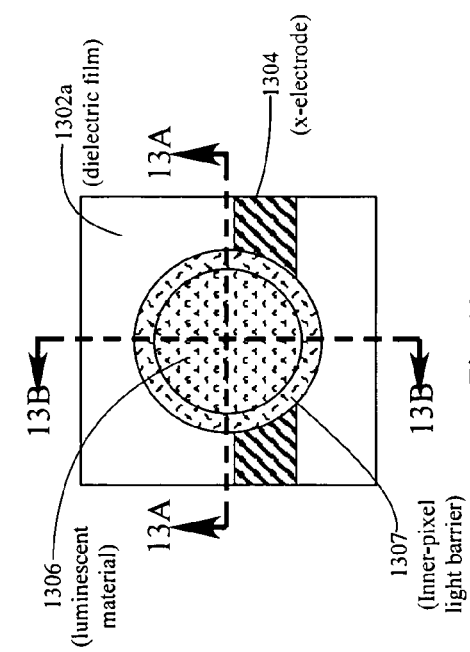
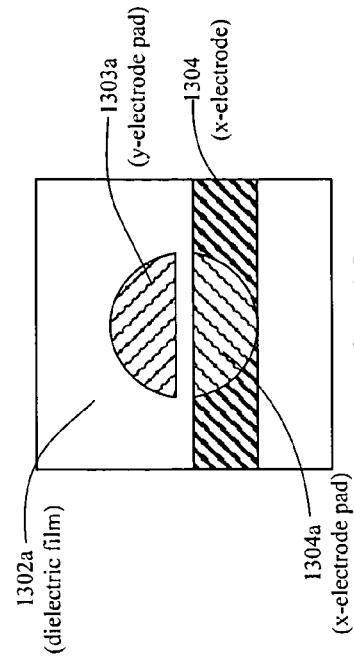
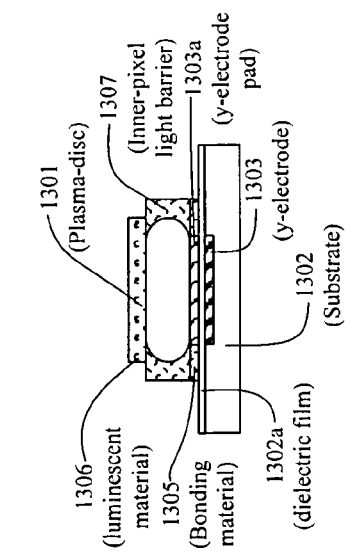

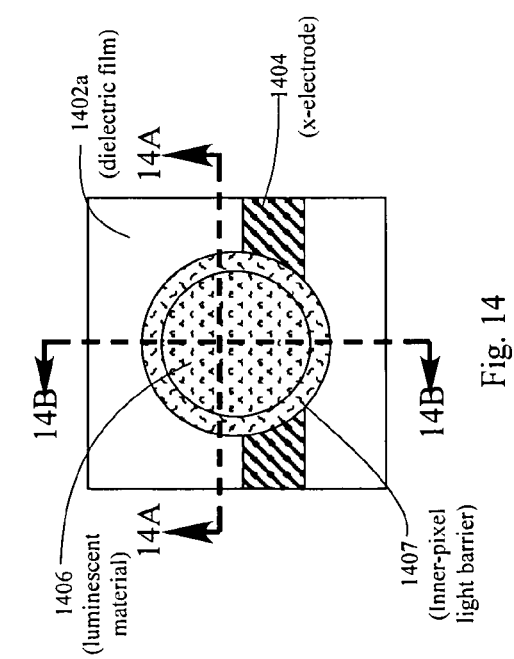
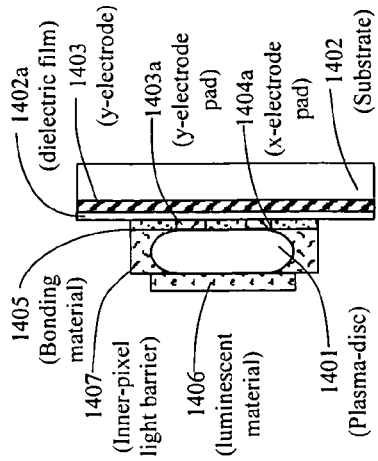
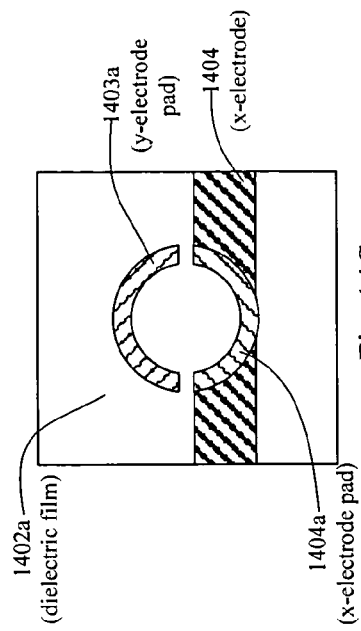
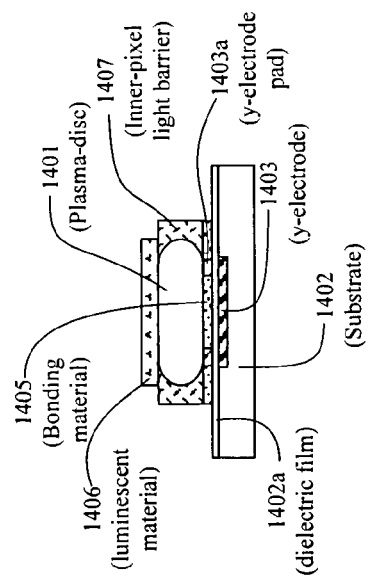
Fig. 14
Fig. 14A
Fig. 14B
Fig. 14C

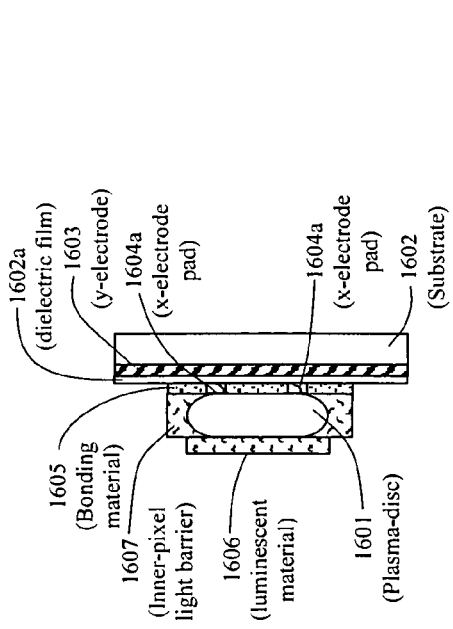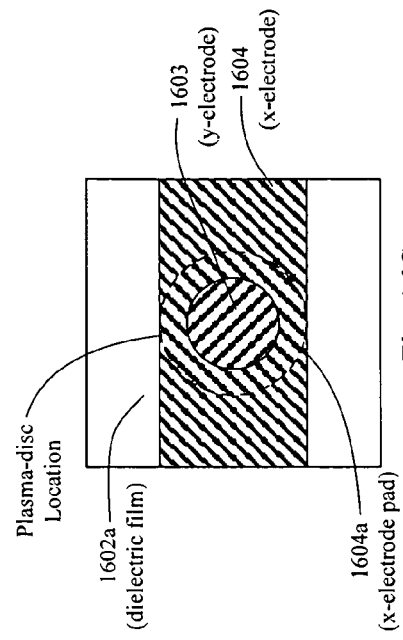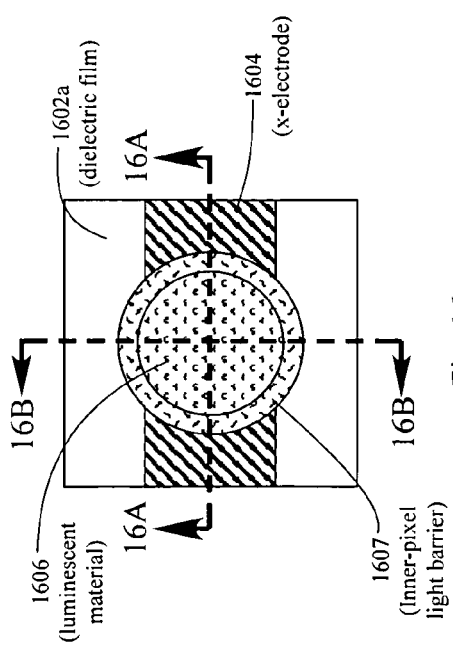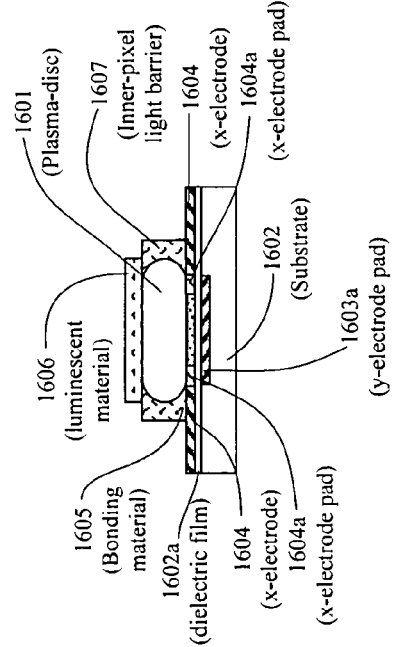
Fig. 16
Fig. 16A
Fig. 16B
Fig. 16C

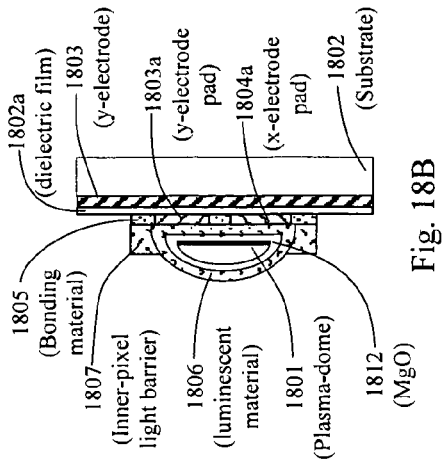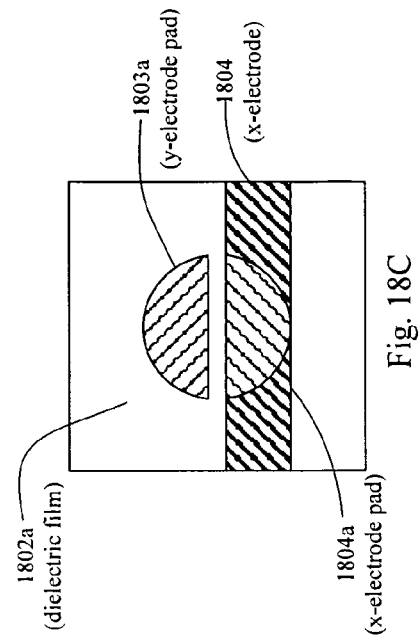
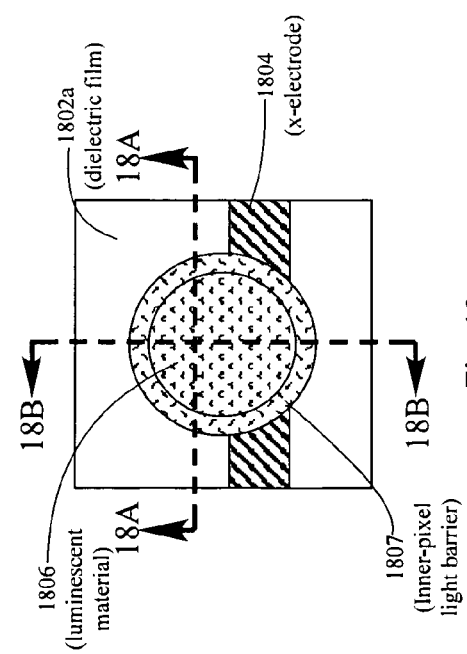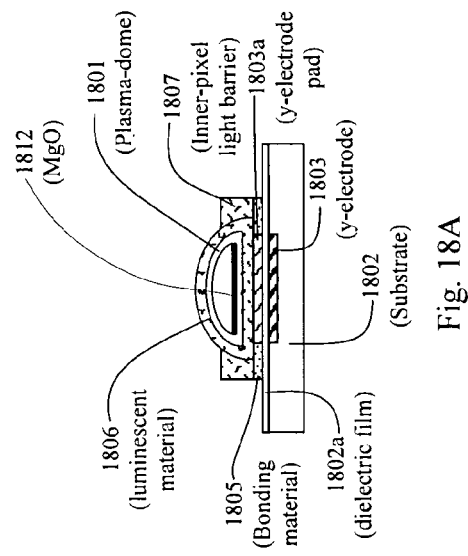
Fig. 18
Fig. 18A
Fig. 18B
Fig. 18C

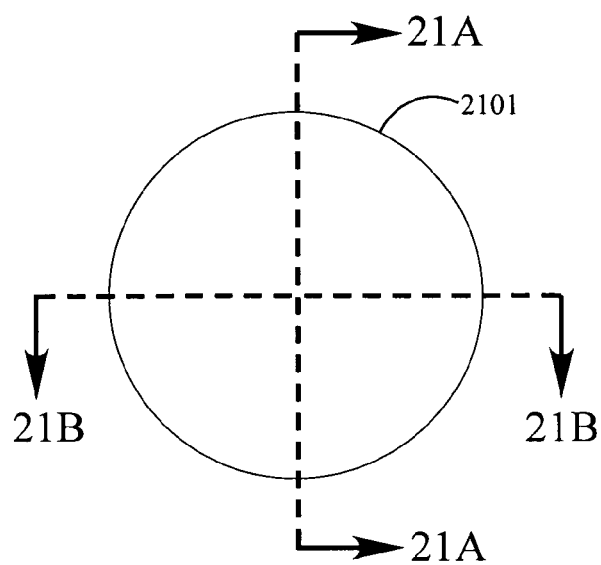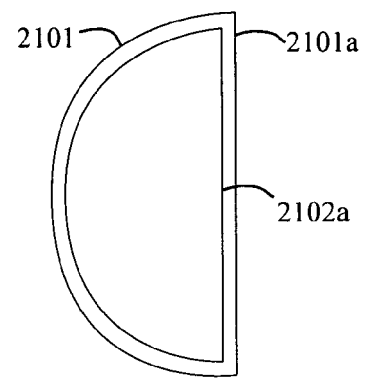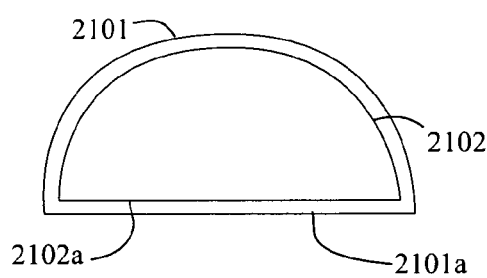
Fig. 21
Fig. 21A
Fig. 21B

METHOD OF FABRICATING A PLASMA-SHELL PDP WITH COMBINED ORGANIC AND INORGANIC LUMINESCENT SUBSTANCES

RELATED APPLICATIONS

This application is a division and a continuation-in-part under 35 U.S.C. 120 of U.S. patent application Ser. No. 11/107,964, filed Apr. 18, 2005 now U.S. Pat. No. 7,405,516 with priority claimed under 35 U.S.C. 119(e) for Provisional Patent Application Ser. No. 60/564,942, filed Apr. 26, 2004.

FIELD OF THE INVENTION

This invention relates to a plasma display panel (PDP) constructed out of one or more plasma-shells with an organic luminescent substance located in close proximity to each plasma-shell, the organic substance being excited by photons from a gas discharge within the plasma-shell. The PDP comprises one or more plasma-shells on or within a rigid or flexible substrate with each plasma-shell being electrically connected to at least two electrical conductors such as electrodes.

As used herein, plasma-shell includes plasma-disc, plasma-dome, and plasma-sphere. Combinations of different plasma-shells may be used. The hollow plasma-shell is filled with an ionizable gas and used as a pixel or subpixel in a gas discharge plasma display panel (PDP) device. This invention is particularly disclosed herein with reference to the use of a plasma-disc. Combination of plasma-shell may be used with plasma-tubes.

BACKGROUND OF INVENTION

PDP Structures and Operation

In a gas discharge plasma display panel (PDP), a single addressable picture element is a cell, sometimes referred to as a pixel. In a multicolor PDP, two or more cells or pixels may be addressed as sub-cells or sub-pixels to form a single cell or pixel. As used herein cell or pixel means sub-cell or sub-pixel. The cell or pixel element is defined by two or more electrodes positioned in such a way so as to provide a voltage potential across a gap containing an ionizable gas. When sufficient voltage is applied across the gap, the gas ionizes to produce light. In an AC gas discharge plasma display, the electrodes at a cell site are coated with a dielectric. The electrodes are generally grouped in a matrix configuration to allow for selective addressing of each cell or pixel.

To form a display image, several types of voltage pulses may be applied across a plasma display cell gap. These pulses include a write pulse, which is the voltage potential sufficient to ionize the gas at the pixel site. A write pulse is selectively applied across selected cell sites to cause a gas discharge at the cell. The ionized gas will produce visible light, UV light and/or IR light which excites a phosphor to glow. Sustain pulses are a series of pulses that produce a voltage potential across pixels to maintain gas discharge of cells previously addressed with a write pulse. An erase pulse is used to selectively extinguish ionized pixels.

The voltage at which a pixel will ionize, sustain, and erase depends on a number of factors including the distance between the electrodes, the composition of the ionizing gas, and the pressure of the ionizing gas. Also of importance is the dielectric composition and thickness. To maintain uniform electrical characteristics throughout the display it is desired that the various physical parameters adhere to required tolerances. Maintaining the required tolerance depends on cell geometry, fabrication methods, and the materials used. The prior art discloses a variety of plasma display structures, a variety of methods of construction, and materials.

Examples of open cell gas discharge (plasma) devices include both monochrome (single color) AC plasma displays and multi-color (two or more colors) AC plasma displays. Also monochrome and multicolor DC plasma displays are contemplated.

Examples of monochrome AC gas discharge (plasma) displays are well known in the prior art and include those disclosed in U.S. Pat. Nos. 3,559,190 (Bitzer et al.), 3,499,167 (Baker et al.), 3,860,846 (Mayer), 3,964,050 (Mayer), 4,080,597 (Mayer), 3,646,384 (Lay), and 4,126,807 (Wedding), all incorporated herein by reference.

Examples of multicolor AC plasma displays are well known in the prior art and include those disclosed in U.S. Pat. Nos. 4,233,623 (Pavliscak), 4,320,418 (Pavliscak), 4,827,186 (Knauer et al.), 5,661,500 (Shinoda et al.), 5,674,553 (Shinoda et al.), 5,107,182 (Sano et al.), 5,182,489 (Sano), 5,075,597 (Salavin et al.), 5,742,122 (Amemiya et al.), 5,640,068 (Amemiya et al.), 5,736,815 (Amemiya), 5,541,479 (Nagakubi), 5,745,086 (Weber), and 5,793,158 (Wedding), all incorporated herein by reference.

This invention may be practiced in a DC gas discharge (plasma) display which is well known in the prior art, for example as disclosed in U.S. Pat. Nos. 3,886,390 (Maloney et al.), 3,886,404 (Kurahashi et al.), 4,035,689 (Ogle et al.), and 4,532,505 (Holz et al.), all incorporated herein by reference.

This invention will be described with reference to an AC plasma display. The PDP industry has used two different AC plasma display panel (PDP) structures, the two-electrode columnar discharge structure, and the three-electrode surface discharge structure. Columnar discharge is also called co-planar discharge.

Columnar PDP

The two-electrode columnar or co-planar discharge plasma display structure is disclosed in U.S. Pat. Nos. 3,499,167 (Baker et al.) and 3,559,190 (Bitzer et al.). The two-electrode columnar discharge structure is also referred to as opposing electrode discharge, twin substrate discharge, or co-planar discharge. In the two-electrode columnar discharge AC plasma display structure, the sustaining voltage is applied between an electrode on a rear or bottom substrate and an opposite electrode on the front or top viewing substrate. The gas discharge takes place between the two opposing electrodes in between the top viewing substrate and the bottom substrate.

The columnar discharge PDP structure has been widely used in monochrome AC plasma displays that emit orange or red light from a neon gas discharge. Phosphors may be used in a monochrome structure to obtain a color other than neon orange.

In a multi-color columnar discharge PDP structure as disclosed in U.S. Pat. No. 5,793,158 (Wedding), phosphor stripes, or layers are deposited along the barrier walls and/or on the bottom substrate adjacent to and extending in the same direction as the bottom electrode. The discharge between the two opposite electrodes generates electrons and ions that bombard and deteriorate the phosphor thereby shortening the life of the phosphor and the PDP.

In a two electrode columnar discharge PDP as disclosed by Wedding ('158), each light emitting pixel is defined by a gas discharge between a bottom or rear electrode x and a top or front opposite electrode y, each cross-over of the two opposing arrays of bottom electrodes x and top electrodes y defining a pixel or cell.

Surface Discharge PDP

The three-electrode multi-color surface discharge AC plasma display panel structure is widely disclosed in the prior art including U.S. Pat. Nos. 5,661,500 and 5,674,553, both issued to Tsutae Shinoda et al. of Fujitsu Limited; U.S. Pat. No. 5,745,086 issued to Larry F. Weber of Plasmaco and Matsushita; and U.S. Pat. No. 5,736,815 issued to Kimio Amemiya of Pioneer Electronic Corporation, all incorporated herein by reference.

In a surface discharge PDP, each light emitting pixel or cell is defined by the gas discharge between two electrodes on the top substrate. In a multi-color RGB display, the pixels may be called sub-pixels or sub-cells. Photons from the discharge of an ionizable gas at each pixel or sub-pixel excite a photoluminescent phosphor that emits red, blue, or green light.

In a three-electrode surface discharge AC plasma display, a sustaining voltage is applied between a pair of adjacent parallel electrodes that are on the front or top viewing substrate. These parallel electrodes are called the bulk sustain electrode and the row scan electrode. The row scan electrode is also called a row sustain electrode because of its dual functions of address and sustain. The opposing electrode on the rear or bottom substrate is a column data electrode and is used to periodically address a row scan electrode on the top substrate. The sustaining voltage is applied to the bulk sustain and row scan electrodes on the top substrate. The gas discharge takes place between the row scan and bulk sustain electrodes on the top viewing substrate.

In a three-electrode surface discharge AC plasma display panel, the sustaining voltage and resulting gas discharge occurs between the electrode pairs on the top or front viewing substrate above and remote from the phosphor on the bottom substrate. This separation of the discharge from the phosphor minimizes electron bombardment and deterioration of the phosphor deposited on the walls of the barriers or in the grooves (or channels) on the bottom substrate adjacent to and/or over the third (data) electrode. Because the phosphor is spaced from the discharge between the two electrodes on the top substrate, the phosphor is subject to less electron bombardment than in a columnar discharge PDP.

Single Substrate PDP

There may be used a PDP structure having a so-called single substrate or monolithic plasma display panel structure having one substrate with or without a top or front viewing envelope or dome. Single-substrate or monolithic plasma display panel structures are well known in the prior art and are disclosed by U.S. Pat. Nos. 3,646,384 (Lay), 3,652,891 (Janning), 3,666,981 (Lay), 3,811,061 (Nakayama et al.) et al.), 3,860,846 (Mayer), 3,885,195 (Amano), 3,935,494 (Dick et al.), 3,964,050 (Mayer), 4,106,009 (Dick), 4,164,678 (Biazzo et al.), and 4,638,218 (Shinoda), all incorporated herein by reference.

RELATED PRIOR ART

Spheres, Beads, Ampoules, Capsules

The construction of a PDP out of gas filled hollow microspheres is known in the prior art. Such microspheres are referred to as spheres, beads, ampoules, capsules, bubbles, shells, and so forth. The following prior art relates to the use of microspheres in a PDP and are incorporated herein by reference.

U.S. Pat. No. 2,644,113 (Etzkorn) discloses ampoules or hollow glass beads containing luminescent gases that emit a colored light. In one embodiment, the ampoules are used to radiate ultra violet light onto a phosphor external to the ampoule itself.

U.S. Pat. No. 3,848,248 (MacIntyre) discloses the embedding of gas filled beads in a transparent dielectric. The beads are filled with a gas using a capillary. The external shell of the beads may contain phosphor.

U.S. Pat. No. 3,998,618 (Kreick et al.) discloses the manufacture of gas-filled beads by the cutting of tubing. The tubing is cut into ampoules (shown as domes in FIG. 2) and heated to form shells. The gas is a rare gas mixture, 95% neon, and 5% argon at a pressure of 300 Torr.

U.S. Pat. No. 4,035,690 (Roeber) discloses a plasma panel display with a plasma forming gas encapsulated in clear glass shells. Roeber used commercially available glass shells containing gases such as air, $SO_2$ or $CO_2$ at pressures of 0.2 to 0.3 atmosphere. Roeber discloses the removal of these residual gases by heating the glass shells at an elevated temperature to drive out the gases through the heated walls of the glass shell. Roeber obtains different colors from the glass shells by filling each shell with a gas mixture which emits a color upon discharge and/or by using a glass shell made from colored glass.

U.S. Pat. No. 4,963,792 (Parker) discloses a gas discharge chamber including a transparent dome portion.

U.S. Pat. No. 5,326,298 (Hotomi) discloses a light emitter for giving plasma light emission. The light emitter comprises a resin including fine bubbles in which a gas is trapped. The gas is selected from rare gases, hydrocarbons, and nitrogen.

Japanese Patent 11238469A, published Aug. 31, 1999, by Tsuruoka Yoshiaki of Dainippon discloses a plasma display panel containing a gas capsule. The gas capsule is provided with a rupturable part which ruptures when it absorbs a laser beam.

U.S. Pat. No. 6,545,422 (George et al.) discloses a light-emitting panel with a plurality of sockets with spherical or other shape micro-components in each socket sandwiched between two substrates. The micro-component includes a shell filled with a plasma-forming gas or other material. The light-emitting panel may be a plasma display, electroluminescent display, or other display device.

The following U.S. patents issued to George et al. and the various joint inventors are incorporated herein by reference: U.S. Pat. Nos. 6,570,335 (George et al.); 6,612,889 (Green et al.); 6,620,012 (Johnson et al.); 6,646,388 (George et al.); 6,762,566 (George et al.); 6,764,367 (Green et al.); 6,791,264 (Green et al.); 6,796,867 (George et al.); 6,801,001 (Drobot et al.); and 6,822,626 (George et al.).

Also incorporated herein by reference are the following U.S. Patent Application Publications filed by the various joint inventors of George et al.: U.S. Patent Application Publication Nos. 2003/0164684 (Green et al.); 2003/0207643 (Wyeth et al.); 2004/0051450 (George et al.); 2004/0063373 (Johnson et al.); 2004/0106349 (Green et al.); and 2004/0166762 (Green et al.).

RELATED PRIOR ART

Methods of Producing Microspheres

In the practice of this invention, any suitable method or process may be used to produce the plasma-shells including plasma-spheres, plasma-discs, and plasma-domes. Numerous methods and processes to produce hollow shells or microspheres are well known in the prior art.

Microspheres have been formed from glass, ceramic, metal, plastic, and other inorganic and organic materials. Varying methods and processes for producing shells and microspheres have been disclosed and practiced in the prior art. Some of the prior art methods for producing plasma-shells are disclosed hereafter.

Some methods used to produce hollow glass microspheres incorporate a blowing gas into the lattice of a glass while in frit form. The frit is heated and glass bubbles are formed by the in-permeation of the blowing gas. Microspheres formed by this method have diameters ranging from about 5 µm to approximately 5,000 µm. This method produces shells with a residual blowing gas enclosed in the shell. The blowing gases typically include $SO_2$, $CO_2$, and $H_2O$. These residual gases will quench a plasma discharge. Because of these residual gases, microspheres produced with this method are not acceptable for producing plasma-spheres for use in a PDP.

Methods of manufacturing glass frit for forming hollow microspheres are disclosed by U.S. Pat. Nos. 4,017,290 (Budrick et al.) and 4,021,253 (Budrick et al.). Budrick et al. ('290) discloses a process whereby occluded material gasifies to form the hollow microsphere.

Hollow microspheres are disclosed in U.S. Pat. Nos. 5,500, 287 (Henderson) and 5,501,871 (Henderson). According to Henderson ('287), the hollow microspheres are formed by dissolving a permeant gas (or gases) into glass frit particles. The gas permeated frit particles are then heated at a high temperature sufficient to blow the frit particles into hollow microspheres containing the permeant gases. The gases may be subsequently out-permeated and evacuated from the hollow shell as described in step D in column 3 of Henderson ('287). Henderson ('287) and ('871) are limited to gases of small molecular size. Some gases such as xenon, argon, and krypton used in plasma displays may be too large to be permeated through the frit material or wall of the microsphere. Helium which has a small molecular size may leak through the microsphere wall or shell.

U.S. Pat. No. 4,257,798 (Hendricks et al.) discloses a method for manufacturing small hollow glass spheres filled with a gas introduced during the formation of the spheres, and is incorporated herein by reference. The gases disclosed include argon, krypton, xenon, bromine, DT, hydrogen, deuterium, helium, hydrogen, neon, and carbon dioxide. Other Hendricks patents for the manufacture of glass spheres include U.S. Pat. Nos. 4,133,854 and 4,186,637, both incorporated herein by reference. Hendricks ('798) is also incorporated herein by reference.

Microspheres are also produced as disclosed in U.S. Pat. No. 4,415,512 (Torobin), incorporated herein by reference. This method by Torobin comprises forming a film of molten glass across a blowing nozzle and applying a blowing gas at a positive pressure on the inner surface of the film to blow the film and form an elongated cylinder shaped liquid film of molten glass. An inert entraining fluid is directed over and around the blowing nozzle at an angle to the axis of the blowing nozzle so that the entraining fluid dynamically induces a pulsating or fluctuating pressure at the opposite side of the blowing nozzle in the wake of the blowing nozzle. The continued movement of the entraining fluid produces asymmetric fluid drag forces on a molten glass cylinder which close and detach the elongated cylinder from the coaxial blowing nozzle. Surface tension forces acting on the detached cylinder form the latter into a spherical shape which is rapidly cooled and solidified by cooling means to form a glass microsphere.

In one embodiment of the above method for producing the microspheres, the ambient pressure external to the blowing nozzle is maintained at a super atmospheric pressure. The ambient pressure external to the blowing nozzle is such that it substantially balances, but is slightly less than the blowing gas pressure. Such a method is disclosed by U.S. Pat. No. 4,303,432 (Torobin) and WO 8000438A1 (Torobin), both incorporated herein by reference.

The microspheres may also be produced using a centrifuge apparatus and method as disclosed by U.S. Pat. No. 4,303,433 (Torobin) and WO8000695A1 (Torobin), both incorporated herein by reference.

Other methods for forming microspheres of glass, ceramic, metal, plastic, and other materials are disclosed in other Torobin patents including U.S. Pat. Nos. 5,397,759; 5,225,123; 5,212,143; 4,793,980; 4,777,154; 4,743,545; 4,671,909; 4,637,990; 4,582,534; 4,568,389; 4,548,196; 4,525,314; 4,363,646; 4,303,736; 4,303,732; 4,303,731; 4,303,603; 4,303,431; 4,303,730; 4,303,729; and 4,303,061, all incorporated herein by reference.

U.S. Pat. No. 3,607,169 (Coxe) discloses an extrusion method in which a gas is blown into molten glass and individual shells are formed. As the shells leave the chamber, they cool and some of the gas is trapped inside. Because the shells cool and drop at the same time, the shell shells do not form uniformly. It is also difficult to control the amount and composition of gas that remains in the shell.

U.S. Pat. No. 4,349,456 (Sowman), incorporated by reference, discloses a process for making ceramic metal oxide microspheres by blowing a slurry of ceramic and highly volatile organic fluid through a coaxial nozzle. As the liquid dehydrates, gelled microcapsules are formed. These microcapsules are recovered by filtration, dried, and fired to convert them into microspheres. Prior to firing, the microcapsules are sufficiently porous that, if placed in a vacuum during the firing process, the gases can be removed and the resulting microspheres will generally be impermeable to ambient gases. The shells formed with this method may be easily filled with a variety of gases and pressurized from near vacuums to above atmosphere. This is a suitable method for producing microspheres. However, shell uniformity may be difficult to control.

U.S. Patent Application Publication 2002/0004111 (Matsubara et al.), incorporated by reference discloses a method of preparing hollow glass microspheres by adding a combustible liquid (kerosene) to a material containing a foaming agent.

Methods for forming microspheres are also disclosed in U.S. Pat. Nos. 3,848,248 (MacIntyre), 3,998,618 (Kreick et al.), and 4,035,690 (Roeber), discussed above and incorporated herein by reference.

Methods of manufacturing hollow microspheres are disclosed in U.S. Pat. Nos. 3,794,503 (Netting), 3,796,777 (Netting), 3,888,957 (Netting), and 4,340,642 (Netting et al.), all incorporated herein by reference.

Other prior art methods for forming microspheres are disclosed in the prior art including U.S. Pat. Nos. 3,528,809 (Farnand et al.), 3,957,194 (Farnand et al.), 4,025,689 (Kobayashi et al.), 4,211,738 (Genis), 4,307,051 (Sargeant et al.), 4,569,821 (Duperray et al.) 4,775,598 (Jaeckel), and 4,917, 857 (Jaeckel et al.), all of which are incorporated herein by reference.

These references disclose a number of methods which comprise an organic core such as naphthalene or a polymeric core such as foamed polystyrene which is coated with an inorganic material such as aluminum oxide, magnesium, refractory, carbon powder, and the like. The core is removed such as by pyrolysis, sublimation, or decomposition and the inorganic coating sintered at an elevated temperature to form a sphere or microsphere.

Farnand et al. ('809) discloses the production of hollow metal spheres by coating a core material such as naphthalene or anthracene with metal flakes such as aluminum or magnesium. The organic core is sublimed at room temperature over 24 to 48 hours. The aluminum or magnesium is then heated to an elevated temperature in oxygen to form aluminum or magnesium oxide.

The core may also be coated with a metal oxide such as aluminum oxide and reduced to metal. The resulting hollow spheres are used for thermal insulation, plastic filler, and bulking of liquids such as hydrocarbons.

Farnand ('194) discloses a similar process comprising polymers dissolved in naphthalene including polyethylene and polystyrene. The core is sublimed or evaporated to form hollow spheres or microballoons.

Kobayashi et al. ('689) discloses the coating of a core of polystyrene with carbon powder. The core is heated and decomposed and the carbon powder heated in argon at 3000° C. to obtain hollow porous graphitized spheres.

Genis ('738) discloses the making of lightweight aggregate using a nucleus of expanded polystyrene pellet with outer layers of sand and cement.

Sargeant et al. ('051) discloses the making of light weight-refractories by wet spraying core particles of polystyrene with an aqueous refractory coating such as clay with alumina, magnesia, and/or other oxides. The core particles are subject to a tumbling action during the wet spraying and fired at 1730° C. to form porous refractory.

Duperray et al. ('821) discloses the making of a porous metal body by suspending metal powder in an organic foam which is heated to pyrolyze the organic and sinter the metal.

Jaeckel ('598) and Jaeckel et al. ('857) disclose the coating of a polymer core particle such as foamed polystyrene with metals or inorganic materials followed by pyrolysis on the polymer and sintering of the inorganic materials to form the sphere. Both disclose the making of metal spheres such as copper or nickel spheres which may be coated with an oxide such as aluminum oxide. Jaeckel et al. ('857) further discloses a fluid bed process to coat the core.

SUMMARY OF INVENTION

This invention relates to a PDP constructed out of one or more plasma-shells with an organic luminescent substance located in close proximity to each plasma-shell, the organic substance being excited by photons from a gas discharge within the plasma-shell. The PDP comprises one or more plasma-shells on or within a rigid or flexible substrate with each plasma-shell being electrically connected to at least two electrical conductors such as electrodes. In accordance with one embodiment of this invention, insulating barriers are used to prevent contact between the electrodes. The plasma-shell may be of any suitable geometric shape such as a plasma-sphere, plasma-disc, or plasma-dome suitable for use in a gas discharge plasma display device. As used herein, plasma-shell includes plasma-sphere, plasma-disc, and/or plasma-dome. Combinations of plasma-shells may be used in the PDP. Plasma-shells may also be used in combination with plasma-tubes. This invention is illustrated herein with respect to plasma-discs alone or in combination with other plasma-shells.

A plasma-sphere is a primarily hollow sphere with relatively uniform shell thickness. The shell is typically composed of a dielectric material. It is filled with an ionizable gas at a desired mixture and pressure. The gas is selected to produce visible, UV, and/or infrared discharge when a voltage is applied. The shell material is selected to optimize dielectric properties and optical transmissivity. Additional beneficial materials may be added to the inside or outer surface of the sphere including magnesium oxide for secondary electron emission. The magnesium oxide and other materials including organic and/or inorganic luminescent substances may also be added directly to the shell material.

A plasma-disc is similar to the plasma-sphere in material composition and gas selection. It differs from the plasma-sphere in that it is flattened on both the top and bottom. A plasma-sphere or sphere may be flattened to form a plasma-disc by applying heat and pressure simultaneously to the top and bottom of the sphere using two substantially flat and ridged members, either of which may be heated. Each of the other four sides may be flat or round.

A plasma-dome is similar to a plasma-sphere in material composition and ionizable gas selection. It differs in that one side is domed. A plasma-sphere is flattened on one or more other sides to form a plasma-dome, typically by applying heat and pressure simultaneously to the top and bottom of the plasma-sphere or sphere using one substantially flat and ridged member and one substantially elastic member. In one embodiment, the substantially rigid member is heated. A plasma-dome may also be made by cutting an elongated tube as shown in U.S. Pat. No. 3,998,618 (Kreick et al.) incorporated herein by reference

BRIEF DESCRIPTION OF THE DRAWINGS

FIG. 1 is a top view of a plasma-disc mounted on a substrate with x-electrode and y-electrode.

FIG. 1A is a Section View 1A-1A of FIG. 1.

FIG. 1B is a Section View 1B-1B of FIG. 1.

FIG. 1C is a top view of the FIG. 1 substrate showing the x-electrode and y-electrode configuration with the plasma-disc location shown with broken lines.

FIG. 2 is a top view of a plasma-disc mounted on a substrate with x-electrode and y-electrode.

FIG. 2A is a Section View 2A-2A of FIG. 2.

FIG. 2B is a Section View 2B-2B of FIG. 2.

FIG. 2C is a top view of the FIG. 2 substrate showing the x-electrode and y-electrode configuration without the plasma-disc.

FIG. 4 is a top view of a plasma-disc mounted on a substrate with two x-electrodes and one y-electrode.

FIG. 4A is a Section View 4A-4A of FIG. 4.

FIG. 4B is a Section View of 4B-4B of FIG. 4.

FIG. 4C is a top view of the substrate and electrodes in FIG. 4 with the plasma-disc location shown in broken lines.

FIG. 5 is a top view of a plasma-disc mounted on a substrate with two x-electrodes and one y-electrode.

FIG. 5A is a Section View 5A-5A of FIG. 5.

FIG. 5B is a Section View of 5B-5B of FIG. 5.

FIG. 5C is a top view of the substrate and electrodes in FIG. 5 with the plasma-disc location shown in broken lines.

FIG. 6 is a top view of a plasma-disc mounted on a substrate with two x-electrodes and one y-electrode.

FIG. 6A is a Section View 6A-6A of FIG. 6.

FIG. 6B is a Section View of 6B-6B of FIG. 6.

FIG. 6C is a top view of the substrate and electrodes in FIG. 6 with the plasma-disc location shown in broken lines.

FIG. 7 is a top view of a plasma-disc mounted on a substrate with one x-electrode and one y-electrode.

FIG. 7A is a Section View 7A-7A of FIG. 7.

FIG. 7B is a Section View of 7B-7B of FIG. 7.

FIG. 7C is a top view of the substrate and electrodes in FIG. 7 with the plasma-disc location shown in broken lines.

FIG. 8 is a top view of a plasma-disc mounted on a substrate with one x-electrode and one y-electrode.

FIG. 8A is a Section View 8A-8A of FIG. 8.

FIG. 8B is a Section View of 8B-8B of FIG. 8.

FIG. 8C is a top view of the substrate and electrodes in FIG. 8 with the plasma-disc location shown in broken lines.

FIG. 10 is a top view of a substrate with multiple x-electrodes, multiple y-electrodes, and trenches or grooves for receiving plasma-discs.

FIG. 10A is a Section View 10A-10A of FIG. 10.

FIG. 10B is a Section View of 10B-10B of FIG. 10.

FIG. 11 is a top view of a substrate with multiple x-electrodes, multiple y-electrodes, and multiple wells or cavities for receiving plasma-discs.

FIG. 11A is a Section View 11A-11A of FIG. 11.

FIG. 11B is a Section View of 11B-11B of FIG. 11.

FIG. 12 is a top view of a plasma-disc mounted on a substrate with one x-electrode and one y-electrode.

FIG. 12A is a Section View 12A-12A of FIG. 12.

FIG. 12B is a Section View of 12B-12B of FIG. 12.

FIG. 12C is a top view of the substrate and electrodes in FIG. 12 without the plasma-disc FIG. 13 is a top view of a plasma-disc mounted on a substrate with one x-electrode and one y-electrode.

FIG. 13A is a Section View 13A-13A of FIG. 13.

FIG. 13B is a Section View of 13B-13B of FIG. 13.

FIG. 13C is a top view of the substrate and electrodes in FIG. 13 without the plasma-disc.

FIG. 14 is a top view of a plasma-disc mounted on a substrate with one x-electrode and one y-electrode.

FIG. 14A is a Section View 14A-14A of FIG. 14.

FIG. 14B is a Section View of 14B-14B of FIG. 14.

FIG. 14C is a top view of the substrate and electrodes in FIG. 14 without the plasma-disc.

FIG. 16 is a top view of a plasma-disc mounted on a substrate with one x-electrode and one y-electrode.

FIG. 16A is a Section View 16A-16A of FIG. 16.

FIG. 16B is a Section View of 16B-16B of FIG. 16.

FIG. 16C is a top view of the substrate and electrodes in FIG. 16 with the plasma-disc location shown in broken lines.

FIG. 18 is a top view of a plasma-dome mounted on a substrate with two x-electrodes and one y-electrode.

FIG. 18A is a Section View 18A-18A of FIG. 18.

FIG. 18B is a Section View of 18B-18B of FIG. 18.

FIG. 18C is a top View of the substrate and electrodes.

FIGS. 21, 21A, and 21B show a plasma-dome with one flat side.

DETAILED DESCRIPTION OF THE DRAWINGS

Figure 3B:
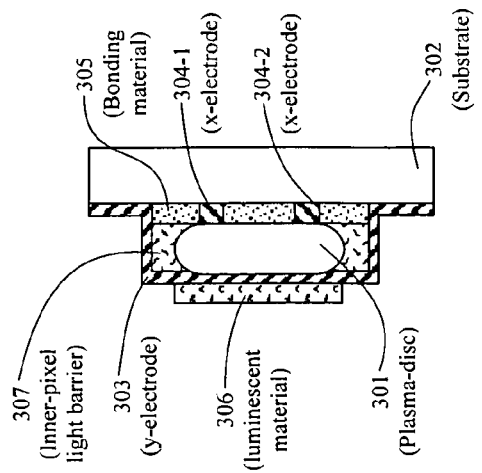
FIG. 3B is a Section View 3B-3B of FIG. 3.

In accordance with this invention, there is provided PDP method and apparatus utilizing one or more plasma-shells arranged in an array or in other suitable configuration with an organic luminescent substance in close proximity to each plasma-shell. As illustrated herein, at least two conductors are electrically connected to a plasma-shell located within or on a rigid or flexible substrate or other body, by means of an electrically conductive or insulating dielectric bonding substance applied to the substrate or to each plasma-shell. In one embodiment, each electrical connection to each plasma-shell is separated from each other electrical conductive bonding substance connection on the plasma-disc by an insulating barrier so as to prevent the conductive substance forming one electrical connection from flowing and electrically shorting out another electrical connection.

The plasma-shell may be of any suitable geometric shape including a plasma-sphere, plasma-dome, or plasma-disc. In one preferred embodiment of this invention, there is used a PDP comprised of one or more plasma-discs alone or in combination with one or more other plasma-shell geometric shapes. The practice of this invention is illustrated and described hereafter with respect to a PDP with plasma-discs. However, other plasma-shell shapes are contemplated and may be used. The plasma-shell may be used in combination with a plasma-tube. Organic luminescent material is positioned internally and/or externally in close proximity near or on each plasma-shell. Inorganic luminescent material may be incorporated with or used in various combinations with the organic luminescent material.

FIG. 1 shows substrate 102 with transparent y-electrode 103, luminescent material 106, x-electrode 104, and inner-pixel light barrier 107. The y-electrode 103 and x-electrode 104 are cross-hatched for identification purposes. The y-electrode 103 is transparent because it is shown as covering much of the plasma-disc 101 not shown in FIG. 1. FIG. 1A is a Section View 1A-1A of FIG. 1 and FIG. 1B is a Section View 1B-1B of FIG. 1, each Section View showing the plasma-disc 101 mounted on the surface of substrate 102 with top y-electrode 103 and bottom x-electrode 104, and inner-pixel light barrier 107. The plasma-disc 101 is attached to the substrate 102 with bonding material 105. Luminescent material 106 is located on the top surface of plasma-disc 101. In one embodiment, the plasma-disc 101 is partially or completely coated with the luminescent material 106. As illustrated in FIGS. 1A and 1B plasma-disc 101 is sandwiched between a y-electrode 103 and x-electrode 104. Inner pixel light barrier 107 is of substantially the same thickness or height as plasma-disc 101. The light barrier may extend and bridge between adjacent pixels. This allows the transparent y-electrode 103 to be applied to a substantially flat surface. The light barrier 107 is made of an opaque or non-transparent material to prevent optical cross-talk between adjacent plasma-discs. The plasma-disc 101 is attached to the substrate 102 with bonding material 105. As practiced in this invention, bonding material is liberally applied to the entire substrate 102 before the plasma-disc 101 is attached. Bonding material 105 may coat some or all of the x-electrode. Bonding material provides a dielectric interface between the electrode and the plasma-disc 101. The bonding material 105 can be of any suitable adhesive substance. In one embodiment hereof, there is used a Z-Axis electrically conductive tape such as manufactured by 3M. FIG. 1C shows the electrodes 103 and 104 on the substrate 102 with the location of the plasma-disc 101 (not shown) indicated with broken lines.

FIG. 2 shows substrate 202 with y-electrode 203, luminescent material 206, x-electrode 204, and inner-pixel light barrier 207. The y-electrode 203 and x-electrode 204 are cross-hatched for identification purposes. The y-electrode 203 may be transparent or not depending upon its width and obscurity of the plasma-disc 201 not shown in FIG. 2. In this embodiment, the inner-pixel light barrier 207 does not extend and form a bridge between adjacent pixels. FIG. 2A is a Section View 2A-2A of FIG. 2 and FIG. 2B is a Section View 2B-2B of FIG. 2, each Section View showing the plasma-disc 201 mounted on the surface of substrate 202 with top y-electrode 203 and bottom x-electrode 204, and inner-pixel light barrier 207. The plasma-disc 201 is attached to the substrate 202 with bonding material 205. The luminescent material 206 is located on the top surface of the plasma-disc 201. FIG. 2C shows the y-electrode 203 and x-electrode 204 on the substrate 202, the x-electrode 204 being in a donut configuration where the Plasma disc 201 (not shown) is to be positioned. In this FIG. 2 embodiment the discharge between the x-electrode and y-electrode will first occur at the intersection of electrodes 203 and 204 and spread around the donut shape of 204. This spreading of the discharge from a small gap to a wide gap increases efficiency. Other electrode configurations are contemplated.

Figure 3C:
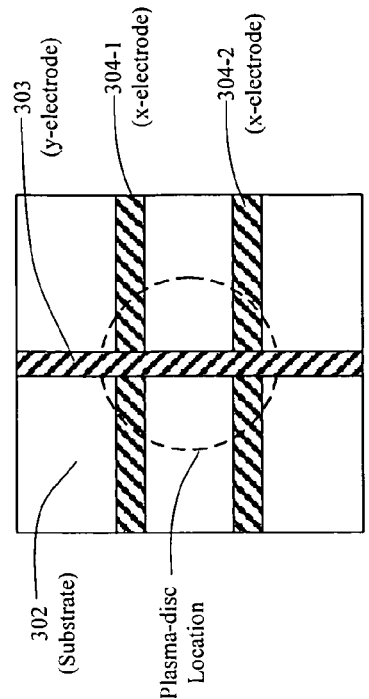
FIG. 3C is a top view of the FIG. 3 substrate showing the x-electrodes and y-electrode configuration with the plasma-disc location shown with broken lines.
Figure 3:
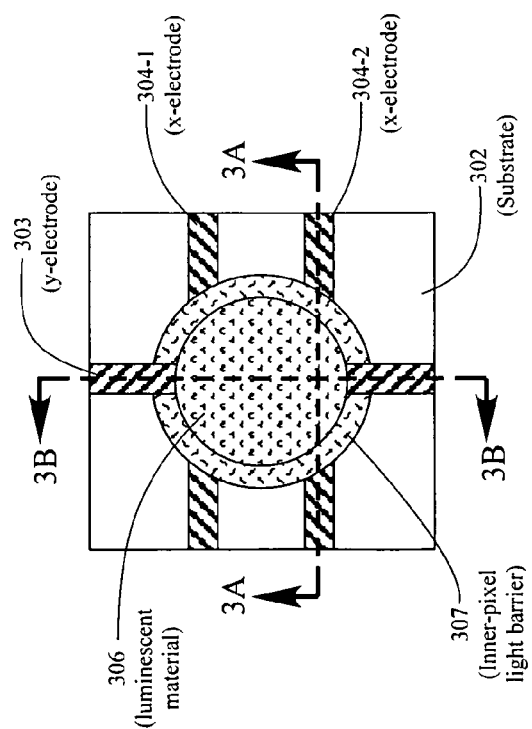
FIG. 3 is a top view of a plasma-disc mounted on a substrate with two x-electrodes and one y-electrode.
Figure 3A:
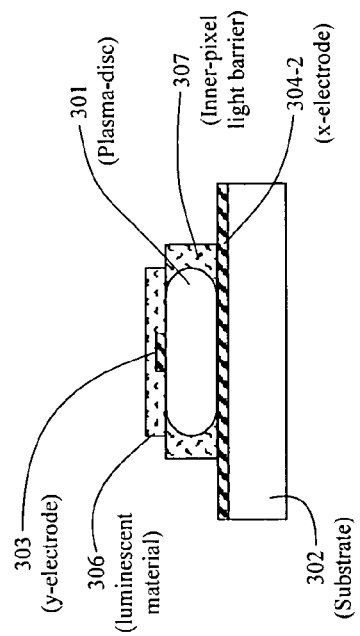
FIG. 3A is a Section View of 3A-3A of FIG. 3.

FIGS. 3, 3A, 3B, and 3C are several views of a three-electrode configuration and embodiment employing positive column discharge. FIG. 3 shows substrate 302 with top y-electrode 303, dual bottom x-electrodes 304-1, 304-2, luminescent material 306, and inner-pixel light barrier 307. The y-electrode 303 and x-electrodes 304-1, 304-2 are cross-hatched for identification purposes. FIG. 3A is a Section View 3A-3A of FIG. 3 and FIG. 3B is a Section View 3B-3B of FIG. 3, each Section View showing the plasma-disc 301 mounted on the surface of the substrate 302 with top y-electrode 303 and dual bottom x-electrodes 304-1 and 304-2, inner-pixel light barrier material 307, and luminescent material 306. The plasma-disc 301 is attached to the substrate 302 with bonding material 305. The luminescent material 306 is on top of the plasma-disc 301. FIG. 3C shows the electrodes 303, 304-1, and 304-2 on the substrate 302 with the location of the plasma-disc 301 (not shown) indicated with broken lines. This embodiment is similar to the FIG. 2 embodiment except that the donut shaped x-electrode is replaced with two independent x-electrodes 304-1 and 304-2. After a discharge is initiated at the intersection of electrode 303 and 304-1 or 304-2, it is maintained by a longer positive column discharge between 304-1 and 304-2.

FIGS. 4, 4A, 4B, and 4C are several views of a three-electrode configuration and embodiment in which the plasma-disc 401 is embedded in a trench or groove 408. FIG. 4 shows substrate 402 with top y-electrode 403, dual bottom x-electrodes 404-1, 404-2, luminescent material 406, inner-pixel light bather 407 and trench or groove 408. The y-electrode 403 and x-electrodes 404-1, 404-2 are cross-hatched for identification purposes. FIG. 4A is a Section View 4A-4A of FIG. 4 and FIG. 4B is a Section View 4B-4B of FIG. 4, each Section View showing the plasma-disc 401 mounted in the trench or groove 408 on the surface of the substrate 402 with top y-electrode 403 and dual bottom x-electrodes 404-1 and 404-2, inner-pixel light bather material 407, and luminescent material 406. The plasma-disc 401 is within the trench or groove 408 and attached to the substrate 402 with bonding material 405. FIG. 4C shows the electrodes 403, 404-1, and 404-2 on the substrate 402 with the location of the plasma-disc 401 (not shown) indicated with broken lines. This FIG. 4 embodiment is a three-electrode structure with similar characteristics to the FIG. 2 embodiment. However x-electrodes 404-1 and 404-2 extend down the middle of trench 408 formed in substrate 402. The plasma-disc 401 is attached with bonding material to the inside of the trench. Optional light barrier material 407 may be applied around the plasma-disc. Y-electrode 403 is applied across the top of the substrate and optional luminescent material 406 may be applied over the top of the plasma-disc. FIG. 4C shows optional locating notch 409 to help position the disc.

FIGS. 5, 5A, 5B, and 5C are several views of a three-electrode configuration and embodiment in which the plasma-disc 501 is embedded in a trench or groove 508. FIG. 5 shows transparent substrate 502 with top y-electrode 503, dual bottom x-electrodes 504-1, 504-2, luminescent material 506, inner-pixel light barrier 507, and trench or groove 508. The y-electrode 503 and x-electrodes 504-1, 504-2 are cross-hatched for identification purposes. FIG. 5A is a Section View 5A-5A of FIG. 5 and FIG. 5B is a Section View 5B-5B of FIG. 5, each Section View showing the plasma-disc 501 mounted in the trench or groove 508 on the surface of the substrate 502 with top y-electrode 503 and dual bottom x-electrodes 504-1 and 504-2, inner-pixel light barrier 507, and luminescent material 506. The plasma-disc 501 is bonded within the trench or groove 508 and attached to the substrate 502 with bonding material 505. As shown in FIG. 5B, the luminescent material 506 covers the surface of the plasma-disc 501. FIG. 5C shows the electrodes 503, 504-1, and 504-2 on the substrate 502 with the location of the plasma-disc 501 (not shown) indicated with broken lines. A locating notch 509 is shown.

FIGS. 6, 6A, 6B, and 6C are several views of a three-electrode configuration and embodiment in which the plasma-disc 601 is embedded in a trench or groove 608.

FIG. 6 shows substrate 602 with dual top x-electrodes 604-1, 604-2, bottom y-electrode 603, luminescent material 606, inner-pixel light barrier 607, and trench or groove 608. The x-electrodes 604-1, 604-2 and bottom y-electrodes 603 are cross-hatched for identification purposes. FIG. 6A is a Section View 6A-6A of FIG. 6 and FIG. 6B is a Section View 6B-6B of FIG. 6, each Section View showing the plasma-disc 601 mounted within trench or groove 608 on the surface of the substrate 602 with bottom y-electrode 603 and dual top x-electrodes 604-1 and 604-2, inner-pixel light barrier 607, and luminescent material 606. The plasma-disc 601 is within the trench or groove 608 and attached to the substrate 602 with bonding material 605. FIG. 6C shows the electrodes 603, 604-1, and 604-2 on the substrate 602 with the location of the plasma-disc 601 (not shown) indicated with broken lines. A plasma-disc locating notch 609 is shown. The FIG. 6 embodiment differs from the FIG. 4 embodiment in that a single y-electrode 603 extends through the parallel center of the trench 608 and x-electrodes 604-1 and 604-2 are perpendicular to trench and run along the top surface.

FIGS. 7, 7A, 7B, and 7C are several views of a two-electrode embodiment with a two-electrode configuration and pattern that employs positive column discharge. FIG. 7 shows substrate 702 with top y-electrode 703, bottom x-electrodes 704, luminescent material 706, and inner-pixel light barrier 707. The y-electrode 703 and x-electrode 704 are cross-hatched for identification purposes. FIG. 7A is a Section View 7A-7A of FIG. 7 and FIG. 7B is a Section View 7B-7B of FIG. 7, each Section View showing the plasma-disc 701 mounted on the surface of substrate 702 with top y-electrode 703 and bottom x-electrode 704, inner-pixel light barrier 707, and luminescent material 706. The plasma-disc 701 is attached to the substrate 702 with bonding material 705. There is also shown in FIG. 7B y-electrode pad 703*a*, x-electrode pad 704*a*, y-electrode 703, x-electrode 704, plasma-disc 701, luminescent material 706, and substrate 702. FIG. 7C shows the electrodes 703 and 704 on the substrate 702 with the location of the plasma-disc 701 (not shown) indicated with broken lines. There is also shown y-electrode pad 703*a* and x-electrode pad 704*a* for contact with plasma-disc 701. As in FIG. 2, FIG. 7 shows a two-electrode configuration and embodiment, which employs positive column discharge. The top y-electrode 703 is applied over the plasma-disc 701 and light barrier 707. Additionally, the electrode 703 runs under plasma-disc 701 and forms a 'T' shaped electrode 703*a*. In this configuration, the discharge is initiated at the closest point between the two electrodes 703*a* and 704*a* under the plasma-disc and spread to the wider gap electrode regions, including electrode 703, which runs over the top of the plasma-disc. It will be obvious to one skilled in the art that there are electrode shapes and configurations other than the 'T' shape that perform essentially the same function.

FIGS. 8, 8A, 8B, and 8C are several views of a two-electrode configuration and embodiment in which neither the x-electrode nor the y-electrode runs over the plasma-disc 801. FIG. 8 shows substrate 802 with x-electrode 804, luminescent material 806, and inner-pixel light barrier 807. The x-electrode 804 is cross-hatched for identification purposes. FIG. 8A is a Section View 8A-8A of FIG. 8 and FIG. 8B is a Section View 8B-8B of FIG. 8, each Section View showing the plasma-disc 801 mounted on the surface of substrate 802 with bottom y-electrode 803, top x-electrode pad 804*a*, inner-pixel light barrier 807, and a top layer of luminescent material 806. The plasma-disc 801 is attached to the substrate 802 with bonding material 805. Also shown is y-electrode pad 803*a* and y-electrode via 803*b* forming a connection to y-electrode 803. The pads 803*a* and 804*a* are in contact with the plasma-disc 801. FIG. 8C shows x-electrode 804 with pad 804*a* and y-electrode pad 803*a* with y-electrode via 803*b* on the substrate 802 with the location of the plasma-disc 801 indicated with broken lines. In this configuration x-electrode 804 extends along the surface of substrate 802 and y-electrode 803 extends along an inner layer of substrate 802. The y-electrode 803 is perpendicular to x-electrode 804. Contact with plasma-disc 801 is made with 'T' shaped surface pads 804*a* and 803*a*. The 'T' shaped pad is beneficial to promote positive column discharge. Pad 803*a* is connected to electrode 803 by via 803*b*. Although y-electrode 803 is shown internal to substrate 802, it may also extend along the exterior surface of 802, opposite to the side that the plasma-disc is located.

Figure 9B:
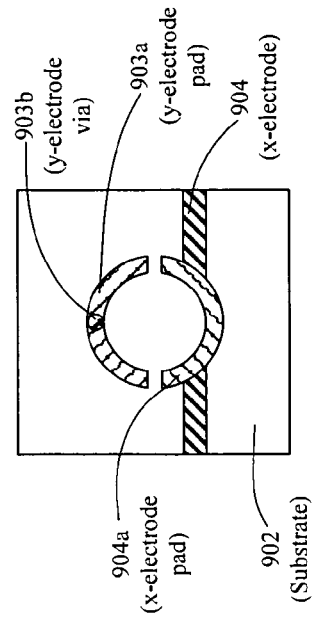
FIG. 9B is a Section View of 9B-9B of FIG. 9.
Figure 9C:
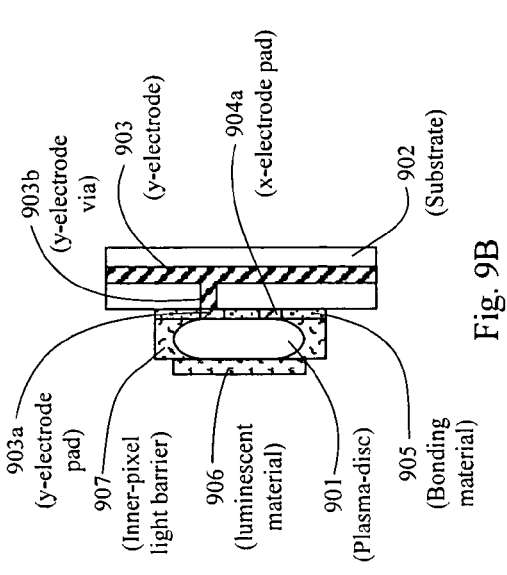
FIG. 9C is a top view of the substrate and electrodes in FIG. 9 without the plasma-disc.
Figure 9:
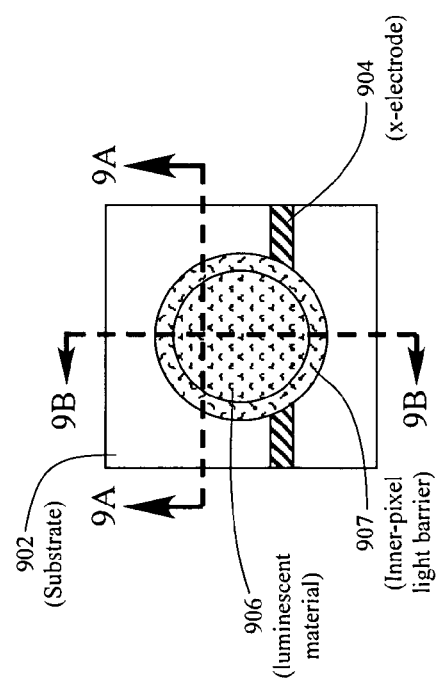
FIG. 9 is a top view of a plasma-disc mounted on a substrate with one x-electrode and one y-electrode.
Figure 9A:
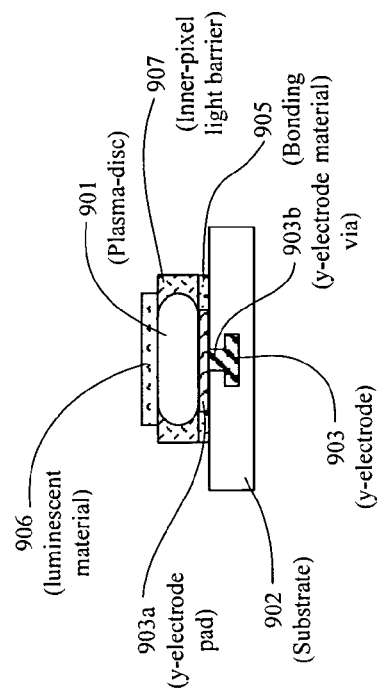
FIG. 9A is a Section View 9A-9A of FIG. 9.

FIGS. 9, 9A, 9B, and 9C are several views of an alternative two-electrode configuration and embodiment in which neither x- nor y-electrode extends over the plasma-disc 901. FIG. 9 shows substrate 902 with x-electrode 904, luminescent material 906, and inner-pixel light barrier 907. The x-electrode 904 is cross-hatched for identification purposes. FIG. 9A is a Section View 9A-9A of FIG. 9 and FIG. 9B is a Section View 9B-9B of FIG. 9, each Section View showing the plasma-disc 901 mounted on the surface of substrate 902 with bottom y-electrode 903 and bottom x-electrode pad 904*a*, inner-pixel light barrier 907, and luminescent material 906. The plasma-disc 901 is attached to the substrate 902 with bonding material 905. Also shown is y-electrode pad 903*a* and y-electrode via 903*b* connected to y-electrode 903. Also shown is x-electrode pad 904*a*. The pads 903*a* and 904*a* are in contact with the Plasma disc 901. FIG. 9C shows x-electrode 904 with pad 904*a* and y-electrode pad 903*a* with y-electrode via 903*b* on the substrate 902 with pads 903*a*, 904*a* forming an incomplete circular configuration for contact with the plasma-disc 901 (not shown in FIG. 9C) to be positioned on the substrate 902.

FIG. 10 shows substrate 1002 with y-electrodes 1003 positioned in trenches or grooves 1008, x-electrodes 1004, and plasma-disc locating notches 1009. The plasma-discs 1001 are located within the trenches or grooves 1008 at the positions of the locating notches 1009 as shown. The y-electrodes 1003 and x-electrodes 1004 are cross-hatched for identification purposes. FIG. 10A is a Section View 10A-10A of FIG. 10 and FIG. 10B is a Section View 10B-10B of FIG. 10, each Section View showing each plasma-disc 1001 mounted within a trench or groove 1008 and attached to the substrate 1002 with bonding material 1005. Each plasma-disc 1001 is in contact with a top x-electrode 1004 and a bottom y-electrode 1003. Luminescent material is not shown, but may be provided near or on each plasma-disc 1001. Inner-pixel light barriers are not shown, but may be provided.

FIG. 11 shows substrate 1102 with y-electrodes 1103, x-electrodes 1104, and plasma-disc wells 1114. The plasma-discs 1101 are located within wells 1114 as shown. The y-electrodes 1103 and x-electrodes 1104 are cross-hatched for identification purposes. FIG. 11A is a Section View 11A-11A of FIG. 11 and FIG. 11B is a Section View 11B-11B of FIG. 11, each Section View showing each plasma-disc 1101 mounted within a well 1114 to substrate 1102 with bonding material 1105. Each plasma-disc 1101 is in contact with a top x-electrode 1104 and a bottom y-electrode 1103. Luminescent material is not shown, but may be provided near or on each plasma-disc. Inner-pixel light barriers are not shown, but may be provided. The x-electrodes 1104 are positioned under a transparent cover 1110 and may be integrated into the cover.

FIGS. 12, 12A, 12B, and 12C are several views of an alternate two-electrode configuration or embodiment in which neither the x-electrode nor the y-electrode extends over the plasma-disc 1201. FIG. 12 shows substrate 1202 with x-electrode 1204, luminescent material 1206, and inner-pixel light barrier 1207. The x-electrode 1204 is cross-hatched for identification purposes.

FIG. 12A is a Section View 12A-12A of FIG. 12 and FIG. 12B is a Section View 12B-12B of FIG. 12, each Section View showing the plasma-disc 1201 mounted on the surface of substrate 1202 with bottom y-electrode 1203 and bottom x-electrode pad 1204*a*, inner-pixel light barrier 1207, and luminescent material 1206. The plasma-disc 1201 is bonded to the substrate 1202 with bonding material 1205. Also shown is y-electrode pad 1203*a* and via 1203*b* connected to y-electrode 1203. The pads 1203*a* and 1204*a* are in contact with the plasma-disc 1201. FIG. 12C shows x-electrode 1204 with pad 1204*a* and y-electrode pad 1203*a* with y-electrode via 1203*b* on the surface 1202. The pad 1204*a* forms a donut configuration for contact with the plasma-disc 1201 (not shown) to be positioned on the substrate 1202. The pad 1203a is shown as a keyhole configuration within the donut configuration and centered within electrode pad 1204a.

FIGS. 13, 13A, 13B, and 13C are several views of an alternate two-electrode configuration and embodiment in which neither the x- nor the y-electrode extends over the plasma-disc 1301. These figures illustrate charge or capacitive coupling. FIG. 13 shows dielectric film or layer 1302a on top surface of substrate 1302 (not shown) with x-electrode 1304, luminescent material 1306, and inner-pixel light barrier 1307. The x-electrode 1304 is cross-hatched for identification purposes. FIG. 13A is a Section View 13A-13A of FIG. 13 and FIG. 13B is a Section View 13B-13B of FIG. 13, each Section View showing the plasma-disc 1301 mounted on the dielectric film or layer 1302a with y-electrode 1303 and x-electrode pad 1304a, inner-pixel light barrier 1307, and luminescent material 1306. The plasma-disc 1301 is bonded to the dielectric film 1302a with bonding material 1305. Also is substrate 1302 and y-electrode pad 1303a, which is capacitively coupled through dielectric film 1302a to the y-electrode 1303. FIG. 13C shows the x-electrode 1304 x-electrode pad 1304a, and y-electrode pad 1303a on the dielectric film 1302a with the location of the plasma-disc 1301 (not shown) indicated by the semi-circular pads 1303a and 1304a. In this configuration and embodiment, x-electrode 1304 is on the top of the substrate 1302 and y-electrode 1303 is embedded in substrate 1302. Also in this embodiment, substrate 1302 is formed from a material with a dielectric constant sufficient to allow charge coupling from 1303 to 1303a. Also to promote good capacitive coupling, pad 1303a is large and the gap between 1303a and 1303 is small. Pads 1303a and 1304a may be selected from a reflective metal such as copper or silver or coated with a reflective material. This will help direct light out of the plasma-disc and increase efficiency. Reflective electrodes may be used in any configuration in which the electrodes are attached to the plasma-disc from the back of the substrate. The larger the area of the electrode, the greater the advantage achieved by reflection.

FIGS. 14, 14A, 14B, and 14C are several views of an alternate two-electrode configuration and embodiment. FIG. 14 shows dielectric film or layer 1402a on the top surface of substrate 1402 (not shown) with x-electrode 1404, luminescent material 1406, and inner-pixel light barrier 1407. The x-electrode 1404 is cross-hatched for identification purposes. FIG. 14A is a Section View 14A-14A of FIG. 14 and FIG. 14B is a Section View 14B-14B of FIG. 14, each Section View showing the plasma-disc 1401 mounted on the surface of dielectric film 1402a with bottom y-electrode 1403, bottom x-electrode pad 1404a, inner-pixel light barrier 1407, and luminescent material 1406. The plasma-disc 1401 is bonded to the dielectric film 1402a with bonding material 1405. Also shown are substrate 1402 and y-electrode pad 1403a, which is capacitively coupled through the dielectric film 1402a to the y-electrode 1403. FIG. 14C shows x-electrode 1404 and electrode pads 1403a and 1404a on the dielectric film 1402a. The pads 1403a and 1404a form an incomplete circular configuration for contact with the plasma-disc 1401 (not shown in FIG. 14C). FIG. 14 differs from FIG. 13 in the shape of the electrode pads. This can be seen in FIG. 14C. Y-electrode 1403a is shaped like a 'C' and X-electrode 1404 is also formed as a 'C' shape. This configuration promotes a positive column discharge.

Figure 15:
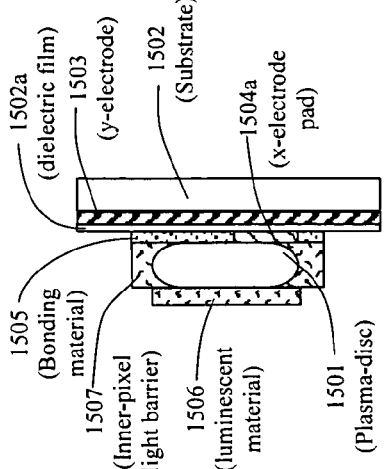
FIG. 15 is a top view of a plasma-disc mounted on a substrate with one x-electrode and one y-electrode.
Figure 15A:
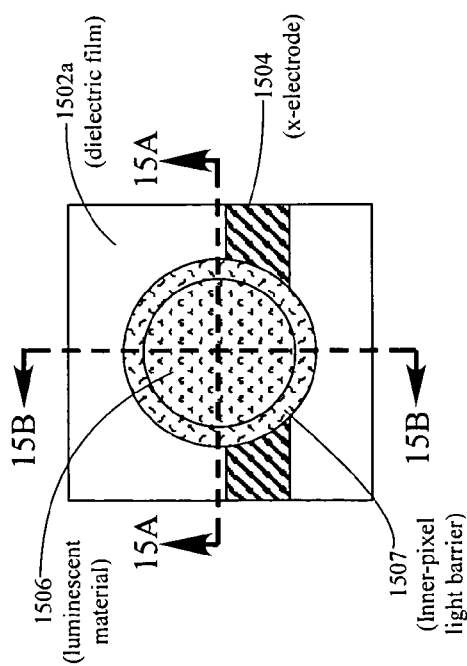
FIG. 15A is a Section View 15A-15A of FIG. 15.
Figure 15B:
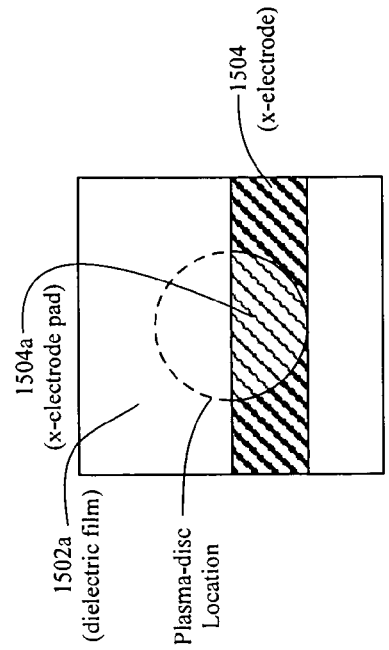
FIG. 15B is a Section View of 15B-15B of FIG. 15.
Figure 15C:
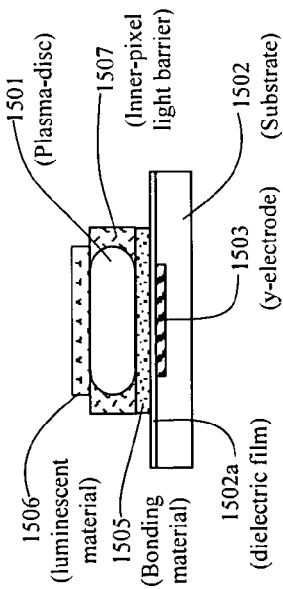
FIG. 15C is a top view of the substrate and electrodes in FIG. 15 with the plasma-disc location shown in broken lines.

FIGS. 15, 15A, 15B, and 15C are several views of an alternate two-electrode configuration and embodiment. These figures illustrate charge or capacitive coupling. FIG. 15 shows dielectric film or layer 1502a on the surface of substrate 1502 (not shown) with bottom x-electrode 1504, luminescent material 1506 and inner-pixel light barrier 1507. The x-electrode 1504 is cross-hatched for identification purposes. FIG. 15A is a Section View 15A-15A of FIG. 15 and FIG. 15B is a Section View 15B-15B of FIG. 15, each Section View showing the plasma-disc 1501 mounted on the surface of dielectric film 1502a with bottom y-electrode 1503 and bottom x-electrode pad 1504a, inner-pixel light barrier 1507, and luminescent material 1506. The plasma-disc 1501 is bonded to the dielectric film 1502a with bonding material 1505. The plasma-disc 1501 is capacitively coupled through dielectric film 1502a and bonding material 1505 to y-electrode 1503. Also shown is substrate 1502. FIG. 15C shows the x-electrode 1504 with x-electrode pad 1504a on the dielectric film 1502a with the location of the plasma-disc 1501 (not shown) indicated with broken lines.

FIGS. 16, 16A, 16B, and 16C are several views of an alternate two-electrode configuration and embodiment. FIG. 16 shows dielectric film or layer 1602a on substrate 1602 (not shown) with bottom x-electrode 1604, luminescent material 1606, and inner-pixel light barrier 1607. The x-electrode 1604 is cross-hatched for identification purposes. FIG. 16A is a Section View 16A-16A of FIG. 16 and FIG. 16B is a Section View 16B-16B of FIG. 16, each Section View showing the plasma-disc 1601 mounted on the surface of dielectric film 1602a with bottom y-electrode 1603, bottom x-electrode pad 1604a, inner-pixel light barrier 1607, and luminescent material 1606. The plasma-disc 1601 is bonded to the dielectric film 1602a with bonding material 1605. Also shown is substrate 1602. FIG. 16C shows the x-electrode 1604 with pad 1604a and y-electrode 1603 on the dielectric film 1602a with the location of the plasma-disc 1601 (not shown) indicated with broken lines. FIG. 16 differs from FIG. 15 in the shape of the x-electrodes and y-electrodes. This can be seen in FIG. 16C. The x-electrode 1604 is extended along the top surface of substrate 1602, and dielectric film 1602a. A spherical hole is cut in x-electrode 1604 to allow capacitive coupling of y-electrode 1603 to the plasma-disc. The y-electrode 1603 is perpendicular to x-electrode 1604.

Figure 17:
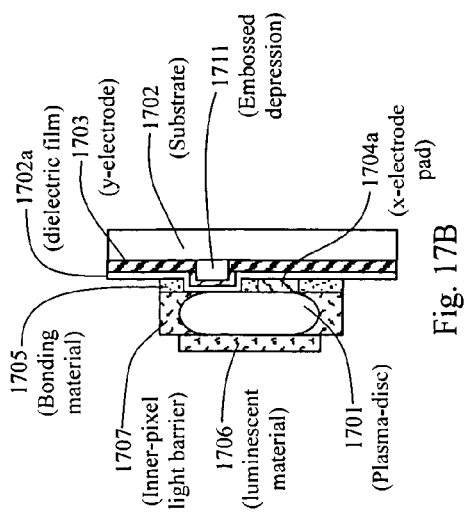
FIG. 17 is a top view of a plasma-disc mounted on a substrate with one x-electrode and one y-electrode.
Figure 17C:
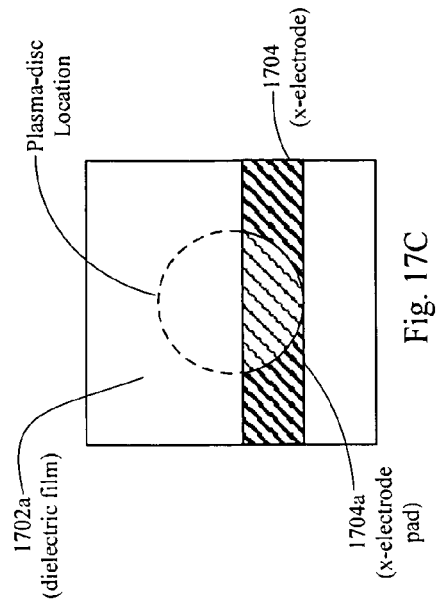
FIG. 17C is a top view of the substrate and electrodes in FIG. 17 with the plasma-disc location shown in broken lines.
Figure 17A:
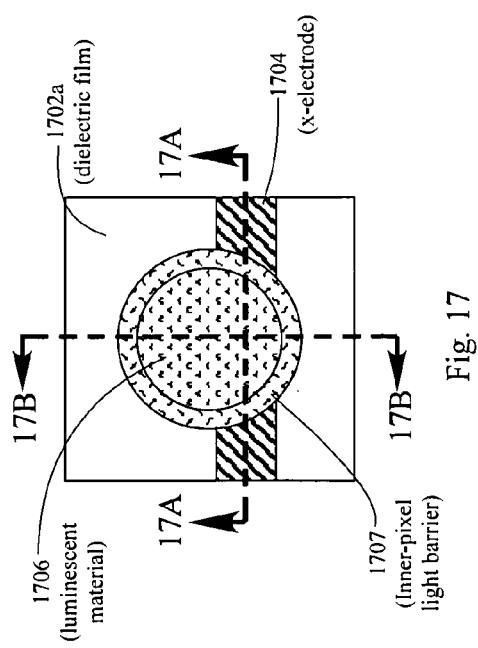
FIG. 17A is a Section View 17A-17A of FIG. 17.
Figure 17B:
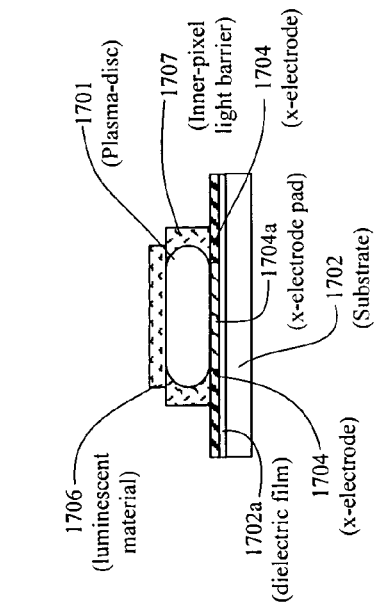
FIG. 17B is a Section View of 17B-17B of FIG. 17.

FIGS. 17, 17A, 17B, and 17C are several views of an alternate two-electrode configuration and embodiment. FIG. 17 shows dielectric film or layer 1702a on substrate 1702 (not shown) with bottom x-electrode 1704, luminescent material 1706, and inner-pixel light barrier 1707. The x-electrode 1704 is cross-hatched for identification purposes. FIG. 17A is a Section View 17A-17A of FIG. 17 and FIG. 17B is a Section View 17B-17B of FIG. 17, each Section View showing the plasma-disc 1701 mounted on the surface of dielectric film or layer 1702a with bottom y-electrode 1703, bottom x-electrode 1704 and x-electrode pad 1704a, inner-pixel light barrier 1707, and luminescent material 1706. The plasma-disc 1701 is bonded to the dielectric layer 1702a with bonding material 1705. FIG. 17C shows the electrode 1704 with pad 1704a on the substrate 1702 with the location of the plasma-disc 1701 (not shown) indicated with broken lines. FIG. 17 serves to illustrate that the y-electrode 1703 may be applied to the top of substrate 1702 as shown in FIG. 17B. Dielectric layer or film 1702a is applied over the substrate and the y-electrode. The x-electrode 1704 is applied over the dielectric layer to make direct contact with plasma-disc 1701. In this embodiment substrate 1702 contains embossed depression 1711 to bring y-electrode 1703 closer to the surface of the plasma-disc and in essentially the same plane as x-electrode pad 1704a.

FIG. 18 shows dielectric film or layer 1802a substrate 1802 (not shown) with bottom x-electrode 1804, luminescent material 1806, and inner-pixel light barrier 1807. The x-electrode 1804 is cross-hatched for identification purposes. FIG. 18A is a Section View 18A-18A of FIG. 18 and FIG. 18B is a Section View 18B-18B of FIG. 18, each Section View showing a plasma-dome 1801 mounted on the surface of dielectric 1802a with connecting bottom y-electrode 1803, inner-pixel light barrier 1807, and luminescent material 1806. The plasma-dome 1801 is bonded to the substrate 1802a with bonding material 1805. Also shown are substrate 1802, y-electrode pad 1803a and x-electrode pad 1804a. Magnesium oxide 1812 is shown on the inside of the plasma-dome 1801. FIG. 18C shows the electrode 1804 with pad 1804a and pad 1803a on the dielectric film 1802a with the location of the plasma-dome 1801 (not shown) by semi-circular pads 1804a and 1803a all attached to substrate 1802.

Figure 19:
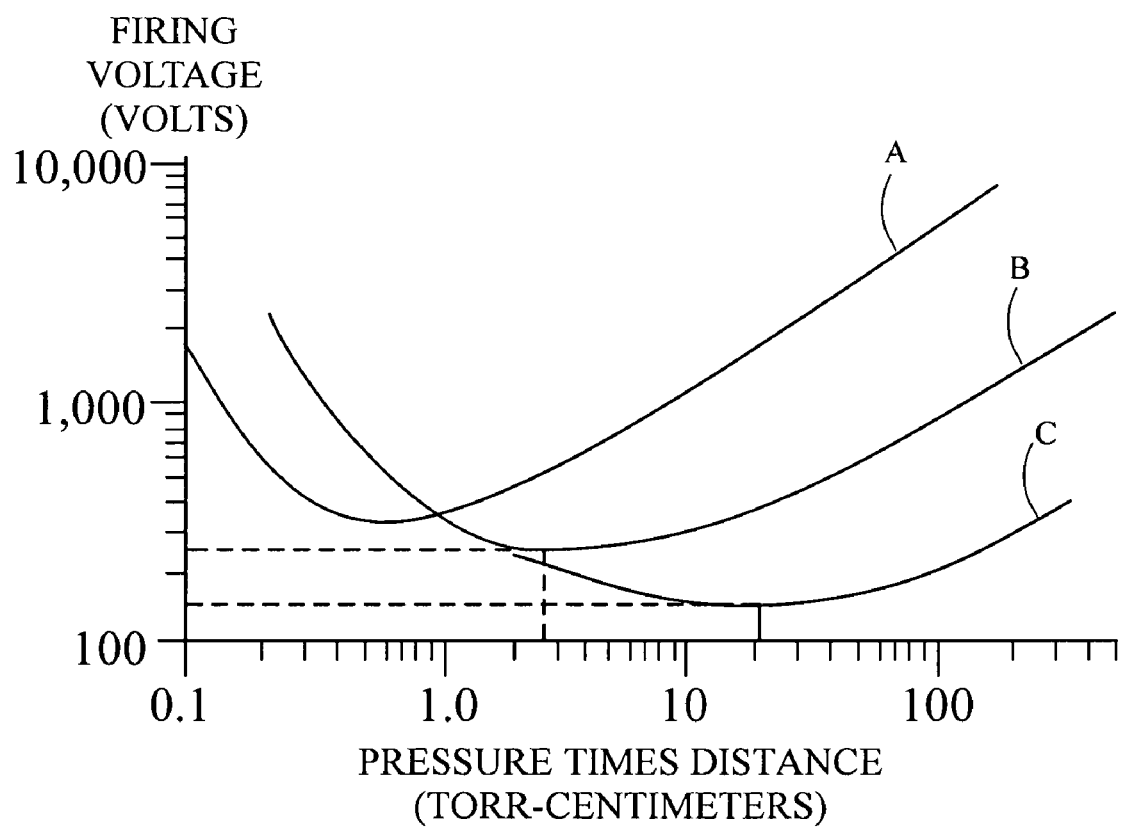
FIG. 19 shows hypothetical Paschen curves for three typical hypothetical gases.

The plasma-shell such as a plasma-sphere, plasma-disc, or plasma-dome is filled with an ionizable gas. Each gas composition or mixture has a unique curve associated with it, called the Paschen curve as illustrated in FIG. 19. The Paschen curve is a graph of the breakdown voltage verses the product of the pressure times the discharge distance. It is usually given in Torr-centimeters. As can be seen from the illustration in FIG. 19, the gases typically have a saddle region in which the voltage is at a minimum. Often it is desirable to choose pressure and gas discharge distance in the saddle region to minimize the voltage. In the case of a plasma-sphere, the distance is the diameter of the sphere or some cord of the sphere as defined by the locating and positioning of the electrodes. In the case of another geometric shape such as a plasma-disc or plasma-dome, it is an axis across the geometric body selected for gas discharge as determined by the locating and positioning of the electrodes. In one embodiment, the inside of the plasma-shell contains a secondary electron emitter. Secondary electron emitters lower the breakdown voltage of the gas and provide a more efficient discharge. Plasma displays traditionally use magnesium oxide for this purpose, although other materials may be used including other Group IIa oxides, rare earth oxides, lead oxides, aluminum oxides, and other materials. Mixtures of secondary electron emitters may be used. It may also be beneficial to add luminescent substances such as phosphor to the inside or outside of the sphere. In one embodiment and mode hereof, the plasma-shell material is a metal or metalloid oxide with an ionizable gas of 99.99% atoms of neon and 0.01% atoms of argon or xenon for use in a monochrome PDP. Examples of shell materials include glass, silica, aluminum oxides, zirconium oxides, and magnesium oxides. In another embodiment, the plasma-shell contains luminescent substances such as phosphors selected to provide different visible colors including red, blue, and green for use in a full color PDP. The metal or metalloid oxides are typically selected to be highly transmissive to photons produced by the gas discharge especially in the UV range. In one embodiment, the ionizable gas is selected from any of several known combinations that produce UV light including pure helium, helium with up to 1% atoms neon, helium with up to 1% atoms of argon and up to 15% atoms nitrogen, and neon with up to 15% atoms of xenon or argon. For a PDP radiation detector emitting multi-color photons, red, blue, and/or green light-emitting luminescent substance may be applied to the interior or exterior of the plasma-shell. The exterior application may comprise a slurry or tumbling process with curing, typically at low temperatures. Infrared curing can also be used. The luminescent substance may be applied by other methods or processes, which include spraying, ink jet, dipping, and so forth. Thick film methods such as screen-printing may be used. Thin film methods such as sputtering and vapor phase deposition may be used. The luminescent substance may be applied externally before or after the plasma-shell is attached to the PDP substrate. As discussed hereinafter, the luminescent substance may be organic and/or inorganic. The internal or external surface of the plasma-shell may be partially or completely coated with luminescent material. In one preferred embodiment the external surface is completely coated with luminescent material. The bottom or rear of the plasma-shell may be coated with a suitable light reflective material in order to reflect more light toward the top or front viewing direction of the plasma-shell. The light reflective material may be applied by any suitable process, such as spraying, ink jet, dipping, and so forth. Thick film methods such as screen-printing may be used. Thin film methods such as sputtering and vapor phase deposition may be used. The light reflective material may be applied over the luminescent material or the luminescent material may be applied over the light reflective material. In one embodiment, the electrodes are made of or coated with a light reflective material such that the electrodes also may function as a light reflector.

Plasma-Disc

Figure 20A:
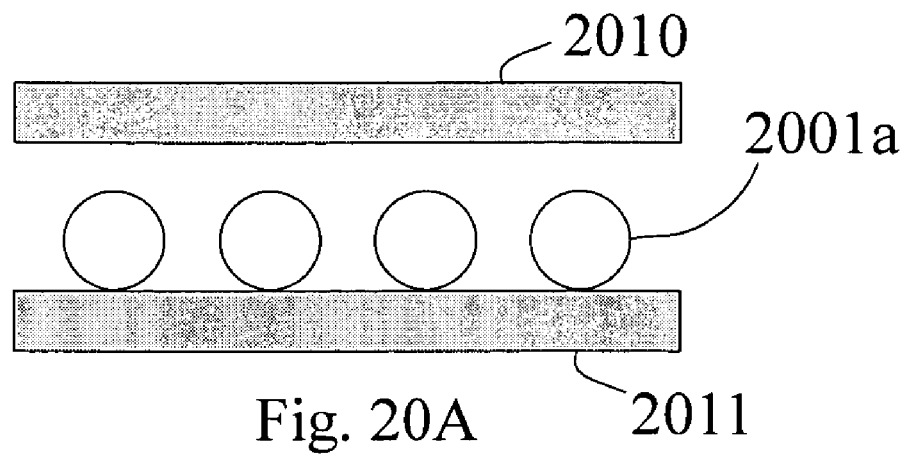
FIGS. 20A, 20B, and 20C show process steps for making plasma-discs.
Figure 20B:
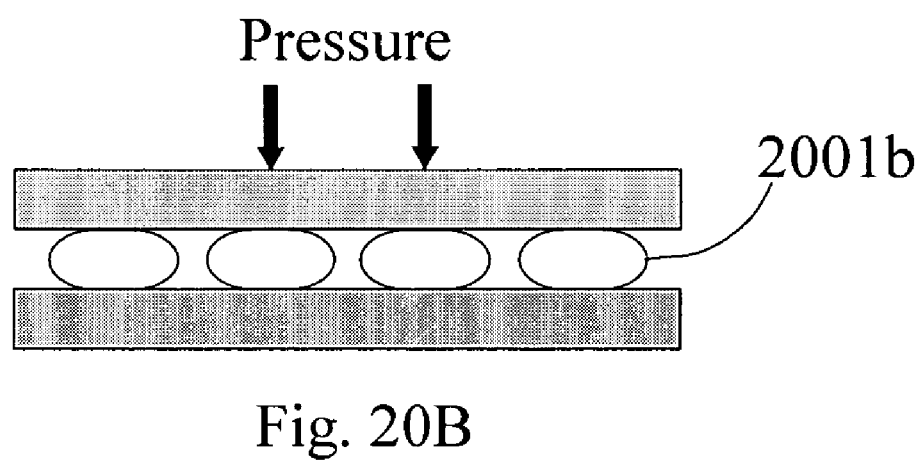
Figure 20C:
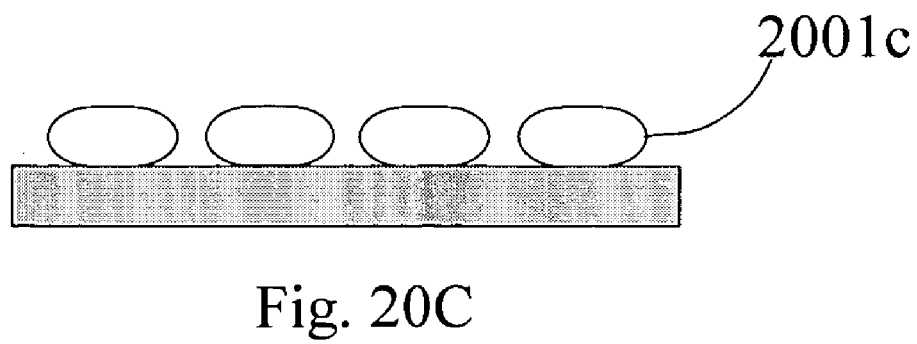

A plasma-shell with two substantially flattened opposite sides, i.e., top and bottom is called a plasma-disc. A plasma-disc may be formed by flattening a plasma-sphere on one more pairs of opposing sides such as top and bottom. The flat sides enhance the mounting of the plasma-disc to the substrate and the connecting of the plasma-disc to electrical contacts such as the electrodes. The flattening of the plasma-sphere to form a plasma-disc is typically done while the sphere shell is at an ambient temperature or at elevated softening temperature below the melting temperature. The flat viewing surface in a plasma-disc tends to increase the overall luminous efficiency of a PDP. Plasma-discs are typically produced while the plasma-sphere is at an elevated temperature below its melting point. While the plasma-sphere is at the elevated temperature, a sufficient pressure or force is applied with member 2010 to flatten the spheres between members 2010 and 2011 into disc shapes with flat top and bottom as illustrated in FIGS. 20A, 20B, and 20C. FIG. 20A shows a plasma-sphere 2001a. FIG. 20B shows uniform pressure applied to the plasma-sphere to form a flattened plasma-disc 2001b. Heat can be applied during the flattening process such as by heating members 2010 and 2011. FIG. 20C shows the resultant flat plasma-disc 2001c. One or more luminescent substances can be applied to the plasma-Disc. Like a coin that can only land "heads" or "tails", a plasma-disc with a flat top and flat bottom may be applied to a substrate in one of two flat positions. However, in some embodiments, the plasma-disc may be positioned on edge on or within the substrate.

Plasma-Dome

A plasma-dome is shown in FIGS. 21, 21A, and 21B. FIG. 21 is a top view of a plasma-dome showing an outer shell wall 2101. FIG. 21A is a section 21A-21A view of FIG. 21 showing a flattened outer wall 2101a and flattened inner wall 2102a. FIG. 21B is a section 21B-21B view of FIG. 21.

Figure 22:
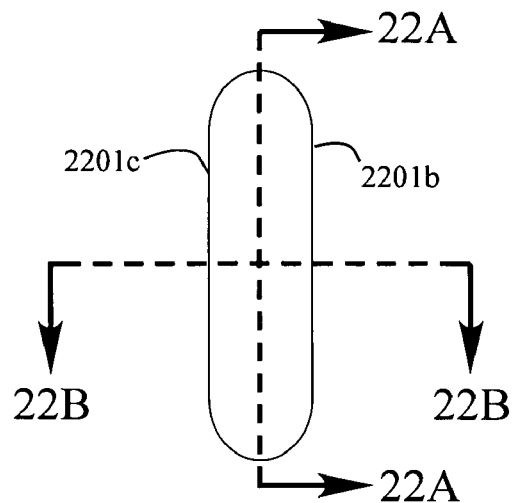
FIGS. 22, 22A, and 22B show a plasma-dome with multiple flat sides.
Figure 22A:
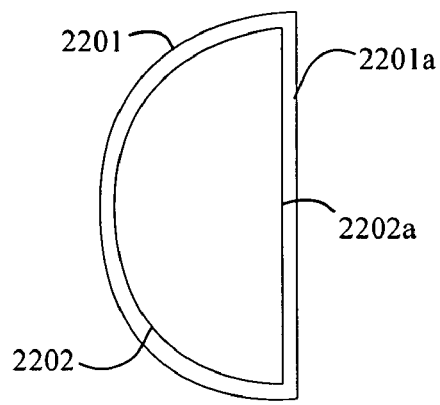
Figure 22B:
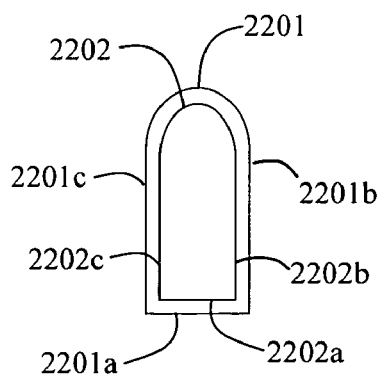

FIG. 22 is a top view of a plasma-dome with flattened outer shell wall 2201b and 2201c. FIG. 22A is a section 22A-22A view of FIG. 22 showing flattened outer wall 2201a and flattened inner wall 2202a with a dome having outer wall 2201 and inner wall 2202. FIG. 22B is a section 22B-22B view of FIG. 22. In forming a PDP, the dome portion may be positioned within the substrate with the flat side up in the viewing direction or with the dome portion up in the viewing direction.

Figure 23:
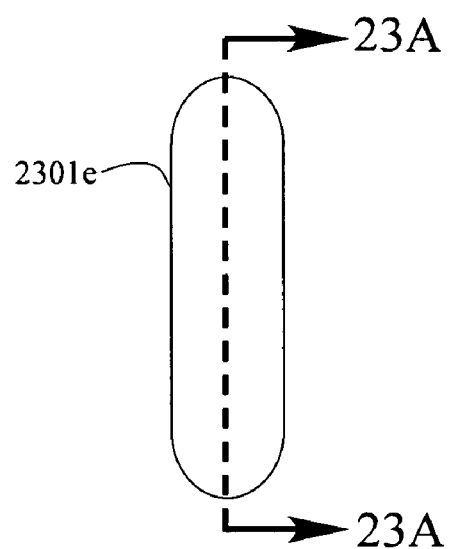
FIGS. 23, and 23A show a plasma-disc.
Figure 23A:
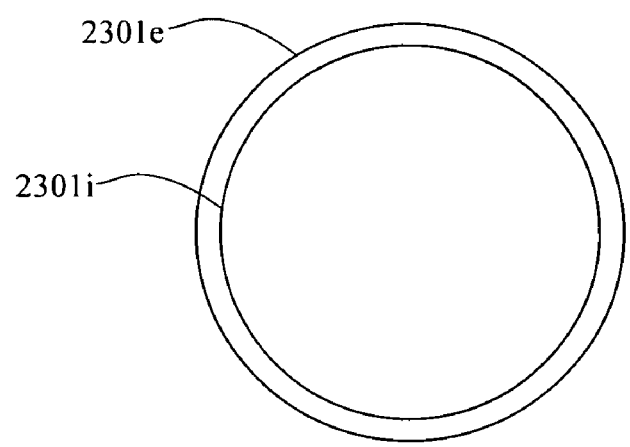

FIG. 23 shows a plasma-disc with opposing flat exterior surfaces 2301e. FIG. 23A is a section 23A-23A view of a plasma-disc shown in FIG. 23 with opposite flat sides (not shown) and inner surface 2301i and exterior surface of 2301e.

Figure 24:
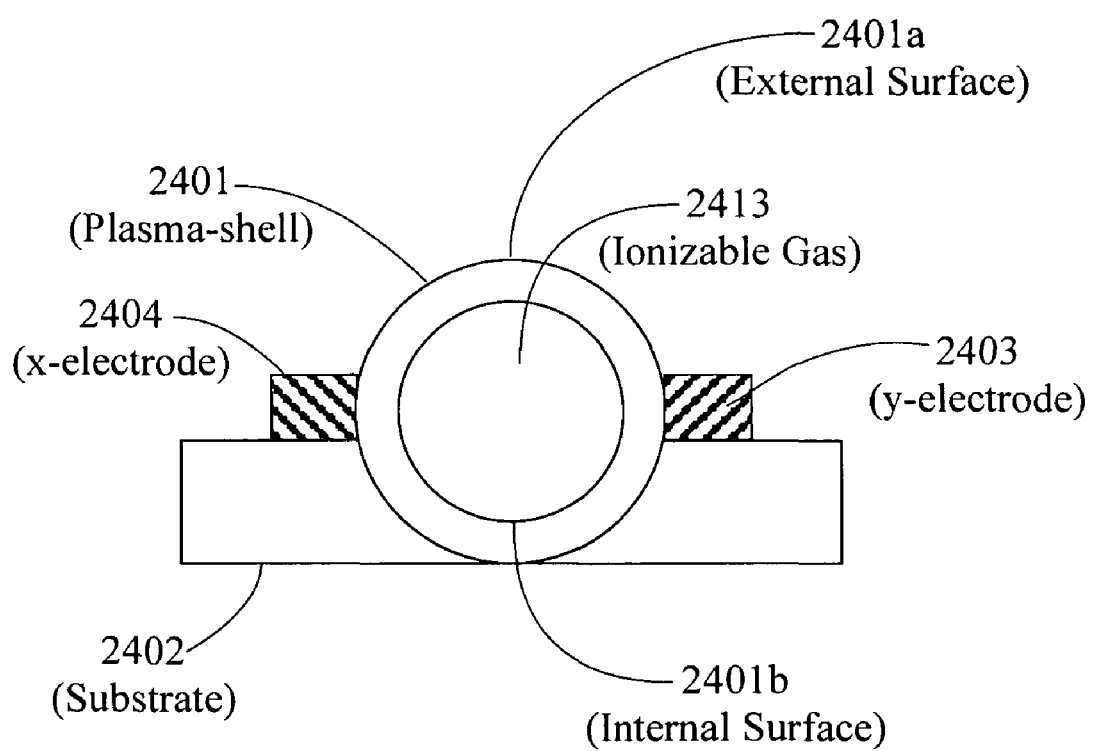
FIG. 24 shows a plasma-shell mounted on a substrate as a PDP pixel element.

In one embodiment of this invention, the plasma-shell is used as the pixel element of a single substrate PDP device as shown in FIG. 24. In FIG. 24 the plasma-shell 2401 may be a plasma-disc, plasma-sphere, or plasma-dome. For the assembly of multiple PDP cells or pixels, it is contemplated using plasma-discs alone or in combination with other plasma-shells such as plasma-spheres or plasma-domes. The plasma-shell 2401 has an external surface 2401a and an internal surface 2401b and is positioned in a well or cavity on a PDP substrate 2402 and is composed of a material selected to have the properties of transmissivity to light, while being sufficiently impermeable as to the confined ionizable gas 2413. The gas 2413 is selected so as to discharge and produce light in the visible, IR, near UV, or UV range when a voltage is applied to electrodes 2404 and 2403. In the case where the discharge of the ionizable gas produces UV, a UV excitable phosphor (not shown) may be applied to the exterior or interior of the Plasma shell 2401 or embedded within the shell to produce light. Besides phosphors, other coatings may be applied to the interior and exterior of the shell to enhance contrast, and/or to decrease operating voltage. One such coating contemplated in the practice of this invention is a secondary electron emitter material such as magnesium oxide. Magnesium oxide is used in a PDP to decrease operating voltages. Also light reflective material coatings may be used. In accordance with this invention, there is provided apparatus and method comprising a very sensitive ionizing radiation sensor made from an array of plasma-shells. The inherent sensitivity of each plasma-shell to ionizing radiation is multiplied by the large surface area that can be combined into a single sensor. This is even more so when a plasma-disc is used.

PDP Electronics

Figure 25:
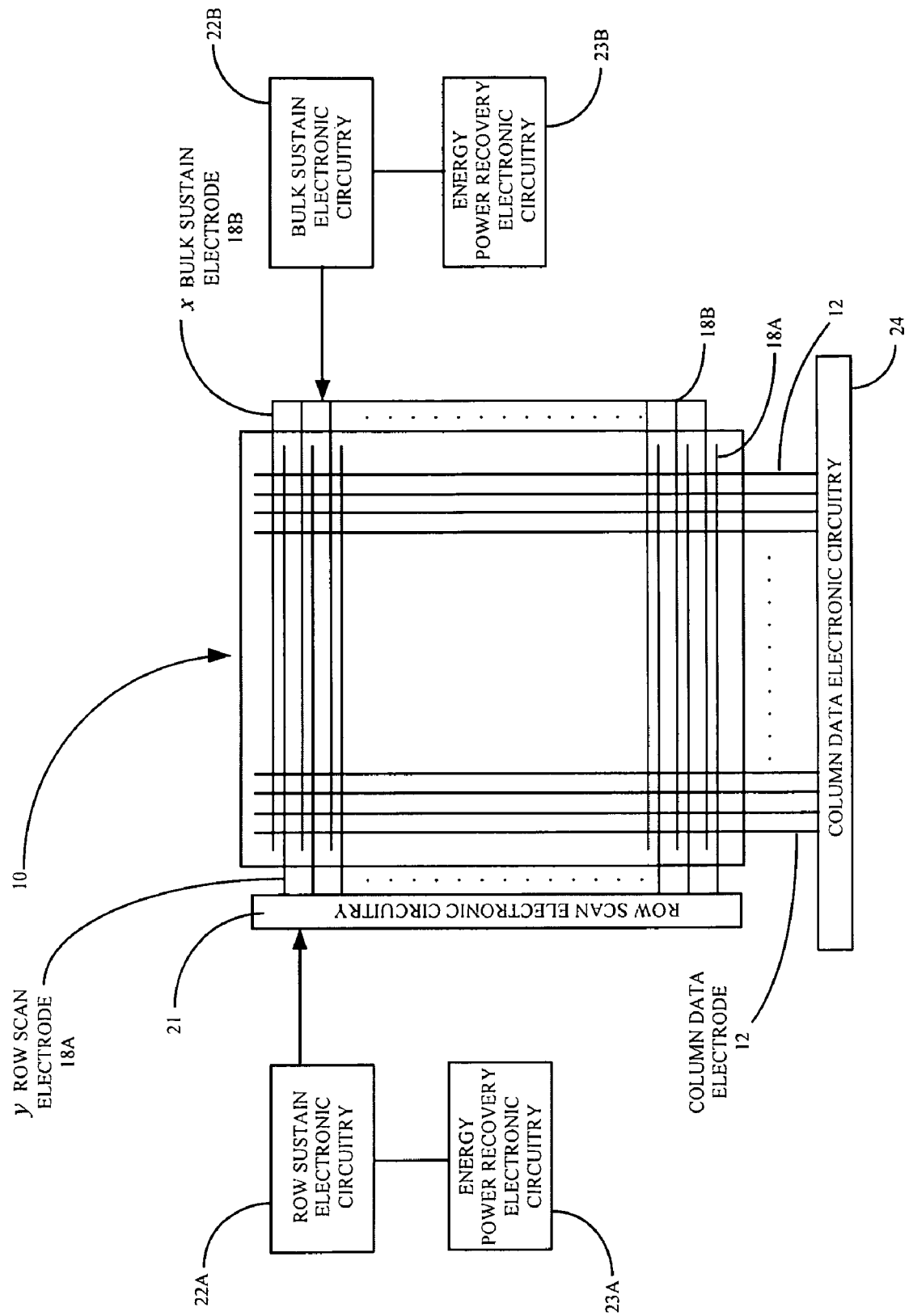
FIG. 25 shows a block diagram of electronics for driving an AC gas discharge plasma display with plasma-shells as pixels.

FIG. 25 is a block diagram of a plasma display panel (PDP) 10 with electronic circuitry 21 for y row scan electrodes 18A, bulk sustain electronic circuitry 22B for x bulk sustain electrode 18B and column data electronic circuitry 24 for the column data electrodes 12. The pixels or sub-pixels of the PDP comprise plasma-shells not shown in FIG. 25.

There is also shown row sustain electronic circuitry 22A with an energy power recovery electronic circuit 23A. There is also shown energy power recovery electronic circuitry 23B for the bulk sustain electronic circuitry 22B.

The electronics architecture used in FIG. 25 is ADS as described in the Shinoda and other patents cited herein including U.S. Pat. No. 5,661,500 (Shinoda et al.). In addition, other architectures as described herein and known in the prior art may be utilized. These architectures including Shinoda ADS may be used to address plasma-shells, including plasma-spheres, plasma-discs, or plasma-domes in a PDP.

ADS

A basic electronics architecture for addressing and sustaining a surface discharge AC plasma display is called Address Display Separately (ADS). The ADS architecture may be used for a monochrome or multicolor display. The ADS architecture is disclosed in a number of Fujitsu patents including U.S. Pat. Nos. 5,541,618 (Shinoda) and 5,724,054 (Shinoda), incorporated herein by reference. Also see U.S. Pat. Nos. 5,446,344 (Kanazawa) and 5,661,500 (Shinoda et al.), incorporated herein by reference. ADS has become a basic electronic architecture widely used in the AC plasma display industry for the manufacture of PDP monitors and television.

Fujitsu ADS architecture is commercially used by Fujitsu and is also widely used by competing manufacturers including Matsushita and others. ADS is disclosed in U.S. Pat. No. 5,745,086 (Weber), incorporated herein by reference. See FIGS. 2, 3, 11 of Weber ('086). The ADS method of addressing and sustaining a surface discharge display as disclosed in U.S. Pat. Nos. 5,541,618 (Shinoda) and 5,724,054 (Shinoda) incorporated herein by reference, sustains the entire panel (all rows) after the addressing of the entire panel. The addressing and sustaining are done separately and are not done simultaneously. ADS may be used to address plasma-shells including plasma-spheres, plasma-discs, or plasma-domes in a PDP.

ALIS

This invention may also use the shared electrode or electronic ALIS drive system disclosed by Fujitsu in U.S. Pat. Nos. 6,489,939 (Asso et al.), 6,498,593 (Fujimoto et al.), 6,531,819 (Nakahara et al.), 6,559,814 (Kanazawa et al.), 6,577,062 (Itokawa et al.), 6,603,446 (Kanazawa et al.), 6,630,790 (Kanazawa et al.), 6,636,188 (Kanazawa et al.), 6,667,579 (Kanazawa et al.), 6,667,728 (Kanazawa et al.), 6,703,792 (Kawada et al.), and U.S. Patent Application Publication 2004/0046509 (Sakita), all of which are incorporated herein by reference. In accordance with this invention, ALIS may be used to address plasma-shells including plasma-spheres, plasma-discs, and plasma-domes in a PDP.

AWD

Another electronic architecture is called Address While Display (AWD). The AWD electronics architecture was first used during the 1970s and 1980s for addressing and sustaining monochrome PDP. In AWD architecture, the addressing (write and/or erase pulses) are interspersed with the sustain waveform and may include the incorporation of address pulses onto the sustain waveform. Such address pulses may be on top of the sustain and/or on a sustain notch or pedestal. See for example U.S. Pat. Nos. 3,801,861 (Petty et al.) and 3,803,449 (Schmersal), both incorporated herein by reference. FIGS. 1 and 3 of the Shinoda ('054) ADS patent discloses AWD architecture as prior art.

The AWD electronics architecture for addressing and sustaining monochrome PDP has also been adopted for addressing and sustaining multi-color PDP. For example, Samsung Display Devices Co., Ltd., has disclosed AWD and the superimpose of address pulses with the sustain pulse. Samsung specifically labels this as address while display (AWD). See "High-Luminance and High-Contrast HDTV PDP with Overlapping Driving Scheme", J. Ryeom et al., pages 743 to 746, *Proceedings of the Sixth International Display Workshops*, IDW 99, Dec. 1-3, 1999, Sendai, Japan and AWD as disclosed in U.S. Pat. No. 6,208,081 (Eo et al.), incorporated herein by reference.

LG Electronics Inc. has disclosed a variation of AWD with a Multiple Addressing in a Single Sustain (MASS) in U.S. Pat. No. 6,198,476 issued to Jin-Won Hong et al. of LG Electronics, incorporated herein by reference. Also see U.S. Pat. No. 5,914,563 issued to Eun-Cheol Lee et al. of LG Electronics, incorporated herein by reference. AWD may be used to address plasma-shells including plasma-spheres, plasma-discs, and plasma-domes in a PDP.

An AC voltage refresh technique or architecture is disclosed by U.S. Pat. No. 3,958,151 (Yano et al.), incorporated herein by reference. In one embodiment of this invention the plasma-shells are filled with pure neon and operated with the architecture of Yano ('151).

Energy Recovery

Energy recovery is used for the efficient operation of a PDP. Examples of energy recovery architecture and circuits are well known in the prior art. These include U.S. Pat. Nos. 4,772,884 (Weber et al.) 4,866,349 (Weber et al.), 5,081,400 (Weber et al.), 5,438,290 (Tanaka), 5,642,018 (Marcotte), 5,670,974 (Ohba et al.), 5,808,420 (Rilly et al.) and 5,828,353 (Kishi et al.), all incorporated herein by reference.

Slow Ramp Reset

Slow rise slopes or ramps may be used in the practice of this invention. The prior art discloses slow rise slopes or ramps for the addressing of AC plasma displays. The early patents include U.S. Pat. Nos. 4,063,131 (Miller) and 4,087,805 (Miller), 4,087,807 (Miavecz), and 4,611,203 (Criscimagna et al.) and 4,683,470 (Criscimagna et al.), all incorporated herein by reference.

Architecture for a slow ramp reset voltage is disclosed in U.S. Pat. No. 5,745,086 (Weber), incorporated herein by reference. Weber ('086) discloses positive or negative ramp voltages that exhibit a slope that is set to assure that current flow through each display pixel site remains in a positive resistance region of the gas discharge. The slow ramp architecture may be used in combination with ADS as disclosed in FIG. 11 of Weber 086. PCT Patent Application WO 00/30065 and U.S. Pat. No. 6,738,033, both filed by Junichi Hibino et al. of Matsushita also disclose architecture for a slow ramp reset voltage and are incorporated herein by reference.

Artifact Reduction

Artifact reduction techniques may be used in the practice of this invention. The PDP industry has used various techniques to reduce motion and visual artifacts in a PDP display. Pioneer of Tokyo, Japan has disclosed a technique called CLEAR for the reduction of false contour and related problems. See "Development of New Driving Method for AC-PDPs" by Tokunaga et al. of Pioneer *Proceedings of the Sixth International Display Workshops*, IDW 99, pages 787-790, Dec. 1-3, 1999, Sendai, Japan. Also see European Patent Applications EP 1 020 838 A1 by Tokunaga et al. of Pioneer.

The CLEAR techniques disclosed in the above Pioneer IDW publication and Pioneer EP 1020838 A1, are incorporated herein by reference.

In the practice of this invention, it is contemplated that the ADS architecture may be combined with a CLEAR or like technique as required for the reduction of motion and visual artifacts. The CLEAR and ADS may also be used with the slope ramp address.

SAS

In one embodiment of this invention it is contemplated using SAS electronic architecture to address a PDP panel constructed of plasma-shells, plasma-discs, and/or plasma-domes. SAS architecture comprises addressing one display section of a surface discharge PDP while another section of the PDP is being simultaneously sustained. This architecture is called Simultaneous Address and Sustain (SAS). See U.S. Patent Application 2001/0038366, incorporated herein by reference.

SAS offers a unique electronic architecture which is different from prior art columnar discharge and surface discharge electronics architectures including ADS, AWD, and MASS. It offers important advantages as discussed herein.

In accordance with the practice of SAS with a surface discharge PDP, addressing voltage waveforms are applied to a surface discharge PDP having an array of data electrodes on a bottom or rear substrate and an array of at least two electrodes on a top or front viewing substrate, one top electrode being a bulk sustain electrode x and the other top electrode being a row scan electrode y. The row scan electrode y may also be called a row sustain electrode because it performs the dual functions of both addressing and sustaining.

An important feature and advantage of SAS is that it allows selectively addressing of one section of a surface discharge PDP with selective write and/or selective erase voltages while another section of the panel is being simultaneously sustained. A section is defined as a predetermined number of bulk sustain electrodes x and row scan electrodes y. In a surface discharge PDP, a single row is comprised of one pair of parallel top electrodes x and y.

In one embodiment of SAS, there is provided the simultaneous addressing and sustaining of at least two sections $S_1$ and $S_2$ of a surface discharge PDP having a row scan, bulk sustain, and data electrodes, which comprises addressing one section $S_1$ of the PDP while a sustaining voltage is being simultaneously applied to at least one other section $S_2$ of the PDP.

In another embodiment, the simultaneous addressing and sustaining is interlaced whereby one pair of electrodes y and x are addressed without being sustained and an adjacent pair of electrodes y and x are simultaneously sustained without being addressed. This interlacing can be repeated throughout the display. In this embodiment, a section S is defined as one or more pairs of interlaced y and x electrodes.

In the practice of SAS, the row scan and bulk sustain electrodes of one section that is being sustained may have a reference voltage which is offset from the voltages applied to the data electrodes for the addressing of another section such that the addressing does not electrically interact with the row scan and bulk sustain electrodes of the section which is being sustained.

In a plasma display in which gray scale is realized through time multiplexing, a frame or a field of picture data is divided into subfields. Each subfield is typically composed of a reset period, an addressing period, and a number of sustains. The number of sustains in a subfield corresponds to a specific gray scale weight. Pixels that are selected to be "on" in a given subfield will be illuminated proportionally to the number of sustains in the subfield. In the course of one frame, pixels may be selected to be "on" or "off" for the various subfields. A gray scale image is realized by integrating in time the various "on" and "off" pixels of each of the subfields.

Addressing is the selective application of data to individual pixels. It includes the writing or erasing of individual pixels.

Reset is a voltage pulse which forms wall charges to enhance the addressing of a pixel. It can be of various waveform shapes and voltage amplitudes including fast or slow rise time voltage ramps and exponential voltage pulses. A reset is typically used at the start of a frame before the addressing of a section. A reset may also be used before the addressing period of a subsequent subfield.

In accordance with a another embodiment of the SAS architecture, there is applied a slow rise time or slow ramp reset voltage as disclosed in U.S. Pat. No. 5,745,086 (Weber) cited above and incorporated herein by reference. As used herein slow rise time or slow ramp voltage is a bulk address commonly called a reset pulse with a positive or negative slope so as to provide a uniform wall charge at all pixels in the PDP.

The slower the rise time of the reset ramp, the less visible the light or background glow from those off-pixels (not in the on-state) during the slow ramp bulk address.

Less background glow is particularly desirable for increasing the contrast ratio which is inversely proportional to the light-output from the off pixels during the reset pulse. Those off-pixels which are not in the on-state will give a background glow during the reset. The slower the ramp, the less light output with a resulting higher contrast ratio. Typically the slow ramp reset voltages disclosed in the prior art have a slope of about 3.5 volts per microsecond with a range of about 2 to about 9 volts per microsecond. In the SAS architecture, it is possible to use slow ramp reset voltages below 2 volts per microsecond, for example about 1 to 1.5 volts per microsecond without decreasing the number of PDP rows, without decreasing the number of sustain pulses or without decreasing the number of subfields.

Positive Column Gas Discharge

In one embodiment of this invention, it is contemplated that the PDP may be operating using positive column gas discharge. The use of plasma-shells, including plasma-spheres, plasma-discs, and plasma-domes allow the PDP to be operated with positive column gas discharge, for example as disclosed by Weber, Rutherford, and other prior art cited hereinafter and incorporated by reference. The discharge length inside the plasma-shell must be sufficient to accommodate the length of the positive column gas discharge, generally up to about 1400 micrometers. A plasma-disc or plasma-dome may be comprised of a flattened or partially flattened microsphere. In some embodiments, elongated tubes called plasma-tubes may be used. The plasma-tubes may be of any geometric shape and of any predetermined length, typically at least about 1400 micrometers to accommodate positive column discharge. A plasma-tube differs from a plasma-shell by containing multiple gas discharge cells or pixels. The following prior art references relate to positive column discharge and are incorporated herein by reference.

U.S. Pat. No. 6,184,848 (Weber) discloses the generation of a positive column plasma discharge wherein the plasma discharge evidences a balance of positively charged ions and electrons. The PDP discharge operates using the same fundamental principle as a fluorescent lamp, i.e., a PDP employs ultraviolet light generated by a gas discharge to excite visible light emitting phosphors. Weber discloses an inactive isolation bar.

"PDP With Improved Drive Performance at Reduced Cost" by James Rutherford, Huntertown, Ind., *Proceedings of the Ninth International Display Workshops*, Hiroshima, Japan, pages 837 to 840, Dec. 4-6, 2002, discloses an electrode structure and electronics for a positive column plasma display. Rutherford discloses the use of the isolation bar as an active electrode.

Additional positive column gas discharge prior art incorporated by reference include: "Positive Column AC Plasma Display", Larry F. Weber, 23$^{rd}$ International Display Research Conference (IDRC 03), September 16-18, *Conference Proceedings*, pages 119-124, Phoenix Ariz.; "Dielectric Properties and Efficiency of Positive Column AC PDP", Nagorny et al., 23$^{rd}$ International Display Research Conference (IDRC 03), Sep. 16-18, 2003, Conference Proceedings, P-45, pages 300-303, Phoenix, Ariz.; "Simulations of AC PDP Positive Column and Cathode Fall Efficiencies", Drallos et al., 23$^{rd}$ International Display Research Conference (IDRC 03), Sep. 16-18, 2003, *Conference Proceedings*, P-48, pages 304-306, Phoenix, Ariz.; also U.S. Pat. Nos. 6,376,995 (Kato et al.); 6,528,952 (Kato et al.); 6,693,389 (Marcotte et al.); 6,768,478 (Wani et al.); and U.S. Patent Application Publication 2003/0102812 (Marcotte et al.).

Radio Frequency

The plasma-shells may be operated with radio frequency (RF). The RF may especially be used to sustain the plasma discharge. RF may also be used to operate the plasma-shells with a positive column discharge. The use of RF in a PDP is disclosed in the following prior art, all incorporated herein by reference: U.S. Pat. Nos. 6,271,810 (Yoo et al.), 6,340,866 Yoo, 6,473,061 (Lim et al.), 6,476,562 (Yoo et al.), 6,483,489 (Yoo et al.), 6,501,447 (Kang et al.), 6,605,897 (Yoo), 6,624,799 (Kang et al.), 6,661,394 (Choi), and 6,794,820 (Kang et al.).

Shell Materials

The plasma-shell may be constructed of any suitable material such as glass or plastic as disclosed in the prior art. In the practice of this invention, it is contemplated that the plasma-shell may be made of any suitable inorganic compounds of metals and/or metalloids, including mixtures or combinations thereof. Contemplated inorganic compounds include the oxides, carbides, nitrides, nitrates, silicates, aluminates, phosphates, and/or borates.

The metals and/or metalloids are selected from magnesium, calcium, strontium, barium, yttrium, lanthanum, cerium, neodymium, gadolinium, terbium, erbium, thorium, titanium, zirconium, hafnium, vanadium, niobium, tantalum, chromium, molybdenum, tungsten, manganese, rhenium, iron, ruthenium, osmium, cobalt, rhodium, iridium, nickel, copper, silver, zinc, cadmium, boron, aluminum, gallium, indium, thallium, carbon, silicon, germanium, tin, lead, phosphorus, and bismuth.

Inorganic materials suitable for use are magnesium oxide (s), aluminum oxide(s), zirconium oxide(s), and silicon carbide(s) such as MgO, $Al_2O_3$, $ZrO_2$, $SiO_2$, and/or SiC.

In one embodiment of this invention, the plasma-shell is made of fused particles of glass, ceramic, glass ceramic, refractory, fused silica, quartz, or like amorphous and/or crystalline materials including mixtures of such.

In one preferred embodiment, a ceramic material is selected based on its transmissivity to light after firing. This may include selecting ceramics material with various optical cutoff frequencies to produce various colors. One preferred material contemplated for this application is aluminum oxide. Aluminum oxide is transmissive from the UV range to the IR range. Because it is transmissive in the UV range, phosphors excited by UV may be applied to the exterior of the plasma-shell to produce various colors. The application of the phosphor to the exterior of the plasma-shell may be done by any suitable means before or after the plasma-shell is positioned in the PDP, i.e., on a flexible or rigid substrate. There may be applied several layers or coatings of phosphors, each of a different composition.

In one specific embodiment of this invention, the plasma-shell is made of an aluminate silicate or contains a layer of aluminate silicate. When the ionizable gas mixture contains helium, the aluminate silicate is especially beneficial in preventing the escaping of helium.

It is also contemplated that the plasma-shell may be made of lead silicates, lead phosphates, lead oxides, borosilicates, alkali silicates, aluminum oxides, and pure vitreous silica.

For secondary electron emission, the plasma-shell may be made in whole or in part from one or more materials such as magnesium oxide having a sufficient Townsend coefficient. These include inorganic compounds of magnesium, calcium, strontium, barium, gallium, lead, aluminum, boron, and the rare earths especially lanthanum, cerium, actinium, and thorium. The contemplated inorganic compounds include oxides, carbides, nitrides, nitrates, silicates, aluminates, phosphates, borates and other inorganic compounds of the above and other elements.

The plasma-shell may also contain or be partially or wholly constructed of luminescent materials such as inorganic phosphor(s). The phosphor may be a continuous or discontinuous layer or coating on the interior or exterior of the shell. Phosphor particles may also be introduced inside the plasma-shell or embedded within the shell. Luminescent quantum dots may also be incorporated into the shell.

Secondary Electron Emission

The use of secondary electron emission (Townsend coefficient) materials in a plasma display is well known in the prior art and is disclosed in U.S. Pat. No. 3,716,742 (Nakayama et al.) The use of Group IIA compounds including magnesium oxide is disclosed in U.S. Pat. Nos. 3,836,393 and 3,846,171. The use of rare earth compounds in an AC plasma display is disclosed in U.S. Pat. Nos. 4,126,807, 4,126,809, and 4,494,038, all issued to Wedding et al., and incorporated herein by reference. Lead oxide may also be used as a secondary electron material. Mixtures of secondary electron emission materials may be used.

In one embodiment and mode contemplated for the practice of this invention, the secondary electron emission material is magnesium oxide on part or all of the internal surface of a plasma-shell. The secondary electron emission material may also be on the external surface. The thickness of the magnesium oxide may range from about 250 Angstrom Units to about 10,000 Angstrom Units (Å).

The entire plasma-shell may be made of a secondary electronic material such as magnesium oxide. A secondary electron material may also be dispersed or suspended as particles within the ionizable gas such as with a fluidized bed. Phosphor particles may also be dispersed or suspended in the gas such as with a fluidized bed, and may also be added to the inner or external surface of the plasma-shell.

Magnesium oxide increases the ionization level through secondary electron emission that in turn leads to reduced gas discharge voltages. In one embodiment, the magnesium oxide is on the inner surface of the plasma-shell and the phosphor is located on external surface of the plasma-shell.

Magnesium oxide is susceptible to contamination. To avoid contamination, gas discharge (plasma) displays are assembled in clean rooms that are expensive to construct and maintain. In traditional plasma panel production, magnesium oxide is applied to an entire open substrate surface and is vulnerable to contamination. The adding of the magnesium oxide layer to the inside of a plasma-shell minimizes exposure of the magnesium oxide to contamination.

The magnesium oxide may be applied to the inside of the plasma-shell by incorporating magnesium vapor as part of the ionizable gases introduced into the plasma-shell while the microsphere is at an elevated temperature. The magnesium may be oxidized while at an elevated temperature.

In some embodiments, the magnesium oxide may be added as particles to the gas. Other secondary electron materials may be used in place of or in combination with magnesium oxide. In one embodiment hereof, the secondary electron material such as magnesium oxide or any other selected material such as magnesium to be oxidized in situ is introduced into the gas by means of a fluidized bed. Other materials such as phosphor particles or vapor may also be introduced into the gas with a fluid bed or other means.

Ionizable Gas

The hollow plasma-shell as used in the practice of this invention contain(s) one or more ionizable gas components. In the practice of this invention, the gas is selected to emit photons in the visible, IR, and/or UV spectrum.

The UV spectrum is divided into regions. The near UV region is a spectrum ranging from about 340 to 450 nm (nanometers). The mid or deep UV region is a spectrum ranging from about 225 to 325 nm. The vacuum UV region is a spectrum ranging from about 100 to 200 nm. The PDP prior art has used vacuum UV to excite photoluminescent phosphors. In the practice of this invention, it is contemplated using a gas which provides UV over the entire spectrum ranging from about 100 to about 450 nm. The PDP operates with greater efficiency at the higher range of the UV spectrum, such as in the mid UV and/or near UV spectrum. In one preferred embodiment, there is selected a gas which emits gas discharge photons in the near UV range. In another embodiment, there is selected a gas which emits gas discharge photons in the mid UV range. In one embodiment, the selected gas emits photons from the upper part of the mid UV range through the near UV range, about 225 nm to 450 nm.

As used herein, ionizable gas or gas means one or more gas components. In the practice of this invention, the gas is typically selected from a mixture of the noble or rare gases of neon, argon, xenon, krypton, helium, and/or radon. The rare gas may be a Penning gas mixture. Other contemplated gases include nitrogen, $CO_2$, CO, mercury, halogens, excimers, oxygen, hydrogen, and mixtures thereof.

Isotopes of the above and other gases are contemplated. These include isotopes of helium such as helium-3, isotopes of hydrogen such as deuterium (heavy hydrogen), tritium ($T^3$) and DT, isotopes of the rare gases such as xenon-129, isotopes of oxygen such as oxygen-18. Other isotopes include deuterated gases such as deuterated ammonia ($ND_3$) and deuterated silane ($SiD_4$).

In one embodiment, a two-component gas mixture (or composition) is used such as a mixture of argon and xenon, argon and helium, xenon and helium, neon and argon, neon and xenon, neon and helium, and neon and krypton.

Specific two-component gas mixtures (compositions) include about 5 to 90% atoms of argon with the balance xenon.

Another two-component gas mixture is a mother gas of neon containing 0.05 to 15% atoms of xenon, argon, or krypton. This can also be a three-component, four-component gas, or five-component gas by using small quantities of an additional gas or gases selected from xenon, argon, krypton, and/or helium.

In another embodiment, a three-component ionizable gas mixture is used such as a mixture of argon, xenon, and neon wherein the mixture contains at least 5% to 80% atoms of argon, up to 15% xenon, and the balance neon. The xenon is present in a minimum amount sufficient to maintain the Penning effect. Such a mixture is disclosed in U.S. Pat. No. 4,926,095 (Shinoda et al.), incorporated herein by reference. Other three-component gas mixtures include argon-helium-xenon; krypton-neon-xenon; and krypton-helium-xenon.

U.S. Pat. No. 4,081,712 (Bode et al.), incorporated by reference, discloses the addition of helium to a gaseous medium of 90 to 99.99% atoms of neon and 10 to 0.01% atoms of argon, xenon, and/or krypton.

In one embodiment there is used a high concentration of helium with the balance selected from one or more gases of neon, argon, xenon, and nitrogen as disclosed in U.S. Pat. No. 6,285,129 (Park) and incorporated herein by reference.

A high concentration of xenon may also be used with one or more other gases as disclosed in U.S. Pat. No. 5,770,921 (Aoki et al.), incorporated herein by reference.

Pure neon may be used and the plasma-shells operated without memory margin using the architecture disclosed by U.S. Pat. No. 3,958,151 (Yano) discussed above and incorporated by reference.

Excimers

Excimer gases may also be used as disclosed in U.S. Pat. Nos. 4,549,109 (Nighan et al.) and 4,703,229 (Nighan et al.), both incorporated herein by reference. Nighan et al. ('109) and ('229) disclose the use of excimer gases formed by the combination of halogens with rare gases. The halogens include fluorine, chlorine, bromine, and iodine. The rare gases include helium, xenon, argon, neon, krypton, and radon. Excimer gases may emit red, blue, green, or other color light in the visible range or light in the invisible range. The excimer gases may be used alone or in combination with phosphors. U.S. Pat. No. 6,628,088 (Kim et al.), incorporated herein by reference, also discloses excimer gases for a PDP.

Other Gases

Depending upon the application, a wide variety of gases are contemplated for the practice of this invention. Such other applications include gas-sensing devices for detecting radiation and radar transmissions. Such other gases include $C_2H_2$—$CF_4$—Ar mixtures as disclosed in U.S. Pat. Nos. 4,201,692 (Christophorou et al.) and 4,309,307 (Christophorou et al.), both incorporated herein by reference. Also contemplated are gases disclosed in U.S. Pat. No. 4,553,062 (Ballon et al.), incorporated by reference. Other gases include sulfur hexafluoride, HF, $H_2S$, $SO_2$, SO, $H_2O_2$, and so forth.

Gas Pressure

This invention allows the construction and operation of a gas discharge (plasma) display with gas pressures at or above 1 atmosphere. In the prior art, gas discharge (plasma) displays are operated with the ionizable gas at a pressure below atmospheric. Gas pressures above atmospheric are not used in the prior art because of structural problems. Higher gas pressures above atmospheric may cause the display substrates to separate, especially at elevations of 4000 feet or more above sea level. Such separation may also occur between the substrate and a viewing envelope or dome in a single substrate or monolithic plasma panel structure.

In the practice of this invention, the gas pressure inside of the hollow plasma-shell may be equal to or less than atmospheric pressure or may be equal to or greater than atmospheric pressure. The typical sub-atmospheric pressure is about 150 to 760 Torr. However, pressures above atmospheric may be used depending upon the structural integrity of the plasma-shell.

In one embodiment of this invention, the gas pressure inside of the plasma-shell is equal to or less than atmospheric, about 150 to 760 Torr, typically about 350 to about 650 Torr.

In another embodiment of this invention, the gas pressure inside of the plasma-shell is equal to or greater than atmospheric. Depending upon the structural strength of the plasma-shell, the pressure above atmospheric may be about 1 to 250 atmospheres (760 to 190,000 Torr) or greater. Higher gas pressures increase the luminous efficiency of the plasma display.

Gas Processing

This invention avoids the costly prior art gas filling techniques used in the manufacture of gas discharge (plasma) display devices. The prior art introduces gas through one or more apertures into the device requiring a gas injection hole and tube. The prior art manufacture steps typically include heating and baking out the assembled device (before gas fill) at a high-elevated temperature under vacuum for 2 to 12 hours. The vacuum is obtained via external suction through a tube inserted in an aperture.

The bake out is followed by back fill of the entire panel with an ionizable gas introduced through the tube and aperture. The tube is then sealed-off.

This bake out and gas fill process is a major production bottleneck and yield loss in the manufacture of gas discharge (plasma) display devices, requiring substantial capital equipment and a large amount of process time. For color AC plasma display panels of 40 to 50 inches in diameter, the bake out and vacuum cycle may be 10 to 30 hours per panel or 10 to 30 million hours per year for a manufacture facility producing over 1 million plasma display panels per year.

The gas-filled plasma-shells used in this invention can be produced in large economical volumes and added to the gas discharge (plasma) display device without the necessity of costly bake out and gas process capital equipment. The savings in capital equipment cost and operations costs are substantial. Also the entire PDP does not have to be gas processed with potential yield loss at the end of the PDP manufacture.

PDP Structure

In one embodiment, the plasma-shells are located on or in a single substrate or monolithic PDP structure. Single substrate PDP structures are disclosed in U.S. Pat. Nos. 3,646,384 (Lay), 3,652,891 (Janning), 3,666,981 (Lay), 3,811,061 (Nakayama et al.), 3,860,846 (Mayer), 3,885,195 (Amano), 3,935,494 (Dick et al.), 3,964,050 (Mayer), 4,106,009 (Dick), 4,164,678 (Biazzo et al.), and 4,638,218 (Shinoda), all cited above and incorporated herein by reference. The plasma-shells may be positioned on the surface of the substrate and/or positioned in the substrate such as in channels, trenches, grooves, wells, cavities, hollows, and so forth. These channels, trenches, grooves, wells, cavities, hollows, etc., may extend through the substrate so that the plasma-shells positioned therein may be viewed from either side of the substrate.

The plasma-shells may also be positioned on or in a substrate within a dual substrate plasma display structure. Each shell is placed inside of a gas discharge (plasma) display device, for example, on the substrate along the channels, trenches or grooves between the barrier walls of a plasma display barrier structure such as disclosed in U.S. Pat. Nos. 5,661,500 and 5,674,553 (Shinoda et al.) and 5,793,158 (Wedding), cited above and incorporated herein by reference. The plasma-shells may also be positioned within a cavity, well, hollow, concavity, or saddle of a plasma display substrate, for example as disclosed by U.S. Pat. No. 4,827,186 (Knauer et al.), incorporated herein by reference.

In a device as disclosed by Wedding ('158) or Shinoda et al. ('500), the plasma-shells may be conveniently added to the substrate cavities and the space between opposing electrodes before the device is sealed. An aperture and tube can be used for bake out if needed of the space between the two opposing substrates, but the costly gas fill operation is eliminated.

AC plasma displays of 40 inches or larger are fragile with risk of breakage during shipment and handling. The presence of the plasma-shells inside of the display device adds structural support and integrity to the device.

The plasma-shells may be sprayed, stamped, pressed, poured, screen-printed, or otherwise applied to the substrate. The substrate surface may contain an adhesive or sticky surface to bind the plasma-shell to the substrate.

The practice of this invention is not limited to a flat surface display. The plasma-shell may be positioned or located on a conformal surface or substrate so as to conform to a predetermined shape such as a curved or irregular surface.

In one embodiment of this invention, each plasma-shell is positioned within a cavity on a single-substrate or monolithic gas discharge structure that has a flexible or bendable substrate. In another embodiment, the substrate is rigid. The substrate may also be partially or semi-flexible.

Substrate

In accordance with various embodiments of this invention, the PDP may be comprised of a single substrate or dual substrate device with flexible, semi-flexible, or rigid substrates. The substrate may be opaque, transparent, translucent, or non-light transmitting. In some embodiments, there may be used multiple substrates of three or more. Substrates may be flexible films, such as a polymeric film substrate. The flexible substrate may also be made of metallic materials alone or incorporated into a polymeric substrate. Alternatively or in addition, one or both substrates may be made of an optically-transparent thermoplastic polymeric material. Examples of suitable such materials are polycarbonate, polyvinyl chloride, polystyrene, polymethyl methacrylate, polyurethane polyimide, polyester, and cyclic polyolefin polymers. More broadly, the substrates may include a flexible plastic such as a material selected from the group consisting of polyether sulfone (PES), polyester terephihalate, polyethylene terephihalate (PET), polyethylene naphtholate, polycarbonate, polybutylene terephihalate, polyphenylene sulfide (PPS), polypropylene, polyester, aramid, polyamide-imide (PAI), polyimide, aromatic polyimides, polyetherimide, acrylonitrile butadiene styrene, and polyvinyl chloride, as disclosed in U.S. Patent Application Publication 2004/0179145 (Jacobsen et al.), incorporated herein by reference.

Alternatively, one or both of the substrates may be made of a rigid material. For example, one or both of the substrates may be a glass substrate. The glass may be a conventionally-available glass, for example having a thickness of approximately 0.2-1 mm. Alternatively, other suitable transparent materials may be used, such as a rigid plastic or a plastic film. The plastic film may have a high glass transition temperature, for example above 650 C, and may have a transparency greater than 85% at 530 nm.

Further details regarding substrates and substrate materials may be found in International Publications Nos. WO 00/46854, WO 00/49421, WO 00/49658, WO 00/55915, and WO 00/55916, the entire disclosures of which are herein incorporated by reference. Apparatus, methods, and compositions for producing flexible substrates are disclosed in U.S. Pat. Nos. 5,469,020 (Herrick), 6,274,508 (Jacobsen et al.), 6,281,038 (Jacobsen et al.), 6,316,278 (Jacobsen et al.), 6,468,638 (Jacobsen et al.), 6,555,408 (Jacobsen et al.), 6,590,346 (Hadley et al.), 6,606,247 (Credelle et al.), 6,665,044 (Jacobsen et al.), and 6,683,663 (Hadley et al.), all of which are incorporated herein by reference.

Positioning of Plasma-Shell on Substrate

The plasma-shell may be positioned or located on the substrate by any appropriate means. In one embodiment of this invention, the plasma-shell is bonded to the surface of a monolithic or dual-substrate display such as a PDP. The plasma-shell is bonded to the substrate surface with a non-conductive, adhesive material which also serves as an insulating barrier to prevent electrically shorting of the conductors or electrodes connected to the plasma-shell.

The plasma-shell may be mounted or positioned within a substrate well, cavity, hollow, or like depression. The well, cavity, hollow or depression is of suitable dimensions with a mean or average diameter and depth for receiving and retaining the plasma-shell. As used herein well includes cavity, hollow, depression, hole, or any similar configuration. In U.S. Pat. No. 4,827,186 (Knauer et al.), there is shown a cavity referred to as a concavity or saddle. The depression, well or cavity may extend partly through the substrate, embedded within or extend entirely through the substrate. The cavity may comprise an elongated channel, trench, or groove extending partially or completely across the substrate.

The electrodes must be in direct contact with each plasma-shell. An air gap between an electrode and the plasma-shell will cause high operating voltages. A material such as a conductive adhesive, and/or a conductive filler may be used to bridge or connect the electrode to the plasma-shell. Such conductive material must be carefully applied so as to not electrically short the electrode to other nearby electrodes. A dielectric material may also be applied to fill any air gap. This also may be an adhesive, etc.

Insulating Barrier

The insulating barrier may comprise any suitable non-conductive material which may also be used to bond the plasma-shell to the substrate.

In one embodiment, there is used an epoxy resin that is the reaction product of epichlorohydrin and bisphenol-A. One such epoxy resin is a liquid epoxy resin, D.E.R. 383, produced by the Dow Plastics group of the Dow Chemical Company.

Light Barriers

Light barriers of opaque, translucent, or non-transparent material may be located between plasma-shells to prevent optical cross-talk between plasma-shells, particularly between adjacent plasma-shells. A black material such as carbon filler is typically used.

Electrically Conductive Bonding Substance

In the practice of this invention, the conductors or electrodes are electrically connected to each plasma-shell with an electrically conductive bonding substance.

The electrically conductive bonding substance can be any suitable inorganic or organic material including compounds, mixtures, dispersions, pastes, liquids, cements, and adhesives.

In one embodiment, the electrically-conductive bonding substance is an organic substance with conductive filler material.

Contemplated organic substances include adhesive monomers, dimers, trimers, polymers and copolymers of materials such as polyurethanes, polysulfides, silicones, and epoxies. A wide range of other organic or polymeric materials may be used.

Contemplated conductive filler materials include conductive metals or metalloids such as silver, gold, platinum, copper, chromium, nickel, aluminum, and carbon.

The conductive filler may be of any suitable size and form such as particles, powder, agglomerates, or flakes of any suitable size and shape. It is contemplated that the particles, powder, agglomerates, or flakes may comprise a non-metal, metal, or metalloid core with an outer layer, coating, or film of conductive metal.

Some specific embodiments of conductive filler materials include silver-plated copper beads, silver-plated glass beads, silver particles, silver flakes, gold-plated copper beads, gold-plated glass beads, gold particles, gold flakes, and so forth.

In one particular embodiment of this invention there is used an epoxy filled with 60 to 80% by weight silver.

Examples of electrically conductive bonding substances are well known in the art. The disclosures including the compositions of the following references are incorporated herein by reference.

U.S. Pat. No. 3,412,043 (Gilliland) discloses an electrically conductive composition of silver flakes and resinous binder.

U.S. Pat. No. 3,983,075 (Marshall et al.) discloses a copper filled electrically conductive epoxy.

U.S. Pat. No. 4,247,594 (Shea et al.) discloses an electrically conductive resinous composition of copper flakes in a resinous binder.

U.S. Pat. Nos. 4,552,607 (Frey) and 4,670,339 (Frey) disclose a method of forming an electrically conductive bond using copper microspheres in an epoxy.

U.S. Pat. No. 4,880,570 (Sanborn et al.) discloses an electrically conductive epoxy-based adhesive selected from the amine curing modified epoxy family with a filler of silver flakes.

U.S. Pat. No. 5,183,593 (Durand et al.) discloses an electrically conductive cement comprising a polymeric carrier such as a mixture of two epoxy resins and filler particles selected from silver agglomerates, particles, flakes, and powders. The filler may be silver-plated particles such as inorganic spheroids plated with silver. Other noble metals and non-noble metals such as nickel are disclosed.

U.S. Pat. No. 5,298,194 (Carter et al.) discloses an electrically conductive adhesive composition comprising a polymer or copolymer of polyolefins or polyesters filled with silver particles.

U.S. Pat. No. 5,575,956 (Hermansen et al.) discloses electrically-conductive, flexible epoxy adhesives comprising a polymeric mixture of a polyepoxide resin and an epoxy resin filled with conductive metal powder, flakes, or non-metal particles having a metal outer coating. The conductive metal is a noble metal such as gold, silver, or platinum. Silver-plated copper beads and silver-plated glass beads are also disclosed.

U.S. Pat. No. 5,891,367 (Basheer et al.) discloses a conductive epoxy adhesive comprising an epoxy resin cured or reacted with selected primary amines and filled with silver flakes. The primary amines provide improved impact resistance.

U.S. Pat. No. 5,918,364 (Kulesza et al.) discloses substrate bumps or pads formed of electrically conductive polymers filled with gold or silver.

U.S. Pat. No. 6,184,280 (Shibuta) discloses an organic polymer containing hollow carbon microfibers and an electrically conductive metal oxide powder.

In another embodiment, the electrically-conductive bonding substance is an organic substance without a conductive filler material.

Examples of electrically-conductive bonding substances are well known in the art. The disclosures including the compositions of the following references are incorporated herein by reference.

U.S. Pat. No. 5,645,764 (Angelopoulos et al.) discloses electrically conductive pressure sensitive polymers without conductive fillers. Examples of such polymers include electrically conductive substituted and unsubstituted polyanilines, substituted and unsubstituted polyparaphenylenes, substituted and unsubstituted polyparaphenylene vinylenes, substituted and unsubstituted polythiophenes, substituted and unsubstituted polyazines, substituted and unsubstituted polyfuranes, substituted and unsubstituted polypyrroles, substituted and unsubstituted polyselenophenes, substituted and unsubstituted polyphenylene sulfides and substituted and unsubstituted polyacetylenes formed from soluble precursors. Blends of these polymers are suitable for use as are copolymers made from the monomers, dimers, or trimers, used to form these polymers.

Electrically conductive polymer compositions are also disclosed in U.S. Pat. Nos. 5,917,693 (Kono et al.), 6,096,825 (Garnier), and 6,358,438 (Isozaki et al.).

The electrically conductive polymers disclosed above may also be used with conductive fillers.

In some embodiments, organic ionic materials such as calcium stearate may be added to increase electrical conductivity. See U.S. Pat. No. 6,599,446 (Todt et al.), incorporated by reference.

In one embodiment hereof, the electrically conductive bonding substance is luminescent, for example as disclosed in U.S. Pat. No. 6,558,576 (Brielmann et al.), incorporated herein by reference.

EMI/RFI Shielding

In some embodiments, electroductive bonding substances may be used for EMI (electromagnetic interference) and/or RFI (radio-frequency interference) shielding. Examples of such EMI/RFI shielding are disclosed in U.S. Pat. Nos. 5,087,314 (Sandborn et al.) and 5,700,398 (Angelopoulos et al.), both incorporated herein by reference.

Electrodes

One or more hollow plasma-shells containing the ionizable gas are located within the display panel structure, each plasma-shell being in contact with at least two electrodes. In accordance with this invention, the contact is made by an electrically conductive bonding substance applied to each shell so as to form an electrically conductive pad for connection to the electrodes. A dielectric substance may also be used in lieu of or in addition to the conductive substance. Each electrode pad may partially cover the outside shell surface of the plasma-shell. The electrodes and pads may be of any geometric shape or configuration. In one embodiment the electrodes are opposing arrays of electrodes, one array of electrodes being transverse or orthogonal to an opposing array of electrodes. The electrode arrays can be parallel, zig zag, serpentine, or like pattern as typically used in dot-matrix gas discharge (plasma) displays. The use of split or divided electrodes is contemplated as disclosed in U.S. Pat. Nos. 3,603,836 (Grier) and 3,701,184 (Grier), incorporated herein by reference. Apertured electrodes may be used as disclosed in U.S. Pat. Nos. 6,118,214 (Marcotte) and 5,411,035 (Marcotte) and U.S. Patent Application Publication 2004/0001034 (Marcotte), all incorporated herein by reference. The electrodes are of any suitable conductive metal or alloy including gold, silver, aluminum, or chrome-copper-chrome. If a transparent electrode is used on the viewing surface, this is typically indium tin oxide (ITO) or tin oxide with a conductive side or edge bus bar of silver. Other conductive bus bar materials may be used such as gold, aluminum, or chrome-copper-chrome. The electrodes may partially cover the external surface of the plasma-shell.

The electrode array may be divided into two portions and driven from both sides with a so-called dual scan architecture as disclosed in U.S. Pat. Nos. 4,233,623 (Pavliscak) and 4,320,418 (Pavliscak), both incorporated herein by reference.

A flat plasma-sphere surface is particularly suitable for connecting electrodes to the plasma-sphere. If one or more electrodes connect to the bottom of plasma-sphere, a flat bottom surface is desirable. Likewise, if one or more electrodes connect to the top or sides of the plasma-sphere, it is desirable for the connecting surface of such top or sides to be flat.

The electrodes may be applied to the substrate or to the plasma-shells by thin film methods such as vapor phase deposition, E-beam evaporation, sputtering, conductive doping, etc. or by thick film methods such as screen printing, ink jet printing, etc.

In a matrix display, the electrodes in each opposing transverse array are transverse to the electrodes in the opposing array so that each electrode in each array forms a crossover with an electrode in the opposing array, thereby forming a multiplicity of crossovers. Each crossover of two opposing electrodes forms a discharge point or cell. At least one hollow plasma-shell containing ionizable gas is positioned in the gas discharge (plasma) display device at the intersection of at least two opposing electrodes. When an appropriate voltage potential is applied to an opposing pair of electrodes, the ionizable gas inside of the plasma-shell at the crossover is energized and a gas discharge occurs. Photons of light in the visible and/or invisible range are emitted by the gas discharge.

Shell Geometry

The shell of the plasma-shells may be of any suitable volumetric shape or geometric configuration to encapsulate the ionizable gas independently of the PDP or PDP substrate. As used herein, plasma-shell includes plasma-sphere, plasma-disc, and/or plasma-dome. The volumetric and geometric shapes include but are not limited to spherical, oblate, spheroid, prolate spheroid, capsular, elliptical, ovoid, egg shape, bullet shape, pear and/or tear drop. In an oblate spheroid, the diameter at the polar axis is flattened and is less than the diameter at the equator. In a prolate spheroid, the diameter at the equator is less than the diameter at the polar axis such that the overall shape is elongated. Likewise, the shell cross-section may be of any geometric design.

The size of the plasma-shell used in the practice of this invention or discharge distance may vary over a wide range. In a gas discharge display, the average diameter of a plasma-shell is about 1 mil to 20 mils (where one mil equals 0.001 inch) or about 25 microns to 500 microns where 25.4 microns (micrometers) equals 1 mil or 0.001 inch. plasma-shells can be manufactured up to 80 mils or about 2000 microns in diameter or greater. The thickness of the wall of each hollow plasma-shell must be sufficient to retain the gas inside, but thin enough to allow passage of photons emitted by the gas discharge. The wall thickness of the plasma-shell should be kept as thin as practical to minimize photon absorption, but thick enough to retain sufficient strength so that the plasma-shells can be easily handled and pressurized.

The average diameter of the plasma-shells may be varied for different phosphors to achieve color balance. Thus for a gas discharge display having phosphors which emit red, green, and blue light in the visible range, the plasma-shells for the red phosphor may have an average diameter less than the average diameter of the plasma-shells for the green or blue phosphor. Typically the average diameter of the red phosphor plasma-shells is about 80% to 95% of the average diameter of the green phosphor plasma-shells.

The average diameter of the blue phosphor plasma-shells may be greater than the average diameter of the red or green phosphor plasma-shells. Typically the average plasma-shell diameter for the blue phosphor is about 105% to 125% of the average plasma-shell diameter for the green phosphor and about 110% to 155% of the average diameter of the red phosphor.

In another embodiment using a high brightness green phosphor, the red and green plasma-shell may be reversed such that the average diameter of the green phosphor plasma-shell is about 80% to 95% of the average diameter of the red phosphor plasma-shell. In this embodiment, the average diameter of the blue plasma-shell is 105% to 125% of the average plasma-shell diameter for the red phosphor and about 110% to 155% of the average diameter of the green phosphor.

The red, green, and blue plasma-shells may also have different size diameters so as to enlarge voltage margin and improve luminance uniformity as disclosed in U.S. Patent Application Publication 2002/0041157 A1 (Heo), incorporated herein by reference. The widths of the corresponding electrodes for each RGB plasma-shell may be of different dimensions such that an electrode is wider or more narrow for a selected phosphor as disclosed in U.S. Pat. No. 6,034,657 (Tokunaga et al.), incorporated herein by reference. There also may be used combinations of different geometric shapes for different colors. Thus there may be used a square cross section plasma-shell for one color, a circular cross-section for another color, and another geometric cross section for a third color. A combination of plasma-shells of different geometric shape, i.e., plasma-spheres, plasma-discs, and plasma-domes, as different pixels in a PDP may be used Organic Luminescent Substance To provide or enhance light output from a plasma-shell, luminescent material is positioned in close proximity or near each plasma-shell. The organic luminescent material may be located internally and/or externally on the plasma-shell.

Organic luminescent substances may be used alone or in combination with inorganic luminescent substances. Contemplated combinations include mixtures and/or selective layers of organic and inorganic luminescent substances.

In accordance with one embodiment of this invention, an organic luminescent substance is located in close proximity to the enclosed gas discharge within a plasma-shell, so as to be excited by photons from the enclosed gas and emit visible and/or invisible light.

In accordance with one embodiment of this invention, an organic luminescent substance is positioned on at least a portion of the external surface of a plasma-shell, so as to be excited by photons from the gas discharge within the plasma-shell, such that the excited luminescent substance emits visible and/or invisible light.

As used herein organic luminescent substance comprises one or more organic compounds, monomers, dimers, trimers, polymers, copolymers, or like organic materials which emit visible and/or invisible light when excited by photons from the gas discharge inside of the plasma-shell.

Such organic luminescent substance may include one or more organic photoluminescent phosphors selected from organic photoluminescent compounds, organic photoluminescent monomers, dimers, trimers, polymers, copolymers, organic photoluminescent dyes, organic photoluminescent dopants and/or any other organic photoluminescent material. All are collectively referred to herein as organic photoluminescent phosphor.

Organic photoluminescent phosphor substances contemplated herein include those organic light emitting diodes or devices (OLED) and organic electroluminescent (EL) materials which emit light when excited by photons from the gas discharge of a gas plasma discharge. OLED and organic EL substances include the small molecule organic EL and the large molecule or polymeric OLED.

Small molecule organic EL substances are disclosed in U.S. Pat. Nos. 4,720,432 (VanSlyke et al.), 4,769,292 (Tang et al.), 5,151,629 (VanSlyke), 5,409,783 (Tang et al.), 5,645,948 (Shi et al.), 5,683,823 (Shi et al.), 5,755,999 (Shi et al.), 5,908,581 (Chen at al.), 5,935,720 (Chen et al.), 6,020,078 (Chen et al.), and 6,069,442 (Hung et al.), 6,348,359 (VanSlyke et al.), and 6,720,090 (Young et al.), all incorporated herein by reference. The small molecule organic light emitting devices may be called SMOLED.

Large molecule or polymeric OLED substances are disclosed in U.S. Pat. Nos. 5,247,190 (Friend et al.), 5,399,502 (Friend et al.), 5,540,999 (Yamamoto et al.), 5,900,327 (Pei et al.), 5,804,836 (Heegar et al.), 5,807,627 (Friend et al.), 6,361,885 (Chou), and 6,670,645 (Grushin et al.), all incorporated herein by references. The polymer light emitting devices may be called PLED.

Organic luminescent substances also include OLEDs doped with phosphorescent compounds as disclosed in U.S. Pat. No. 6,303,238 (Thompson et al.), incorporated herein by reference.

Organic photoluminescent substances are also disclosed in U.S. Patent Application Publication Nos. 2002/0101151 (Choi et al.), 2002/0063525 (Choi et al.), 2003/0003225 (Choi et al.) and 2003/0052596 (Yi et al.), U.S. Pat. Nos. 6,610,554 (Yi et al.), and 6,692,326 (Choi et al.), and International Publications WO 02/104077 and WO 03/046649, all incorporated herein by reference.

In one preferred embodiment of this invention, the organic luminescent phosphorous substance is a color-conversion-media (CCM) that converts light (photons) emitted by the gas discharge to visible or invisible light. Examples of CCM substances include the fluorescent organic dye compounds.

In one preferred embodiment, the organic luminescent substance is selected from a condensed or fused ring system such as a perylene compound, a perylene based compound, a perylene derivative, a perylene based monomer, dimer or trimer, a perylene based polymer and/or copolymer, and/or a substance doped with a perylene.

Photoluminescent perylene phosphor substances are widely known in the prior art. U.S. Pat. No. 4,968,571 (Gruenbaum et al.), incorporated herein by reference, discloses photoconductive perylene materials which may be used as photoluminescent phosphorous substances.

U.S. Pat. No. 5,693,808 (Langhals), incorporated herein by reference, discloses the preparation of luminescent perylene dyes.

U.S. Patent Application Publication 2004/0009367 (Hatwar), incorporated here by reference, discloses the preparation of luminescent materials doped with fluorescent perylene dyes.

U.S. Pat. No. 6,528,188 (Suzuki et al.), incorporated herein by reference, discloses the preparation and use of luminescent perylene compounds.

These condensed or fused ring compounds are conjugated with multiple double bonds and include monomers, dimers, trimers, polymers, and copolymers. In addition, conjugated aromatic and aliphatic organic compounds are contemplated including monomers, dimers, trimers, polymers, and copolymers. Conjugation as used herein also includes extended conjugation.

A material with conjugation or extended conjugation absorbs light and then transmits the light to the various conjugated bonds. Typically the number of conjugate-double bonds ranges from about 4 to about 15.

Further examples of conjugate-bonded or condensed/fused benzene rings are disclosed in U.S. Pat. Nos. 6,614,175 (Aziz et al.) and 6,479,172 (Hu et al.), both incorporated herein by reference. U.S. Patent Application Publication 2004/0023010 (Bulovic et al.) discloses luminescent nanocrystals with organic polymers including conjugated organic polymers.

Cumulene is conjugated only with carbon and hydrogen atoms. Cumulene becomes more deeply colored as the conjugation is extended.

Other condensed or fused ring luminescent compounds may also be used including naphthalimides, substituted naphthalimides, naphthalimide monomers, dimers, trimers, polymers, copolymers and derivatives thereof including naphthalimide diester dyes such as disclosed in U.S. Pat. No. 6,348,890 (Likavec et al.), incorporated herein by reference.

The organic luminescent substance may be an organic lumophore, for example as disclosed in U.S. Pat. Nos. 5,354,825 (Klainer et al.), 5,480,723 (Klainer et al.), 5,700,897 (Klainer et al.), and 6,538,263 (Park et al.), all incorporated by reference. Also lumophores are disclosed in S. E. Shaheen et al., Journal of Applied Physics, Vol 84, Number 4, pages 2324 to 2327, Aug. 15, 1998; J. D. Anderson et al., Journal American Chemical Society 1998, Vol 120, pages 9646 to 9655; and Gyu Hyun Lee et al., Bulletin of Korean Chemical Society, 2002, Vol 23, NO. 3, pages 528 to 530, all incorporated herein by reference.

The organic luminescent substance may be applied by any suitable method to the external surface of the plasma-shell, to the substrate or to any location in close proximity to the gas discharge contained within the plasma-shell.

Such methods include thin film deposition methods such as vapor phase deposition, sputtering and E-beam evaporation. Also thick film or application methods may be used such as screen-printing, ink jet printing, and/or slurry techniques.

Small size molecule OLED materials are typically deposited upon the external surface of the plasma-shell by thin film deposition methods such as vapor phase deposition or sputtering.

Large size molecule or polymeric OLED materials are deposited by so called thick film or application methods such as screen-printing, ink jet, and/or slurry techniques.

If the organic luminescent substance such as a photoluminescent phosphor is applied to the external surface of the plasma-shell, it may be applied as a continuous or discontinuous layer or coating such that the plasma-shell is completely or partially covered with the luminescent substance.

Inorganic Luminescent Substances

Inorganic luminescent substances may be used alone or in combination with organic luminescent substances. Contemplated combinations include mixtures and/or selective layers of organic and/or inorganic substances. The inorganic luminescent material may be dispersed within an organic luminescent material or vice versa. The shell may be made of inorganic luminescent substance. In one embodiment the inorganic luminescent substance is incorporated into the particles forming the shell structure. Typical inorganic luminescent substances are as follows.

Green Phosphor

A green light-emitting phosphor may be used alone or in combination with other light-emitting phosphors such as blue or red. Phosphor materials which emit green light include $Zn_2SiO_4$:Mn, ZnS:Cu, ZnS:Au, ZnS:Al, ZnO:Zn, CdS:Cu, $CdS:Al_2$, $Cd_2O_2S$:Tb, and $Y_2O_2S$:Tb.

In one mode and embodiment of this invention using a green light-emitting phosphor, there is used a green light-emitting phosphor selected from the zinc orthosilicate phosphors such as $ZnSiO_4$:$Mn^{2+}$. Green light emitting zinc orthosilicates including the method of preparation are disclosed in U.S. Pat. No. 5,985,176 (Rao) which is incorporated herein by reference. These phosphors have a broad emission in the green region when excited by 147 nm and 173 nm (nanometers) radiation from the discharge of a xenon gas mixture.

In another mode and embodiment of this invention there is used a green light-emitting phosphor which is a terbium activated yttrium gadolinium borate phosphor such as (Gd, Y)$BO_3$:$Tb^{3+}$. Green light-emitting borate phosphors including the method of preparation are disclosed in U.S. Pat. No. 6,004,481 (Rao), incorporated herein by reference.

In another mode and embodiment there is used a manganese activated alkaline earth aluminate green phosphor as disclosed in U.S. Pat. No. 6,423,248 (Rao), peaking at 516 nm when excited by 147 and 173 nm radiation from xenon. The particle size ranges from 0.05 to 5 microns. Rao ('248) is incorporated herein by reference Terbium doped phosphors may emit in the blue region especially in lower concentrations of terbium. For some display applications such as television, it is desirable to have a single peak in the green region at 543 nm. By incorporating a blue absorption dye in a filter, any blue peak can be eliminated.

Green light-emitting terbium-activated lanthanum cerium orthophosphate phosphors are disclosed in U.S. Pat. No. 4,423,349 (Nakajima et al.), incorporated herein by reference. Green light-emitting lanthanum cerium terbium phosphate phosphors are disclosed in U.S. Pat. No. 5,651,920 which is incorporated herein by reference.

Green light-emitting phosphors may also be selected from the trivalent rare earth ion-containing aluminate phosphors as disclosed in U.S. Pat. No. 6,290,875 (Oshio et al.).

Blue Phosphor

A blue light-emitting phosphor may be used alone or in combination with other light-emitting phosphors such as green or red. Phosphor materials which emit blue light include ZnS:Ag, ZnS:Cl, and CsI:Na.

In a preferred mode and embodiment of this invention, there is used a blue light-emitting aluminate phosphor. An aluminate phosphor which emits blue visible light is divalent europium ($Eu^{2+}$) activated Barium Magnesium Aluminate (BAM) represented by $BaMgAl_{10}O_{17}$:$Eu^{2+}$+. BAM is widely used as a blue phosphor in the PDP industry.

BAM and other aluminate phosphors which emit blue visible light are disclosed in U.S. Pat. Nos. 5,611,959 (Kijima et al.) and 5,998,047 (Bechtel et al.), both incorporated herein by reference. The aluminate phosphors may also be selectively coated as disclosed by Bechtel et al. ('047).

Blue light-emitting phosphors may be selected from a number of divalent europium-activated aluminates such as disclosed in U.S. Pat. No. 6,096,243 (Oshio et al.) incorporated herein by reference.

The preparation of BAM phosphors for a PDP is also disclosed in U.S. Pat. No. 6,045,721 (Zachau et al.), incorporated herein by reference.

In another mode and embodiment of this invention, the blue light-emitting phosphor is thulium activated lanthanum phosphate with trace amounts of $Sr^{2+}$ and/or $Li^+$. This exhibits a narrow band emission in the blue region peaking at 453 nm when excited by 147 nm and 173 nm radiation from the discharge of a xenon gas mixture. Blue light-emitting phosphate phosphors including the method of preparation are disclosed in U.S. Pat. No. 5,989,454 (Rao) which is incorporated herein by reference.

In a best mode and embodiment of this invention using a blue-emitting phosphor, a mixture or blend of blue light-emitting phosphors is used such as a blend or complex of about 85% to 70% by weight of a lanthanum phosphate phosphor activated by trivalent thulium ($Tm^{3+}$), $Li^+$, and an optional amount of an alkaline earth element ($AE^{2+}$) as a coactivator and about 15% to 30% by weight of divalent europium-activated BAM phosphor or divalent europium-activated Barium Magnesium, Lanthanum Aluminated (BLAMA) phosphor. Such a mixture is disclosed in U.S. Pat. No. 6,187,225 (Rao), incorporated herein by reference.

Blue light-emitting phosphors also include $ZnO.Ga_2O_3$ doped with Na or Bi. The preparation of these phosphors is disclosed in U.S. Pat. Nos. 6,217,795 (Yu et al.) and 6,322,725 (Yu et al.), both incorporated herein by reference.

Other blue light-emitting phosphors include europium activated strontium chloroapatite and europium-activated strontium calcium chloroapatite.

Red Phosphor

A red light-emitting phosphor may be used alone or in combination with other light-emitting phosphors such as green or blue. Phosphor materials which emit red light include $Y_2O_2S$:Eu and $Y_2O_3S$:Eu.

In a best mode and embodiment of this invention using a red-emitting phosphor, there is used a red light-emitting phosphor which is an europium activated yttrium gadolinium borate phosphors such as (Y,Gd)$BO_3$:$Eu^{3+}$. The composition and preparation of these red light-emitting borate phosphors is disclosed in U.S. Pat. Nos. 6,042,747 (Rao) and 6,284,155 (Rao), both incorporated herein by reference.

These europium activated yttrium, gadolinium borate phosphors emit an orange line at 593 nm and red emission lines at 611 23 and 627 nm when excited by 147 nm and 173 nm UV radiation from the discharge of a xenon gas mixture. For television (TV) applications, it is preferred to have only the red emission lines (611 23 and 627 nm). The orange line (593 nm) may be minimized or eliminated with an external optical filter.

A wide range of red light-emitting phosphors are used in the PDP industry and are contemplated in the practice of this invention including europium-activated yttrium oxide.

Other Phosphors

There also may be used phosphors other than red, blue, green such as a white light-emitting phosphor, pink light-emitting phosphor or yellow light-emitting phosphor. These may be used with an optical filter. Phosphor materials which emit white light include calcium compounds such as $3Ca_3(PO_4)_2.CaF:Sb$, $3Ca_3(PO_4)_2.CaF:Mn$, $3Ca_3(PO_4)_2.CaCl:Sb$, and $3Ca_3(PO_4)_2.CaCl:Mn$. White light-emitting phosphors are disclosed in U.S. Pat. No. 6,200,496 (Park et al.) incorporated herein by reference. Pink light-emitting phosphors are disclosed in U.S. Pat. No. 6,200,497 (Park et al.), incorporated herein by reference. Phosphor material which emits yellow light include ZnS:Au.

Organic and Inorganic Luminescent Materials

Inorganic and organic luminescent materials may be used in any suitable selected combinations. In one embodiment, multiple layers of luminescent materials are applied to the plasma-shell with at least one layer being organic and at least one layer being inorganic. An inorganic layer may serve as a protective overcoat for an organic layer.

In another embodiment, the shell of the plasma-shell comprises or contains inorganic luminescent material. In another embodiment, organic and inorganic luminescent materials are mixed together and applied as a layer inside or outside the shell. The shell may also be made of or contain a mixture of organic and inorganic luminescent materials. In one preferred embodiment, a mixture of organic and inorganic material is applied outside the shell. Inorganic luminescent material may be mixed or dispersed within an organic luminescent material. Organic luminescent material may be mixed or dispersed within an inorganic luminescent material.

Photon Exciting of Luminescent Substance

In the best embodiment contemplated in the practice of this invention, a layer, coating, or particles of inorganic and/or organic luminescent substances such as phosphor is located on the exterior wall of the plasma-shell. The photons of light pass through the shell or wall(s) of the plasma-shell and excite the organic or inorganic photoluminescent phosphor located outside of the plasma-shell. The phosphor may be located on the side wall(s) of a channel, trench, barrier, groove, cavity, well, hollow or like structure of the discharge space.

In one embodiment, the gas discharge within the channel, trench, barrier, groove, cavity, well or hollow produces photons that excite the inorganic and/or organic phosphor such that the phosphor emits light in a range visible to the human eye. Typically this is red, blue, or green light. However, phosphors may be used which emit other light such as white, pink, or yellow light. In some embodiments of this invention, the emitted light may not be visible to the human eye.

In prior art AC plasma display structures as disclosed in U.S. Pat. Nos. 5,793,158 (Wedding) and 5,661,500 (Shinoda), inorganic and/or organic phosphor is located on the wall(s) or side(s) of the barriers that form the channel, trench, groove, cavity, well, or hollow, phosphor may also be located on the bottom of the channel, trench or groove as disclosed by Shinoda et al. 500 or the bottom cavity, well, or hollow as disclosed by U.S. Pat. No. 4,827,186 (Knauer et al.). The plasma-shells are positioned within or along the walls of a channel, barrier, trench, groove, cavity, well or hollow so as to be in close proximity to the phosphor.

Thus in one embodiment of this invention, plasma-shells are positioned within the channels, barriers, trenches, grooves, cavities, wells, or hollows, such that photons from the gas discharge within the plasma-shell cause the phosphor along the wall(s), side(s) or at the bottom of the channel, barrier, trenches groove, cavity, well, or hollow, to emit light.

In another embodiment of this invention, phosphor is located on the outside surface of each plasma-shell. In this embodiment, the outside surface is at least partially covered with phosphor that emits light in the visible or invisible range when excited by photons from the gas discharge within the plasma-shell. The phosphor may emit light in the UV and/or IR range.

In one embodiment, phosphor is dispersed and/or suspended within the ionizable gas inside each plasma-shell. In such embodiment, the phosphor particles are sufficiently small such that most of the phosphor particles remain suspended within the gas and do not precipitate or otherwise substantially collect on the inside wall of the plasma-shell. The average diameter of the dispersed and/or suspended phosphor particles is less than about 1 micron, typically less than 0.1 microns. Larger particles can be used depending on the size of the plasma-shell. The phosphor particles may be introduced by means of a fluidized bed.

The luminescent substance such as an inorganic and/or organic photoluminescent phosphor may be located on all or part of the external surface of the plasma-shells on all or part of the internal surface of the plasma-shells. The phosphor may comprise particles dispersed or floating within the gas. In one best embodiment contemplated for the practice of this invention, an inorganic and/or organic luminescent phosphor is located on the external surface of the plasma-shell.

In one embodiment, an inorganic and/or organic luminescent substance is located on the external surface and excited by ultraviolet (UV) photons from the gas discharge inside the plasma-shell. The phosphor emits light in the visible range such as red, blue, or green light. Phosphors may be selected to emit light of other colors such as white, pink, or yellow. The phosphor may also be selected to emit light in non-visible ranges of the spectrum. Optical filters may be selected and matched with different phosphors.

The phosphor thickness is sufficient to absorb the UV, but thin enough to emit light with minimum attenuation. Typically the phosphor thickness is about 2 to 40 microns, preferably about 5 to 15 microns. In one embodiment, dispersed or floating particles within the gas are typically spherical or needle shaped having an average size of about 0.01 to 5 microns.

A UV photoluminescent phosphor is excited by UV in the range of 50 to 400 nanometers. The phosphor may have a protective layer or coating which is transmissive to the excitation UV and the emitted visible light. Such include organic films such as perylene or inorganic films such as aluminum oxide or silica. Protective coatings are disclosed and discussed below.

Because the ionizable gas is contained within a multiplicity of plasma-shells, it is possible to provide a custom gas mixture or composition at a custom pressure in each plasma-shell for each phosphor.

In the prior art, it is necessary to select an ionizable gas mixture and a gas pressure that is optimum for all phosphors used in the device such as red, blue, and green phosphors. However, this requires trade-offs because a particular gas mixture may be optimum for a particular green phosphor, but less desirable for red or blue phosphors. In addition, trade-offs are required for the gas pressure.

In the practice of this invention, an optimum gas mixture and an optimum gas pressure may be provided for each of the selected phosphors. Thus the gas mixture and gas pressure inside the plasma-shells may be optimized with a custom gas mixture and a custom gas pressure, each or both optimized for each phosphor emitting red, blue, green, white, pink, or yellow light in the visible range or light in the invisible range. The diameter and the wall thickness of the plasma-shell can also be adjusted and optimized for each phosphor. Depending upon the Paschen Curve (pd v. voltage) for the particular ionizable gas mixture, the operating voltage may be decreased by optimized changes in the gas mixture, gas pressure, and the diameter of the plasma-shell.

Up-Conversion

In another embodiment of this invention it is contemplated using an inorganic and/or organic luminescent substance such as a phosphor to convert infrared radiation to visible light. This is referred to in the literature as an up-conversion phosphor. The up-conversion phosphor is typically used in combination with a phosphor which converts UV radiation to visible light. An up-conversion phosphor in combination with such a UV phosphor is disclosed in U.S. Pat. No. 6,265,825 (Asano), incorporated herein by reference. Up-conversion may also be obtained with shell compositions such as Thulium doped silicate glass containing oxides of Si, Al, and La, as disclosed in U.S. Patent Application Publication 2004/0037538 (Schardt et al.), incorporated herein by reference. The glasses of Schardt et al. emit visible or UV light when excited by IR.

Quantum Dots

In one embodiment of this invention, the luminescent substance is a quantum dot material. Examples of luminescent quantum dots are disclosed in International Publication Numbers WO 03/038011, WO 00/029617, WO 03/038011, WO 03/100833, and WO 03/037788, all incorporated herein by reference.

Luminescent quantum dots are also disclosed in U.S. Pat. Nos. 6,468,808 (Nie et al.), 6,501,091 (Bawendi et al.), 6,698,313 (Park et al.), and published U.S. Patent Application 2003/0042850 (Bertram et al.), all incorporated herein by reference. The quantum dots may be added or incorporated into the shell during shell formation or after the shell is formed.

Protective Overcoat

In a preferred embodiment, the luminescent substance is located on an external surface of the plasma-shell. Organic luminescent phosphors are particularly suitable for placing on the exterior shell surface, but may require a protective overcoat. The protective overcoat may be inorganic, organic, or a combination of inorganic and organic. This protective overcoat may be an inorganic and/or organic luminescent material.

The luminescent substance may have a protective overcoat such as a clear or transparent acrylic compound including acrylic solvents, monomers, dimers, trimers, polymers, copolymers, and derivatives thereof to protect the luminescent substance from direct or indirect contact or exposure with environmental conditions such as air, moisture, sunlight, handling, or abuse. The selected acrylic compound is of a viscosity such that it can be conveniently applied by spraying, screen print, ink jet, or other convenient methods so as to form a clear film or coating of the acrylic compound over the luminescent substance.

Other organic compounds may also be suitable as protective overcoats including silanes such as glass resins. Also the polyesters such as Mylar® may be applied as a spray or a sheet fused under vacuum to make it wrinkle free. Polycarbonates may be used but may be subject to UV absorption and detachment.

In one embodiment hereof the luminescent substance is coated with a film or layer of a perylene compound including monomers, dimers, trimers, polymers, copolymers, and derivatives thereof. The perylene compounds are widely used as protective films. Specific compounds include poly-monochloro-para-xylyene (Parylene C) and poly-para-xylylene (Parylene N).

Parylene polymer films are also disclosed in U.S. Pat. Nos. 5,879,808 (Wary et al.) and 6,586,048 (Welch et al.), both incorporated herein by reference. The perylene compounds may be applied by ink jet printing, screen printing, spraying, and so forth as disclosed in U.S. Patent Application Publication 2004/0032466 (Deguchi et al.), incorporated herein by reference. Parylene conformal coatings are covered by Mil-I-46058C and ISO 9002. Parylene films may also be induced into fluorescence by an active plasma as disclosed in U.S. Pat. No. 5,139,813 (Yira et al.), incorporated herein by reference.

Phosphor overcoats are also disclosed in U.S. Pat. Nos. 4,048,533 (Hinson et al.), 4,315,192 (Skwirut et al.), 5,592,052 (Maya et al.), 5,604,396 (Watanabe et al.), 5,793,158 (Wedding), and 6,099,753 (Yoshimura et al.), all incorporated herein by reference.

In some embodiments, the luminescent substance is selected from materials that do not degrade when exposed to oxygen, moisture, sunlight, etc. and that may not require a protective overcoat. Such include various organic luminescent substances such as the perylene compounds disclosed above. For example, perylene compounds may be used as protective overcoats and thus do not require a protective overcoat.

Selected Specific Organic Phosphor

Embodiments and Applications

In this invention, plasma-shells of any gas encapsulating geometric shape may be used as the pixel elements of a gas plasma display. A full color display is achieved using red, green and blue pixels. The following are some specific embodiments using an organic luminescent substance such as a luminescent phosphor.

Color Plasma Displays Using UV 300 nm to 380 nm Excitation with Organic Phosphors The organic luminescent substance such as an organic phosphor may be excited by UV ranging from about 300 nm to about 380 nm to produce red, blue, or green emission in the visible range. The encapsulated gas is chosen to excite in this range.

To improve life, the organic phosphor must be separated from the plasma discharge. This may be done by applying the organic phosphor to the exterior of the shell. In this case, it is important that the shell material be selected such that it is transmissive to UV in the range of about 300 nm to about 380 nm. Suitable materials include aluminum oxides, silicon oxides, and other such materials. In the case where helium is used in the gas mixture, aluminum oxide is a desirable shell material as it does not allow the helium to permeate.

Color Plasma Displays Using UV Excitation Below 300 nm with Organic Phosphors Organic phosphors may be excited by UV below 300 nm. In this case, a xenon neon mixture of gases may produce excitation at 147 nm and 172 nm. The plasma-shell material must be transmissive below 300 nm. Shell materials that are transmissive to frequencies below 300 nm include silicon oxide. The thickness of the shell material must be minimized in order to maximize transmissivity.

Color Plasma Displays Using Visible Blue Above 380 nm with Organic Phosphors Organic phosphors may be excited by excitation above 380 nm. The plasma-shell material is composed completely or partially of an inorganic blue phosphor such as BAM. The shell material fluoresces blue and may be up-converted to red or green with organic phosphors on the outside of the shell

Infrared Plasma Displays

In some applications it may be desirable to have PDP displays with plasma-shells that produce emission in the infrared range for use in night vision applications. This may be done with Up-Conversion phosphors as described above.

Application of Organic Phosphors

Organic phosphors may be added to a UV curable medium and applied to the plasma-shell with a variety of methods including jetting, spraying, sheet transfer methods, or screen printing. This may be done before or after the plasma-shell is added to a substrate or back plate.

Application of Phosphor Before Plasma-Shells are Added to Substrate

If organic phosphors are applied to the plasma-shells before such are applied to the substrate, additional steps may be necessary to place each plasma-shell in the correct position on the back substrate.

Application of Phosphor after Plasma-Shells are Added to Substrate

If the organic phosphor is applied to the plasma-shells after such are placed on a substrate, care must be take to align the appropriate phosphor color with the appropriate plasma-shell.

Application of Phosphor after Plasma-Shells are Added to Substrate-Self Aligning In one embodiment, the plasma-shells may be used to cure the phosphor. A single color organic phosphor is completely applied to the entire substrate containing the plasma-shells. Next the plasma-shells are selectively activated to produce UV to cure the organic phosphor. The phosphor will cure on the plasma-shells that are activated and may be rinsed away from the plasma-shells that were not activated. Additional applications of phosphor of different colors may be applied using this method to coat the remaining shells. In this way the process is completely self-aligning.

Tinted Plasma-Shells

In the practice of this invention, the plasma-shell may be color tinted or constructed of materials that are color tinted with red, blue, green, yellow, or like pigments. This is disclosed in U.S. Pat. No. 4,035,690 (Roeber), cited above and incorporated herein by reference. The gas discharge may also emit color light of different wavelengths as disclosed in Roeber ('690).

The use of tinted materials and/or gas discharges emitting light of different wavelengths may be used in combination with the above described phosphors and the light emitted from such phosphors. Optical filters may also be used.

Filters

This invention may be practiced in combination with an optical and/or electromagnetic (EMI) filter, screen, and/or shield. It is contemplated that the filter, screen, and/or shield may be positioned on a PDP constructed of plasma-shells, for example on the front or top-viewing surface. The plasma-shells may be tinted. Examples of optical filters, screens, and/or shields are disclosed in U.S. Pat. Nos. 3,960,754 (Woodcock), 4,106,857 (Snitzer), 4,303,298, (Yamashita), 5,036,025 (Lin), 5,804,102 (Oi), and 6,333,592 (Sasa et al.), all incorporated herein by reference. Examples of EMI filters, screens, and/or shields are disclosed in U.S. Pat. Nos. 6,188,174 (Marutsuka) and 6,316,110 (Anzaki et al.), incorporated herein by reference. Color filters may also be used. Examples are disclosed in U.S. Pat. Nos. 3,923,527 (Matsuura et al.), 4,105,577 (Yamashita), 4,110,245 (Yamashita), and 4,615,989 (Ritze), all incorporated by reference.

Mixtures of Luminescent Materials

It is contemplated that mixtures of luminescent materials may be used including inorganic and inorganic, organic and organic, and inorganic and organic. The brightness of the luminescent material may be increased by dispersing inorganic materials into organic luminescent materials or vice versa.

Layers of Luminescent Materials

Two or more layers of the same or different luminescent materials may be selectively applied to the plasma-shells. Such layers may comprise combinations of organic and organic, inorganic and inorganic, and/or inorganic and organic.

Plasma-Discs in Combination with Other Plasma-Shells

In the practice of this invention, the plasma-discs may be used alone or in combination with other plasma-shells. Thus the plasma-discs may be used with selected organic and/or inorganic luminescent materials to provide one color with other plasma-shells such as plasma-spheres or plasma-domes used with selected organic and/or or inorganic luminescent materials to provide other colors.

High Resolution Color Display

In a multicolor display such as RGB PDP, plasma-shells with flat sides such as plasma-discs may be stacked on top of each other or arranged in parallel side-by-side positions on the substrate. This configuration requires less area of the display surface compared to conventional RGB displays that require red, green, and blue pixels adjacent to each other on the substrate. This stacking embodiment may be practiced with plasma-shells that use various color emitting gases such as the excimer gases. Phosphor coated plasma-shells in combination with excimers may also be used. Each plasma-shell may also be of a different color material such as tinted glass. The plasma-shells used in this stacking arrangement typically have geometric shapes with one or more flat sides such as plasma-discs and/or plasma-domes. A plasma-disc is a plasma-shell with at least two flattened sides. The other four sides may be round or flat. A plasma-dome is a plasma-shell with a flattened bottom and a domed top. The other four sides may be round or flat. In some stacking embodiments, other flat-sided shapes may also be used.

Plasma Tubes

The PDP structure may comprise a combination of plasma-shells and plasma-tubes. Plasma-tubes comprise elongated tubes for example as disclosed in U.S. Pat. Nos. 3,602,754 (Pfaender et al.), 3,654,680 (Bode et al.), 3,927,342 (Bode et al.), 4,038,577 (Bode et al.), 3,969,718 (Stom), 3,990,068 (Mayer et al.), 4,027,188 (Bergman), 5,984,747 (Bhagavatula et al.), 6,255,777 (Kim et al.), 6,633,117 (Shinoda et al.), 6,650,055 (Ishimoto et al.), and 6,677,704 (Ishimoto et al.), all incorporated herein by reference.

As used herein, the elongated plasma-tube is intended to include capillary, filament, filamentary, illuminator, hollow rod, or other such terms. It includes an elongated enclosed gas-filled structure having a length dimension that is greater than its cross-sectional width dimension. The width of the plasma-tube is the viewing width from the top or bottom (front or rear) of the display.

The length of each plasma-tube may vary depending upon the PDP structure. In one embodiment hereof, an elongated tube is selectively divided into a multiplicity of lengths. In another embodiment, there is used a continuous tube that winds or weaves back and forth from one end to the other end of the PDP. The length of the plasma-tube is typically about 1400 microns to several feet or more.

The PDP may comprise any suitable combination of plasma-shells and plasma-tubes. The plasma-tubes may be arranged in any configuration. In one embodiment, there are alternative rows of plasma-shells and plasma-tubes. The plasma-tubes may be used for any desired function or purpose including the priming or conditioning of the plasma-shells. In one embodiment, the plasma-tubes are arranged around the perimeter of the display to provide priming or conditioning.

The plasma-tubes may be of any geometric cross-section including circular, elliptical, square, rectangular, triangular, polygonal, trapezoidal, pentagonal, or hexagonal. In one preferred embodiment, the viewing surface of the plasma-tube is flat. In another embodiment, each electrode-connecting surface such as top, bottom, and/or side(s) is flat.

The plasma-tube may contain secondary electron emission materials, luminescent materials, and reflective materials as discussed herein for plasma-shells. The plasma-tubes may also utilize positive column discharge as discussed herein for plasma-shells.

SUMMARY

Aspects of this invention may be practiced with a coplanar or opposing substrate PDP as disclosed in the U.S. Pat. Nos. 5,793,158 (Wedding) and 5,661,500 (Shinoda et al.) or with a single-substrate or monolithic PDP as disclosed in the U.S. Pat. Nos. 3,646,384 (Lay,) 3,860,846 (Mayer), 3,935,484 (Dick et al.) and other single substrate patents, discussed above and incorporated herein by reference.

In the practice of this invention, the plasma-shells may be positioned and spaced in an AC gas discharge plasma display structure so as to utilize and take advantage of the positive column of the gas discharge. The positive column is described in U.S. Pat. No. 6,184,848 (Weber) and is incorporated herein by reference. In a positive column application, the plasma-shells must be sufficient in length along the discharge axis to accommodate the positive column discharge.

Although this invention has been disclosed and described above with reference to dot matrix gas discharge displays, it may also be used in an alphanumeric gas discharge display using segmented electrodes. This invention may also be practiced in AC or DC gas discharge displays including hybrid structures of both AC and DC gas discharge.

The plasma-shells may contain a gaseous mixture for a gas discharge display or may contain other substances such as an electroluminescent (EL) or liquid crystal materials for use with other displays technologies including electroluminescent displays (ELD), liquid crystal displays (LCD), field emission displays (FED), electrophoretic displays, and Organic EL or Organic LED (OLED).

The use of plasma-shells alone or in combination with plasma-tubes on a single flexible substrate allows the encapsulated pixel display device to be utilized in a number of applications. In one application, the device is used as a plasma shield to absorb electromagnetic radiation and to make the shielded object invisible to enemy radar. In this embodiment, a flexible sheet of plasma-shells alone or in combination with plasma-tubes may be provided as a blanket over the shielded object. The PDP plasma-shell alone or in combination with plasma-tubes may also be used as an antenna.

In the embodiments disclosed herein, the PDP device is used to detect radiation such as nuclear radiation from a nuclear device, mechanism, apparatus or container. This is particularly suitable for detecting hidden nuclear devices at airports, loading docks, bridges, and other such locations.

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims to be interpreted in accordance with the breadth to which they are fairly, legally, and equitably entitled.

The invention claimed is:

1. In a process for fabricating a plasma display panel comprising a multiplicity of gas discharge pixels, each pixel being in electrical contact with two or more addressing electrodes, the improvement which comprises positioning a multiplicity of ionizable gas filled plasma-shells on a substrate in electrical contact with the electrodes to form the pixels, an organic luminescent substance and an inorganic luminescent substance being combined and located in proximity to a gas discharge within a plasma-shell so as to be excited by photons from a gas discharge within the plasma-shell, said excited luminescent substances emitting visible and/or invisible light.

2. The invention of claim 1 wherein each plasma-shell is composed of UV and/or IR transmissive material.

3. The invention of claim 1 wherein an organic luminescent substance is located near and/or on the external surface of each plasma-shell.

4. The invention of claim 1 wherein the substrate is flexible.

5. The invention of claim 1 wherein each plasma-shell is selected from one or more members of the group consisting of plasma-sphere, plasma-disc, or plasma-dome.

6. The invention of claim 1 wherein one or more plasma-tubes are positioned on the substrate.

7. The invention of claim 1 wherein the organic luminescent substance and the inorganic luminescent substance are combined as a mixture.

8. The invention of claim 1 wherein an organic luminescent substance is applied to each plasma-shell.

9. The invention of claim 8 wherein the organic luminescent substance is a condensed or fused ring compound conjugated with multiple double bonds and includes monomers, dimers, trimers, polymers, and copolymers.

10. The invention of claim 8 wherein the organic luminescent substance is a naphthalimide, a substituted naphthalimide, a naphthalimide monomer, dimer, trimer, polymer, copolymer, or a derivative thereof.

11. The invention of claim 8 wherein the organic luminescent substance is a quantum dot material.

12. In a process for fabricating a single substrate plasma display comprised of a multiplicity of gas discharge pixels, each pixel being in electrical contact with two or more addressing electrodes, the improvement which comprises positioning a multiplicity of ionizable gas filled plasma-shells on a substrate in electrical contact with the electrodes to form the pixels, each plasma-shell being made of an inorganic luminescent substance with an organic luminescent substance located near and/or on the external surface of each plasma-shell, a source of secondary electron emission being provided inside each plasma-shell.

13. The invention of claim 12 wherein each plasma-shell is composed of UV and/or IR transmissive material.

14. The invention of claim 12 wherein the substrate is flexible or partly flexible.

15. The invention of claim 12 wherein each plasma-shell is selected from one or more members of the group consisting of plasma-sphere, plasma-disc, or plasma-dome.

16. The invention of claim 12 wherein one or more plasma-tubes are positioned on the substrate.

17. The invention of claim 12 wherein the organic luminescent substance is an organic photoluminescent phosphor selected from at least one member of the group consisting of organic photoluminescent monomers, dimers, trimers, organic photoluminescent polymers, copolymers, organic photoluminescent dyes, and organic photoluminescent dopants.

18. The invention of claim 12 wherein the organic luminescent substance is conjugated with multiple double bonds.

19. The invention of claim 12 wherein the organic luminescent substance is a perylene compound, perylene based compound, perylene based monomer, dimer, trimer, perylene based polymer, copolymer, and/or substance doped with perylene.

20. In a process for fabricating a single substrate PDP comprising a multiplicity of gas discharge pixels, the improvement which comprises positioning ionizable gas filled plasma-shells on a substrate containing an array of electrodes, each plasma-shell being made of an inorganic luminescent substance positioned in electrical contact with two or more electrodes, applying a luminescent substance to each plasma-shell to be excited by photons from a gas discharge within the plasma-shell, said luminescent substance comprising an organic luminescent substance.

21. The invention of claim 20 wherein each plasma-shell is selected from one or more members of the group consisting of plasma-sphere, plasma-disc, and plasma-dome.

22. The invention of claim 20 wherein the organic luminescent substance is a condensed or fused ring compound conjugated with multiple double bonds and includes monomers, dimers, trimers, polymers, and copolymers.

23. The invention of claim 20 wherein the organic luminescent substance is a naphthalimide, a substituted naphthalimide, a naphthalimide monomer, dimer, trimer, polymer, copolymer, or a derivative thereof.

24. The invention of claim 20 wherein the organic luminescent substance is a quantum dot material.

25. The invention of claim 20 wherein the organic luminescent substance contains a protective coating.

26. The invention of claim 25 wherein the protective coating is selected from acrylic or perylene compounds including monomers, dimers, trimers, polymers, copolymers, and derivatives thereof.

27. The invention of claim 20 wherein the substrate is flexible or partly flexible.

* * * * *